(12) United States Patent
Lee et al.

(10) Patent No.: US 10,536,754 B2
(45) Date of Patent: Jan. 14, 2020

(54) DIGITAL DEVICE AND CONTROLLING METHOD THEREOF

(71) Applicant: LG ELECTRONICS INC., Seoul (KR)

(72) Inventors: Sangseok Lee, Seoul (KR); Sunki Min, Seoul (KR); Kiwon Park, Seoul (KR); Daegun Park, Seoul (KR); Seungshin Lee, Seoul (KR); Jaekyung Lee, Seoul (KR); Hyangjin Lee, Seoul (KR); Jeean Chang, Seoul (KR); Yookyoung Choi, Seoul (KR); Seunghyun Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/587,677

(22) Filed: May 5, 2017

(65) Prior Publication Data

US 2017/0339468 A1   Nov. 23, 2017

(30) Foreign Application Priority Data

May 17, 2016   (KR) ........................ 10-2016-0060045

(51) Int. Cl.
*H04N 21/482* (2011.01)
*H04N 21/462* (2011.01)
(Continued)

(52) U.S. Cl.
CPC ..... *H04N 21/4828* (2013.01); *H04N 21/4622* (2013.01); *H04N 21/4722* (2013.01);
(Continued)

(58) Field of Classification Search
CPC ............ H04N 21/4316; H04N 21/435; H04N 21/462; H04N 21/4622; H04N 21/4722;
(Continued)

(56) References Cited

U.S. PATENT DOCUMENTS 7,213,256 B1 *   5/2007   Kikinis ............. H04N 5/44543
                                                      348/E5.105
2002/0147984 A1 * 10/2002  Tomsen ............... H04N 5/4401
                                                      725/109
(Continued)

FOREIGN PATENT DOCUMENTS

EP       2124443 A1    11/2009
EP       2798529 B1     8/2019
WO   WO 2010/074867 A1  7/2010

*Primary Examiner* — James R Sheleheda
(74) *Attorney, Agent, or Firm* — Birch, Stewart, Kolasch & Birch, LLP

(57) ABSTRACT

A digital device and controlling method thereof are disclosed. The digital device according to an embodiment of the present invention includes a display unit configured to output a content and a controller. The controller is configured to obtain content information of the content being outputted, obtain at least one associated keyword corresponding to the obtained content information, retrieve at least one piece of associated information related to the content using an associated search term containing the obtained at least one associated keyword, and to output the retrieved at least one piece of the associated information.

14 Claims, 30 Drawing Sheets

(51) Int. Cl.
  *H04N 21/84* (2011.01)
  *H04N 21/4722* (2011.01)
  *H04N 21/81* (2011.01)
  *H04N 21/61* (2011.01)
(52) U.S. Cl.
  CPC ..... *H04N 21/6125* (2013.01); *H04N 21/8133* (2013.01); *H04N 21/84* (2013.01)
(58) Field of Classification Search
  CPC .. H04N 21/472; H04N 21/47; H04N 21/4828; H04N 21/6125; H04N 21/8133; H04N 21/84
  See application file for complete search history.

(56) References Cited

U.S. PATENT DOCUMENTS

| | | | | |
|---|---|---|---|---|
| 2008/0077398 | A1* | 3/2008 | Tsunokawa | G06F 17/30731 704/10 |
| 2008/0204595 | A1* | 8/2008 | Rathod | G06F 17/30796 348/465 |
| 2009/0164460 | A1 | 6/2009 | Jung et al. | |
| 2010/0042405 | A1* | 2/2010 | Tsuzuki | G06F 17/3064 704/10 |
| 2010/0262996 | A1 | 10/2010 | Chang | |
| 2010/0333142 | A1* | 12/2010 | Busse | H04N 7/17318 725/47 |
| 2011/0093904 | A1 | 4/2011 | Maruyama et al. | |
| 2011/0162010 | A1* | 6/2011 | Ellis | H04N 7/163 725/40 |
| 2012/0297437 | A1 | 11/2012 | Blank et al. | |
| 2013/0151548 | A1* | 6/2013 | Jin | G06F 16/48 707/769 |
| 2014/0130098 | A1* | 5/2014 | Kim | G06F 3/0346 725/48 |
| 2014/0195557 | A1* | 7/2014 | Oztaskent | H04N 21/233 707/769 |
| 2015/0019203 | A1 | 1/2015 | Smith et al. | |
| 2015/0074702 | A1* | 3/2015 | Bangalore | H04N 21/4884 725/18 |
| 2015/0189391 | A1* | 7/2015 | Lee | G10L 25/54 725/61 |
| 2015/0319503 | A1* | 11/2015 | Mishra | G10L 15/26 725/53 |
| 2016/0337701 | A1* | 11/2016 | Khare | H04N 21/4667 |
| 2017/0339468 | A1* | 11/2017 | Lee | H04N 21/4828 |
| 2018/0011849 | A1* | 1/2018 | Oztaskent | H04N 21/233 |
| 2018/0295423 | A1* | 10/2018 | Oztaskent | H04N 21/2665 |
| 2018/0359540 | A1* | 12/2018 | Major | H04N 21/8358 |

* cited by examiner

DIGITAL DEVICE AND CONTROLLING METHOD THEREOF

Pursuant to 35 U.S.C. § 119(a), this application claims the benefit of earlier filing date and right of priority to Korean Application No. 10-2016-0060045, filed on May 17, 2016, the contents of which are hereby incorporated by reference herein in their entirety.

BACKGROUND OF THE INVENTION

Field of the Invention

The present invention relates to a digital device and controlling method thereof, and more particularly, to a digital device for providing associated information related to a content and controlling method thereof.

Discussion of the Related Art

Recently, digital TV services using a wired or wireless communication network have been widely spread. The digital TV services may provide various services that could not be provided in typical analog broadcasting services.

For example, an internet protocol television (IPTV) service, which is one of digital TV services, provides bi-directionality allowing a user to actively select a program type, a viewing time thereof, and the like. The IPTV service may also provide various additional services, such as the Internet search, a home shopping, an online game, etc. based on the bi-directionality.

Meanwhile, since various service are available, a user can be provided with a variety of contents through digital devices such as a digital TV. However, although the user can obtain information on the provided contents through a timetable for broadcast programs such as EPG (electronic program guide), the amount of information provided to the user is limited. Accordingly, there is a problem that it is difficult for the user to access information on the contents which the user desires or requires.

SUMMARY OF THE INVENTION

Accordingly, embodiments of the present invention are directed to a digital device and controlling method thereof that substantially obviate one or more problems due to limitations and disadvantages of the related art.

One object of the present invention is to provide a digital device and controlling method thereof, by which associated information related to the content, which is being currently outputted, can be provided.

Another object of the present invention is to provide different information depending on the content of which information is being displayed, whereby a user can be provided with desired information.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a method of controlling a digital device according to the present invention may include obtaining content information of a content which is currently being outputted; obtaining at least one associated keyword corresponding to the obtained content information; retrieving at least one piece of associated information related to the content using an associated search term containing the obtained at least one associated keyword; and outputting the retrieved at least one piece of the associated information.

In another aspect of the present invention, a digital device according to the present invention may include a display unit configured to output a content and a controller. The controller may be configured to obtain content information of the content which is currently being outputted, obtain at least one associated keyword corresponding to the obtained content information, retrieve at least one piece of associated information related to the content using an associated search term containing the obtained at least one associated keyword, and to output the retrieved at least one piece of the associated information.

Accordingly, the present invention provides the following effects and/or advantages.

First of all, the digital device according to embodiments of the present invention can provide content information associated with the content being outputted, whereby a user can obtain desired information.

Secondly, the digital device according to the embodiments of the present invention can create search terms for retrieving various information provided by the content being outputted, thereby providing content information appropriate for the content.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 33 is a diagram illustrating an example of displaying an associated information search icon on an EPG screen according to various embodiments of the present invention;

FIG. 34 is a diagram illustrating an example of displaying an associated video retrieved for a selected program according to various embodiments of the present invention;

DETAILED DESCRIPTION OF THE INVENTION

Figure 1:
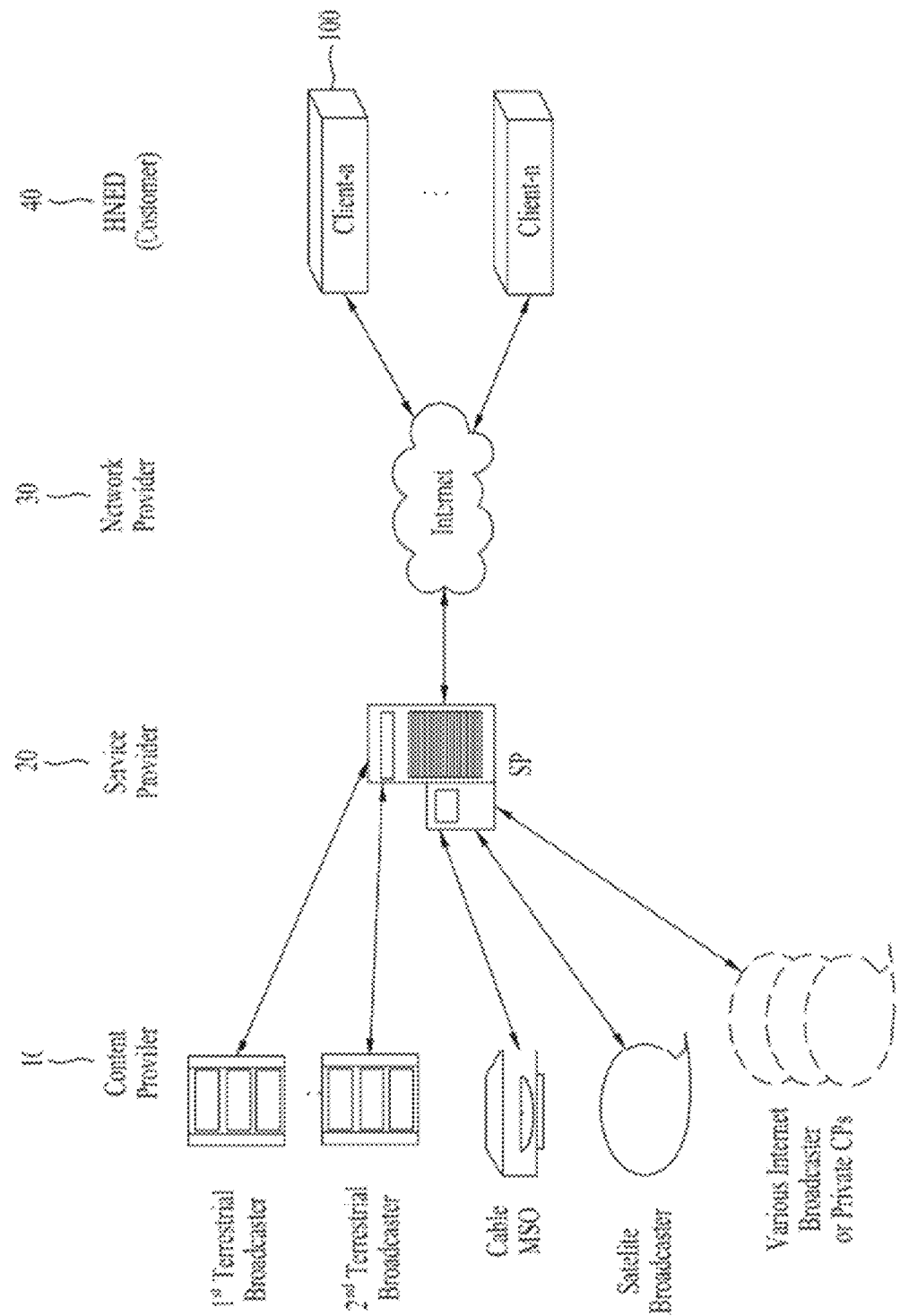
FIG. 1 is a schematic diagram illustrating a service system including a digital device according to one embodiment of the present invention.

Description will now be given in detail according to embodiments disclosed herein, with reference to the accompanying drawings.

In general, a suffix such as "module" and "unit" may be used to refer to elements or components. Use of such a suffix herein is merely intended to facilitate description of the specification, and the suffix itself is not intended to give any special meaning or function. Meanwhile, such an ordinal number as 'first-', 'second-' and the like may have a meaning of an order. Yet, the terminologies can be used for the purpose of distinguishing one component from another component capable of being overlapped with each other.

The accompanying drawings are used to help easily understand various technical features and it should be understood that the embodiments presented herein are not limited by the accompanying drawings.

As such, the present disclosure should be construed to extend to any alterations, equivalents and substitutes in addition to those which are particularly set out in the accompanying drawings.

A digital device according to the present invention as set forth herein may be any device that can handle any one of transmitting, receiving, handling and outputting data, content, servicer, application, and so forth. The digital device may be connected to other digital devices through wired network or wireless network, paired or connected to external server, and through the connections, the digital device may transmit and receive the prescribed data. Examples of the digital device may include standing devices such as a network TV, a Hybrid Broadcast Broadband TV (HBBTV), a smart TV, Internet Protocol TV (IPTV), and personal computer (PC), or mobile/handheld devices such as a Personal Digital Assistant (PDA), a smart phone, a tablet PC, or a Notebook computer. For convenience of description, in this specification, the Digital TV is used in FIG. 2 and the mobile device is used in FIG. 3 depicting the digital device. Further, the digital device in this specification may be referred to configuration having only a panel, set-top box (STB), or a set including the entire system.

Moreover, the wired or wireless network described in this specification may refer to various pairing method, standard telecommunication network protocol methods supported for transmitting and receiving data between digital devices or between digital device and external server. The wired or wireless network also includes various telecommunication network protocols supported now as well as in the future. Examples of the wired or wireless network include wired network supported by various telecommunication standard such as Universal Serial Bus (USB), Composite Video Banking Sync (CVBS), Component, S-Video (analog), Digital Visual Interface (DVI), High Definition Multimedia Interface (HDMI), RGB, D-SUB and so forth, and wireless network supported by various standards including Bluetooth, Radio Frequency Identification (RFID), infrared Data Association (IrDA), Ultra Wideband (UWB), ZigBee, Digital Living Network Alliance (DLNA), Wireless LAN (WLAN)(Wi-Fi), Wireless broadband (Wibro), World Interoperability for Microwave Access (Wimax), High Speed Downlink Packet (HSDPA), Long Term Evolution/ LTE-Advanced (LTE/LTE-A), Wi-Fi direct, and so forth.

In addition, when this specification refers simply to the digital device, it can mean a standing device or a mobile device depending on the context, and when it is not referred to a specific device, the digital device referred in this specification refers to both standing and mobile device.

Meanwhile, the digital device may perform intelligent functions such as receiving broadcasting program, operating computer functions, and supporting at least one external input, and by being connected through the network wired or wirelessly, the digital device may support e-mail functions, web browsing functions, banking, gaming, and executing applications. The digital device may further include an interface for any one of input or control means (hereinafter referred as "input means") supporting handwriting input, touch-screen, and space remote control.

Furthermore, the digital device may use a standard operating system (OS), however, the digital device described in this specification and the embodiments, uses a Web OS. Therefore, the digital device may perform functions such as adding, deleting, amending, and updating the various services and applications for standard universal OS kernel or Linux kernel in order to construct a more user-friendly environment.

When the digital device, described above, receives and handles external input, the external input includes external input devices described above, meaning all input means or digital devices, capable of transmitting and receiving data through wired or wireless network connected to and from the digital device. For example, the external input includes HDMI, game devices such as a Playstation or an X-Box, a smart phone, a tablet PC, a printing device such as a pocket photo, digital devices such as a smart TV and a blue-ray device.

The "server" referred to as in this application, includes digital device or system capable of transmitting and receiving data to and from client, and may also be referred to as a processor. For example, the server may be servers providing services such as a portal server providing web page, a web content or a web service, an advertising server providing advertising data, a content server, a Social Network Service (SNS) server providing an SNS service, a service server providing a service to a manufacturer, a Multichannel Video Programming Distributor (MVPD) providing a Video on Demand (VOD) or a streaming service, and a service server providing pay services.

In this application, when application is described for the convenience of explanation, the meaning of application in the context may include services as well as applications.

In the following description, various embodiments according to the present invention are explained with reference to attached drawings.

FIG. 1 is a schematic diagram illustrating a service system including a digital device according to one embodiment of the present invention.

Referring to FIG. 1, examples of a service system comprising a digital receiver may include a content provider (CP) 10, a service provider (SP) 20, a network provider (NP) 30, and a home network end user (HNED) (Customer) 40. The HNED 40 includes a client 100, that is, a digital device.

The CP 10 produces and provides content. Referring to FIG. 1, the CP 10 can include a first or second terrestrial broadcaster, a cable system operator (SO), a multiple system operator (MSO), a satellite broadcaster, various Internet broadcasters, private content providers (CPs), etc. The CP 10 can produce and provide various services or applications as well as broadcast content.

The SP 20 service packetizes content provided by the CP 10 and provides to HNED 40. For example, the SP 20 packetizes at least one content provided by the first or second terrestrial broadcaster, the cable SO, the MSO, the satellite broadcaster, various Internet broadcasters, the private CPs for service and provides it to the HNED 40.

The SP 20 can provide services to the client 100 in a uni-cast or multi-cast manner. Meanwhile, the SP 20 can transmit data to plurality of clients which are previously registered at once, and Internet Group Management Protocol (IGMP) may be used in transmission.

The CP 10 and the SP 20 can be configured in the form of one entity. For example, the CP 10 can function as the SP 20 by producing content and directly packetizing the produced content into services, and vice versa.

The NP 30 can provide a network environment for data exchange between the CP 10 and/or SP 20 and the client 100.

The client 100, a consumer included in the HNED 40, can construct a home network, receive data and transmit/receive data for various services or applications such as a VOD, a streaming, and the like, via the NP 30.

The CP 10 and/or SP 20 included in the service system can use a conditional access or a content protection means for protecting content transmitted. In this case, the client 100 can use processing means such as a cable card (or Point of Deployment (POD)) or a downloadable conditional access system (DCAS), for the conditional access or protecting content.

In addition, the client 100 can use a bi-directional service through a network. In this case, the client 100 can perform or function as the CP 10. And, the SP 20 can transmit it to other client.

In FIG. 1, CP 10 and/or SP 20 can be a server providing service which specifies below in the disclosure. In this case, the server can include the NP 30, if necessary. Even though not specified in the disclosure, service or service data can include not only service or application received from the external server but also an internal service or application as above-mentioned. This service or application is defined service data or application data for the client 100 based on the Web OS.

Figure 2:
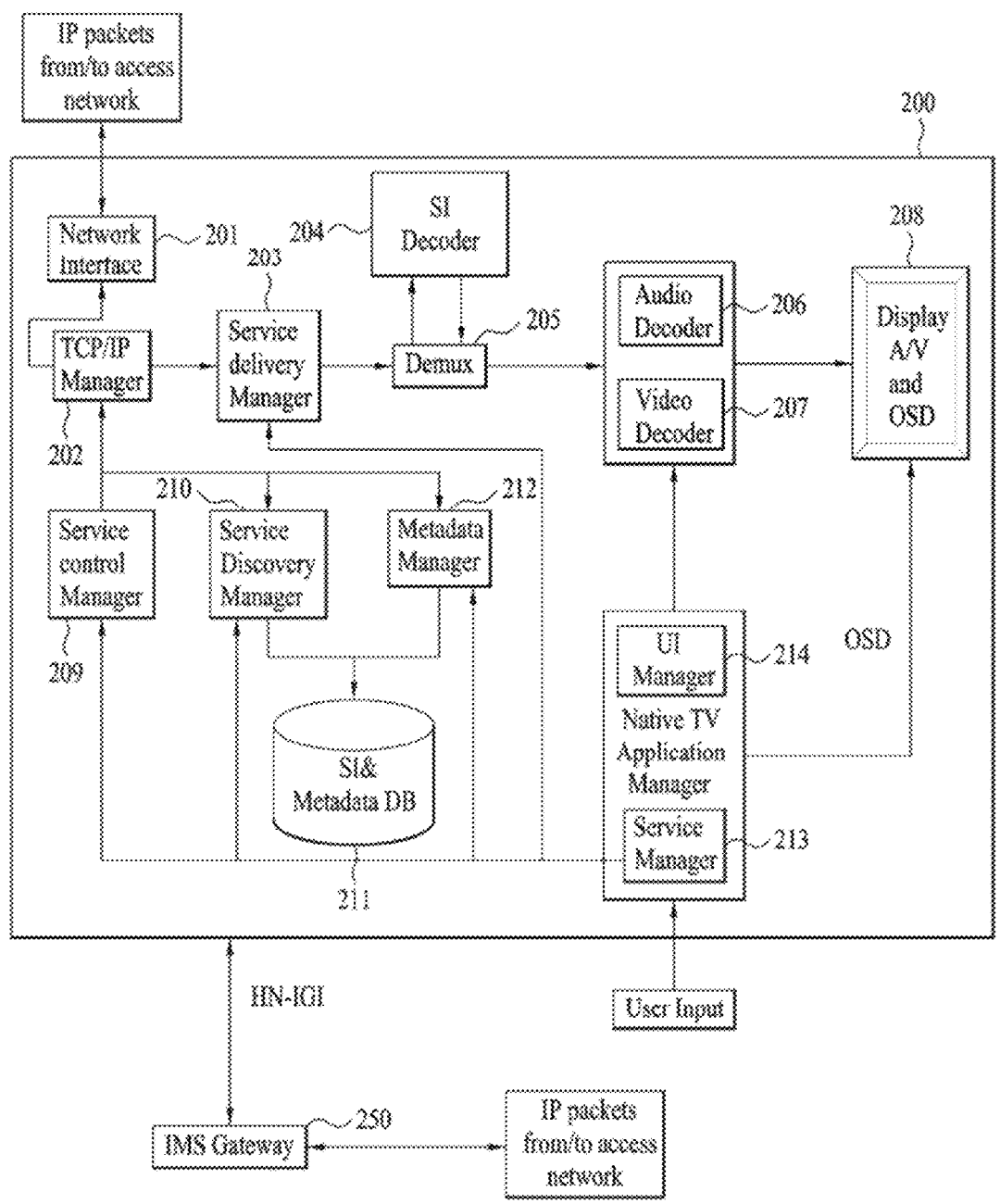
FIG. 2 is a block diagram illustrating a digital device according to one embodiment of the present invention.
Figure 3:
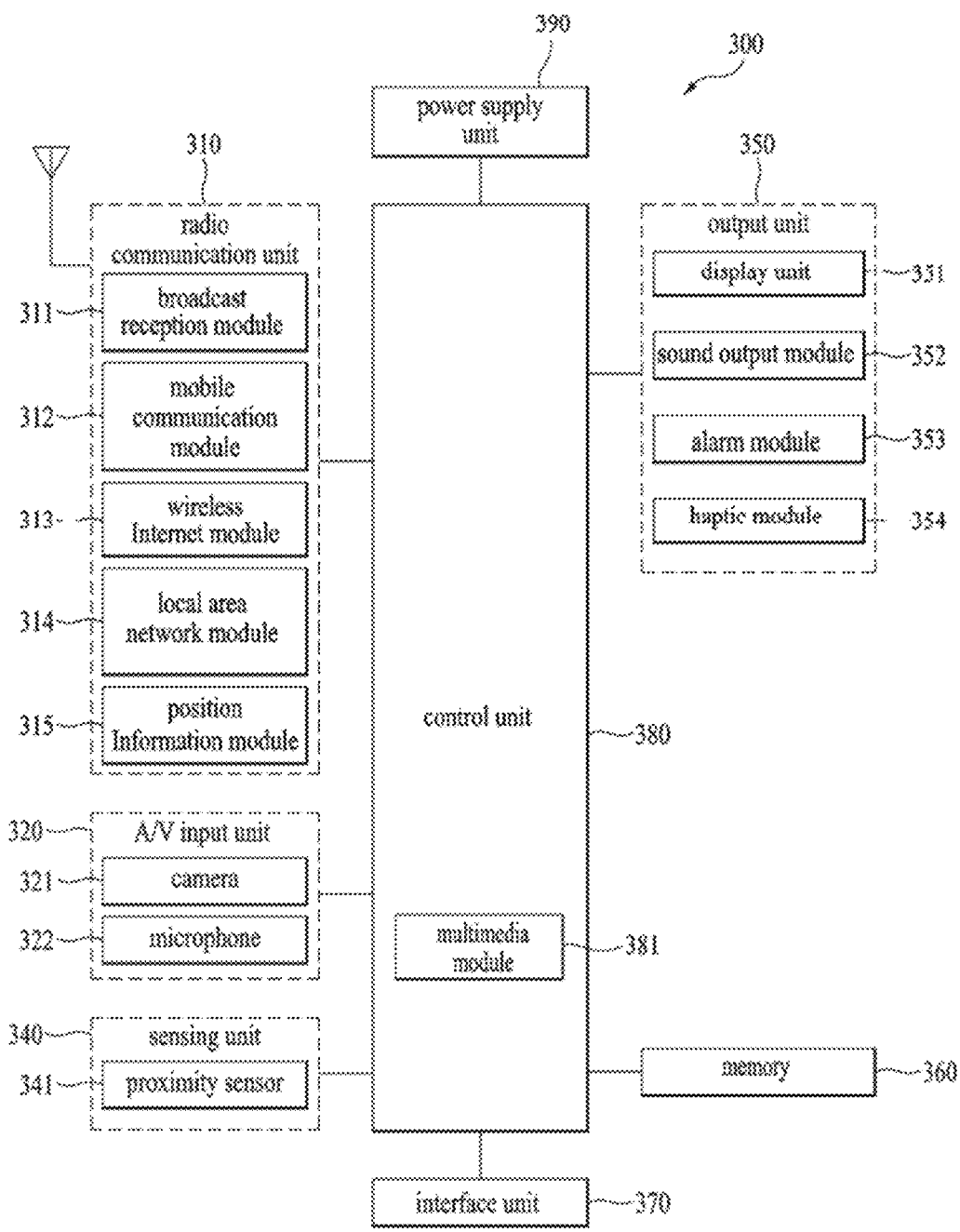
FIG. 3 is a block diagram illustrating the digital device according to another embodiment of the present invention.

FIG. 2 is a block diagram showing a digital device according to one embodiment of the present invention.

In the disclosure, the digital device can correspond to the client 100 shown in FIG. 1.

The digital device 200 can include a network interface 201, a TCP/IP (Transfer Control Protocol/Internet Protocol) manager 202, a service delivery manager 203, an SI (System Information, Service Information or Signaling Information) decoder 204, a demultiplexer 205, an audio decoder 206, a video decoder 207, a display AN (Audio/Video) and OSD (On Screen Display) module 208, a service control manager 209, a service discovery manager 210, a SI & metadata database (DB) 211, a metadata manager 212, a service manage 213, a UI (User Interface) manager 214, etc.

The network interface 201 can receive or transmit IP (Internet Protocol) packets or IP datagrams (hereinafter, referred as IP packets) through a network accessed. As an example, the network interface 201 can receive service, application, content, etc., from the SP 20 of FIG. 1 through the network.

The TCP/IP manager 202 is involved in packet delivery of IP packets transmitted to the digital device 200 and IP packets transmitted from the digital device 200 between a source and a destination. The TCP/IP manager 202 may classify received packets according to an appropriate protocol and output the classified packets to the service delivery manager 205, the service discovery manager 210, the service control manager 209, and the metadata manager 212, etc.

The service delivery manager 203 can control received service data. For example, the service delivery manager 203 can use Real-Time Protocol/Real-Time Control Protocol (RTP/RTCP) to control real-time streaming data. If the real-time streaming data is transmitted using the RTP, the service delivery manager 203 can parse a received real-time streaming data packet, transmitted based on the RTP, and transmits the parsed data packet to the demultiplexer 205 or store the parsed data packet in the SI & metadata DB 211 under the control of the service manager 213. The service delivery manager 203 can provide feedback of the network reception information to the server based on the RTCP.

The demultiplexer 205 can demultiplex audio data, video data, SI data from a received packet and transmit the demultiplexed data to each of the audio/video decoder 206/207 and the SI decoder 204.

The SI decoder 204 can decode the demultiplexed SI data such as program specific information (PSI), program and system information protocol (PSIP), digital video broadcast-service information (DVB-SI), digital television terrestrial multimedia broadcasting/coding mobile multimedia broadcasting (DTMB/CMMB), etc. The SI decoder 204 can store the decoded SI data in the SI & metadata DB 211. The SI data stored in the SI & metadata DB 211 can be read and extracted by a component which requires the SI data according to user request, for example.

The audio decoder 206 and the video decoder 207 can decode the demultiplexed audio and video data, respectively. The decoded audio data and video data can be provided to the user through the display unit 208.

The application manager can include the service manager 213 and the UI manager 214, for example. The application manager can perform a function of the controller of the digital device 200. In other words, the application manager can administrate the overall state of the digital receiver 200, provides a UI, and manage other mangers.

The UI manager 214 can provide a graphic user interface (GUI)/UI for the user using OSD, etc. And, the UI manager 214 can receive a key input from the user and perform an operation of the device in response to the received key input. For example, the UI manager 214 can transmit a key input signal to the service manager 213 if the key input signal of selecting a channel is received from the user.

The service manager 213 can control service-related managers such as the service delivery manager 203, the service discovery manager 210, the service control manager 209, and the metadata manager 212.

The service manager 213 can generate a channel map and control a channel selection using the generated channel map according to the received key input from the UI manager 214. The service manager 213 can receive service information from the SI decoder 204 and set audio/video PID (packet identifier) of a selected channel to the demultiplexer 205. The set audio/video PID can be used for the demultiplexing procedure. Accordingly, the demultiplexer 205 can filter the audio data, video data and SI data using the PID (PID filtering or section filtering.)

The service discovery manager 210 can provide information required to select a service provider that provides a service. Upon receipt of a signal for selecting a channel from the service manager 213, the service discovery manager 210 discovers or searches a service based on the received signal.

The service control manager 209 can select and control a service. For example, the service control manager 209 can use perform service selection and control using IGMP or real time streaming protocol (RTSP) when the user selects a live broadcast service, and using RTSP when the user selects a VOD service. The RTSP can provide a trick mode for the real-time streaming. Also, the service manager 213 can initialized and manage a session through the IMS (IP Multimedia Subsystem) gateway 250 using IMS and SIP (Session Initiation Protocol.) The above protocols are just an example and other protocols can be used depending on an implementation.

The metadata manager 212 can manage metadata regarding services and store metadata in the SI & metadata DB 211.

The SI & metadata DB 211 can store SI data decoded by the SI decoder 204, metadata managed by the metadata manager 212, and information required to select a service provider, which is provided by the service discovery manager 210. In addition, the SI & metadata DB 211 can store system set-up data, etc.

The SI & metadata DB 211 can be implemented using a Non-Volatile RAM (NVRAM) or a Flash memory, and the like.

An IMS gateway 250 can be a gateway that collects functions required to access IPTV services based on an IMS.

FIG. 3 is a block diagram illustrating the digital device according to another embodiment of the present invention.

FIG. 2 explained above refers to a standing device as according to an embodiment of the digital device, but FIG. 3 refers to a mobile device as another embodiment of the digital device With reference to FIG. 3, the mobile terminal 300 can include a wireless communication unit 310, an A/V input unit 320, an user input unit 330, a sensing unit 340, an output unit 350, a memory 360, an interface unit 370, a controller 380, and a power supply unit 390.

Each element is explained in detail as follows.

The wireless communication unit 310 typically includes one or more components which permit wireless communication between the mobile terminal 300 and a wireless communication system or network within which the mobile terminal 300 is located. For instance, the wireless communication unit 310 can include a broadcast receiving module 311, a mobile communication module 312, a wireless Internet module 313, a short-range communication module 314, and a position-location module 315.

The broadcast receiving module 311 receives a broadcast signal and/or broadcast associated information from an external broadcast managing server via a broadcast channel. The broadcast channel may include a satellite channel and a terrestrial channel. At least two broadcast receiving modules 311 can be provided in the mobile terminal 300 to facilitate simultaneous reception of at least two broadcast channels or broadcast channel switching.

The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 312.

The broadcast associated information can be implemented in various forms. For instance, broadcast associated information may include an electronic program guide (EPG) and an electronic service guide (ESG).

The broadcast receiving module 311 may be configured to receive broadcast signals transmitted from various types of broadcast systems. By non-limiting example, such broadcasting systems may include digital video broadcasting-Terrestrial (DVB-T), DVB-Satellite (DVB-S), DVB-Handheld (DVB-H), DVB-Convergence of Broadcasting and Mobile Services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 311 can be configured to be suitable for other broadcasting systems as well as the above-noted digital broadcasting systems.

The broadcast signal and/or broadcast associated information received by the broadcast receiving module 311 may be stored in a suitable device, such as the memory 360.

The mobile communication module 312 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals may carry audio, video, and data according to text/multimedia messages.

The wireless Internet module 313 supports Internet access for the mobile terminal 300. This module may be internally or externally coupled to the mobile terminal 300. The wireless Internet technology can include WLAN (Wi-Fi), Wibro, Wimax, or HSDPA.

The short-range communication module 314 facilitates relatively short-range communications. Suitable technologies for implementing this module include RFID, IrDA, UWB, as well as the networking technologies commonly referred to as Bluetooth™ and ZigBee™, to name a few.

The position-location module 315 identifies or otherwise obtains the location of the mobile terminal 100. According to one embodiment, this module may be implemented with a global positioning system (GPS) module. The GPS module 315 can precisely calculate current 3-dimensional position information based on at least longitude, latitude or altitude and direction (or orientation) by calculating distance information and precise time information from at least three satellites and then applying triangulation to the calculated information. Location information and time information are calculated using three satellites, and errors of the calculated location position and one or more time information are then amended (or corrected) using another satellite. In addition, the GPS module 315 can calculate speed information by continuously calculating a real-time current location.

With continued reference to FIG. 3, the A/V input unit 320 is configured to provide audio or video signal input to the mobile terminal 300. As shown, the A/V input unit 320 includes a camera 321 and a microphone 322. The camera 321 receives and processes image frames of still pictures or video, which are obtained by an image sensor in a video call mode or a photographing mode. Furthermore, the processed image frames can be displayed on the display 351.

The image frames processed by the camera 321 can be stored in the memory 360 or can be transmitted to an external recipient via the wireless communication unit 310. Optionally, at least two cameras 321 can be provided in the mobile terminal 300 according to the environment of usage.

The microphone 322 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 312 in a call mode. The microphone 322 typically includes assorted noise removing algorithms to remove noise generated in the course of receiving the external audio signal.

The user input unit 330 generates input data responsive to user manipulation of an associated input device or devices. Examples of such devices include a keypad, a dome switch, a touchpad (e.g., static pressure/capacitance), a jog wheel, and a jog switch.

The sensing unit 340 provides sensing signals for controlling operations of the mobile terminal 300 using status measurements of various aspects of the mobile terminal. For instance, the sensing unit 340 may detect an open/closed status of the mobile terminal 100, the relative positioning of components (e.g., a display and keypad) of the mobile terminal 300, a change of position (or location) of the mobile terminal 300 or a component of the mobile terminal 300, a presence or absence of user contact with the mobile terminal 300, and an orientation or acceleration/deceleration of the mobile terminal 300. As an example, a mobile terminal 300 configured as a slide-type mobile terminal is considered. In this configuration, the sensing unit 340 may sense whether a sliding portion of the mobile terminal is open or closed. According to other examples, the sensing unit 340 senses the presence or absence of power provided by the power supply unit 390, and the presence or absence of a coupling or other connection between the interface unit 370 and an external device. According to one embodiment, the sensing unit 340 can include a proximity sensor 341.

The output unit 350 generates output relevant to the senses of sight, hearing, and touch. Furthermore, the output unit 350 includes the display 351, an audio output module 352, an alarm unit 353, a haptic module 354, and a projector module 355.

The display 351 is typically implemented to visually display (output) information associated with the mobile terminal 300. For instance, if the mobile terminal is operating in a phone call mode, the display will generally provide a UI or GUI which includes information associated with placing, conducting, and terminating a phone call. As another example, if the mobile terminal 300 is in a video call mode or a photographing mode, the display 351 may additionally or alternatively display images which are associated with these modes, the UI or the GUI.

The display module 351 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 300 may include one or more of such displays.

Some of the displays can be implemented in a transparent or optical transmittive type. i.e., a transparent display. A representative example of the transparent display is the TOLED (Transparent OLED). A rear configuration of the display 351 can be implemented as the optical transmittive type as well. In this configuration, a user can see an object located at the rear of a terminal body on a portion of the display 351 of the terminal body.

At least two displays 351 can be provided in the mobile terminal 300 in accordance with one embodiment of the mobile terminal 300. For instance, a plurality of displays can be arranged to be spaced apart from each other or to form a single body on a single face of the mobile terminal 300. Alternatively, a plurality of displays can be arranged on different faces of the mobile terminal 300.

If the display 351 and a sensor for detecting a touch action (hereinafter called 'touch sensor') are configured as a mutual layer structure (hereinafter called 'touch screen'), the display 351 is usable as an input device as well as an output device. In this case, the touch sensor can be configured as a touch film, a touch sheet, or a touchpad.

The touch sensor can be configured to convert pressure applied to a specific portion of the display 351 or a variation of capacitance generated from a specific portion of the display 351 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 380. Therefore, the controller 380 is made aware when a prescribed portion of the display 351 is touched.

A proximity sensor 341 can be provided at an internal area of the mobile terminal 300 enclosed by the touch screen or around the touch screen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 341 is more durable than a contact type sensor and also has utility broader than the contact type sensor.

For example, the proximity sensor 341 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touch screen includes the electrostatic capacity proximity sensor, it is configured to detect the proximity of a pointer using a variation of an electric field according to the proximity of the pointer. In this configuration, the touch screen (touch sensor) can be considered as the proximity sensor.

For clarity and convenience of explanation, an action for enabling the pointer approaching the touch screen to be recognized as placed on the touch screen may be named 'proximity touch' and an action of enabling the pointer to actually come into contact with the touch screen may named 'contact touch'. And, a position, at which the proximity touch is made to the touch screen using the pointer, may mean a position of the pointer vertically corresponding to the touch screen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touch screen.

The audio output module 352 functions in various modes including a call-receiving mode, a call-placing mode, a recording mode, a voice recognition mode, and a broadcast reception mode to output audio data which is received from the wireless communication unit 310 or is stored in the memory 360. During operation, the audio output module 352 outputs audio relating to a particular function (e.g., call received, message received). The audio output module 352 may be implemented using one or more speakers, buzzers, other audio producing devices, and combinations of these devices.

The alarm unit 353 outputs a signal for announcing the occurrence of a particular event associated with the mobile terminal 300. Typical events include a call received, a message received and a touch input received. The alarm unit 353 can output a signal for announcing the event occurrence by way of vibration as well as video or audio signal. The video or audio signal can be output via the display 351 or the audio output module 352. Hence, the display 351 or the audio output module 352 can be regarded as a part of the alarm unit 353.

The haptic module 354 generates various tactile effects that can be sensed by a user. Vibration is a representative one of the tactile effects generated by the haptic module 354. The strength and pattern of the vibration generated by the haptic module 354 are controllable. For instance, different vibrations can be output by being synthesized together or can be output in sequence. The haptic module 354 can generate various tactile effects as well as the vibration. For instance, the haptic module 354 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device. The haptic module 354 can be implemented to enable a user to sense the tactile effect through a muscle sense of a finger or an arm as well as to transfer the tactile effect through direct contact. Optionally, at least two haptic modules 354 can be provided in the mobile terminal 300 in accordance with an embodiment of the mobile terminal 300.

The memory 360 is generally used to store various types of data to support the processing, control, and storage requirements of the mobile terminal 300. Examples of such data include program instructions for applications operating on the mobile terminal 300, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 360. Moreover, data for various patterns of vibration and/or sound output in response to a touch input to the touch screen can be stored in the memory 360.

The memory 360 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 300 can operate in association with a web storage for performing a storage function of the memory 360 on the Internet.

The interface unit 370 may be implemented to couple the mobile terminal 100 with external devices. The interface unit 370 receives data from the external devices or is supplied with power and then transfers the data or power to the respective elements of the mobile terminal 300 or enables data within the mobile terminal 300 to be transferred to the external devices. The interface unit 370 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 300 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectible to the mobile terminal 300 via the corresponding port.

When the mobile terminal 300 is connected to an external cradle, the interface unit 370 becomes a passage for supplying the mobile terminal 300 with a power from the cradle or a passage for delivering various command signals input from the cradle by a user to the mobile terminal 300. Each of the various command signals input from the cradle or the power can operate as a signal enabling the mobile terminal 300 to recognize that it is correctly loaded in the cradle.

The controller 380 typically controls the overall operations of the mobile terminal 300. For example, the controller 380 performs the control and processing associated with voice calls, data communications, and video calls. The controller 380 may include a multimedia module 381 that provides multimedia playback. The multimedia module 381 may be configured as part of the controller 380, or implemented as a separate component. Moreover, the controller 380 can perform a pattern (or image) recognizing process for recognizing a writing input and a picture drawing input performed on the touch screen as characters or images, respectively.

The power supply unit 390 provides power required by various components of the mobile terminal 300. The power may be internal power, external power, or combinations of internal and external power.

Various embodiments described herein may be implemented in a computer-readable medium using, for example, computer software, hardware, or some combination of computer software and hardware.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 160, and executed by a controller or processor, such as the controller 380.

Figure 4:
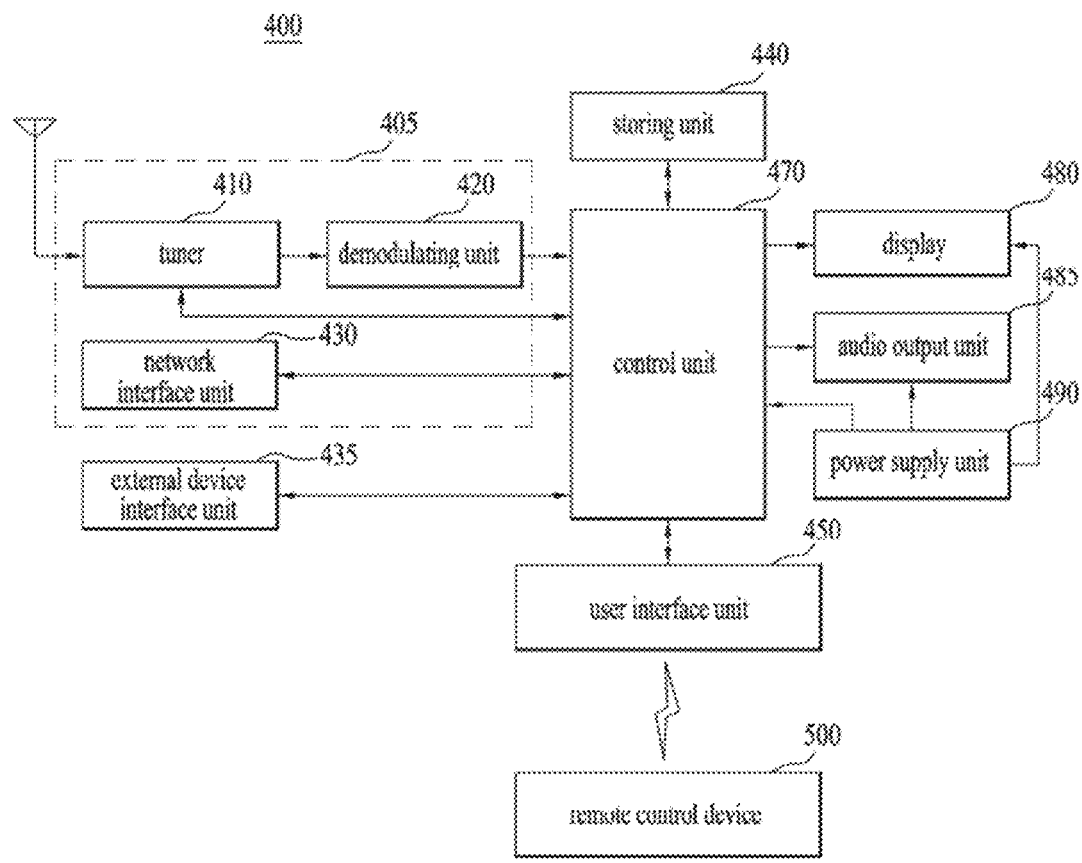
FIG. 4 is a block diagram illustrating the digital device according to the other embodiment of the present invention.

FIG. 4 is a block diagram illustrating the digital device according to the other embodiment of the present invention.

The digital device 400 according to another embodiment of the present invention can include a broadcast receiving unit 405, an external device interface 435, a storage unit 440, a user input interface 450, a controller 470, a display unit 480, an audio output unit 485, a power supply unit 490, and a photographing unit (not shown). Here, the broadcast receiving unit 305 can include at least one of tuner 410 and a demodulator 420, and a network interface 430. The broadcast receiving unit 405 can include the tuner 410 and the demodulator 420 without the network interface 430, or can include the network interface 430 without the tuner 410 and the demodulator 420. The broadcast receiving unit 405 can include a multiplexer (not shown) to multiplex a signal, which is demodulated by the demodulator 420 via the tuner 410, and a signal received through the network interface 40. In addition, the broadcast receiving unit 405 can include a demultiplexer (not shown) and demultiplex a multiplexed signal, a demodulated signal, or a signal received through the network interface 430.

The tuner 410 can receive a radio frequency (RF) broadcast signal, through an antenna, by tuning to a channel selected by the user or all previously stored channels. Also, the tuner 410 can convert the received RF broadcast signal into an IF (Intermediate Frequency) signal or a baseband signal.

For example, if the received RF broadcast signal is a digital broadcast signal, it is converted to a digital IF (DIF) signal, and if the received RF broadcast signal is an analog broadcast signal, it is converted to an analog baseband image or a voice signal (CVBS/SIF). That is, the tuner 410 can process both the digital broadcast signal and the analog broadcast signal. The analog baseband image or a voice signal (CVBS/SIF) output from the tuner 410 can be directly input to the controller 470.

The tuner 410 can receive a RF broadcast signal of single carrier or multiple carriers. The tuner 410 can sequentially tune and receive a RF broadcast signal of all broadcast channel stored by a channel memory function among RF broadcast signal received through an antenna to. And, the tuner 410 can covert the received RF broadcast signal into the DIF (Digital Intermediate Frequency or baseband frequency.)

The demodulator 420 receives the DIF signal, demodulates the received DIF signal, and performs a channel decoding, etc. For this, the demodulator 420 includes a trellis decoder, a de-interleaver, a Reed-Solomon decoder, etc., or includes a convolution decoder, the de-interleaver, the Reed-Solomon decoder, etc.

The demodulator 420 can outputs a transport stream (TS) after performing a demodulation and a channel decoding. At this time, the TS signal can be a signal by multiplexing a video signal, an audio signal or a data signal. As an example, the TS signal can be an MPEG-2 TS by multiplexing an MPEG-2 standard video signal, a Dolby (AC-3 standard) audio signal, etc.

A TS signal output from the demodulator 420 can be input to the controller 470. The controller 470 can control demultiplexing, processing audio/video signal, etc. Furthermore, the controller 470 can control outputting video through the display unit 480 and outputting audio through the audio output unit 485.

The external device interface 435 can provide an environment for interfacing external devices with the digital device 400. To implement this, the external device interface 435 can include an A/V input/output unit (not shown) or an RF communication unit (not shown).

The external device interface 435 can be connected with external devices such as a digital versatile disk (DVD), a Blu-ray player, a game device, a camera, a camcorder, a computer (notebook computer), a tablet PC, a smart phone, a Bluetooth device, a Cloud and the like in a wired/wireless manner. The external device interface 435 transfer a signal to the controller 470 of the digital device. The signal includes image data, video data, audio data which is input through an external device. The external device is connected to the digital device. The controller 470 can control to output the signal including the processed image data, the processed video data and the processed audio data to the connected external device. For this, the external device interface 435 can further include an A/V input/output unit (not shown) or a wireless communication unit (not shown).

The A/V input/output unit may include a USB terminal, a CVBS terminal, a component terminal, an S-video terminal (analog), a DVI terminal, a HDMI terminal, an RGB terminal, a D-SUB terminal, etc.

The RF communication unit can perform near field communication. The digital receiver 400 can be networked with other electronic apparatuses according to communication protocols such as Bluetooth, RFID, IrDA. UWB. ZigBee, and DLNA, for example.

Also, the external device interface 435 can connect a STB via at least one interface described above, and perform an input/output operation with the connected STB.

Meanwhile, the external device interface 435 can receive application or application list included in a nearby external device, and can transfer the application or the application list to the controller 470 or the storage unit 440.

The network interface 430 may provide an interface for connecting the digital receiver 400 to wired/wireless networks. For example, the network interface 430 includes an Ethernet port for connecting to a wire network and, WLAN (Wi-Fi), Wibro, Wimax, HSDPA, and the like for connecting to a wireless network.

Using the network interface 430, the digital receiver can transmit/receive data to/from other users or other electronic apparatuses or access a predetermined web page through a network connected thereto or another network linked to the connected network. Especially, the network interface 430 can transmit some part of content data stored in the digital device 400 to another user pre-registered in the digital device 400, a selected user of another digital device, or a selected digital device.

Meanwhile, the network interface 430 can connect a web page via a connected network or another network linked to the connected network. That is, the network interface 430 can transmit or receive data to/from a corresponding server by connecting the web page through the network. Additionally, the network interface 430 can receive content or data from a CP or an NP. In other words, the network interface 430 can receive the content and the content related to a movie, a commercial, a game, a VOD, a broadcast signal, and the like from the CP or the NP through the network. Also, the network interface 430 can receive update information of a firmware and an update file from the NP. And, the network interface 430 can transmit data to an internet provider, CP or NP.

Also, the network interface 430 can select a wanted application among open applications and the selected application via a network.

The storage unit 440 may store programs for signal processing and control and store a processed video, audio or data signal.

In addition, the storage unit 440 may execute a function of temporarily storing a video, audio or data signal input from the external device interface 435 or the network interface 430. The storage unit 440 may store information about a predetermined broadcast channel through a channel memory function.

The storage unit 440 can store an application or a list of applications input from the external device interface 435 or the network interface 430.

The storage unit 440 may store various platforms which will be described later.

The storage unit 440 can include storage media of one or more types, such as a flash memory type, a hard disk type, a multimedia card micro type, a card type memory (e.g. SD or XD memory), RAM, EEPROM, etc. The digital receiver 400 may reproduce content files (a video file, a still image file, a music file, a text file, an application file, etc.) and provide them to the user.

While FIG. 4 illustrates an embodiment in which the storage unit 440 is separated from the controller 470, the configuration of the digital receiver 400 is not limited thereto and the storage unit 440 may be included in the controller 470.

The user input interface 450 may transmit a signal input by the user to the controller 470 or deliver a signal output from the controller 470 to the user.

For example, the user input interface 450 can receive control signals such as a power on/off signal, a channel selection signal, an image setting signal, etc. from the remote controller 500 or transmit control signals of the controller 470 to the remote controller 500 according to various communication schemes such as RF communication, IR communication, and the like.

The user input interface 450 can transmit control signals input through a power key, a channel key, a volume key, and a local key (not shown) of a set value to the controller 470.

The user input interface 450 can transmit a control signal input from a sensing unit (not shown) which senses a gesture of the user or deliver a signal of the controller 470 to the sensing unit (not shown). Here, the sensing unit (not shown) may include a touch sensor, a voice sensor, a position sensor, an action sensor, an acceleration sensor, a gyro sensor, a speed sensor, a tilt sensor, a temperature sensor, a pressure or back-pressure sensor, etc.

The controller 470 can generate and output a signal for video or audio output by demultiplexing streams input through the tuner 410, the demodulator 420 or the external device interface 435 or processing demultiplexed signals.

A video signal processed by the controller 470 can be input to the display unit 380 and displayed as an image through the display unit 480. In addition, the video signal processed by the controller 470 can be input to an external output device through the external device interface 435.

An audio signal processed by the controller 470 can be applied to the audio output unit 485. Otherwise, the audio signal processed by the controller 470 can be applied to an external output device through the external device interface 435.

The controller 470 may include a demultiplexer and an image processor, which are not shown in FIG. 4.

The controller 470 can control the overall operation of the digital receiver 300. For example, the controller 470 can control the tuner 410 to tune to an RF broadcast corresponding to a channel selected by the user or a previously stored channel.

The controller 470 can control the digital receiver 400 according to a user command input through the user input interface 450 or an internal program. Particularly, the controller 470 can control the digital receiver 400 to be linked to a network to download an application or application list that the user desires to the digital receiver 400.

For example, the controller 470 may control the tuner 410 to receive a signal of a channel selected in response to a predetermined channel selection command received through the user input interface 450. In addition, the controller 470 may process a video, audio or data signal corresponding to the selected channel. The controller 470 may control information on a channel selected by the user to be output with a processed video or audio signal through the display unit 480 or the audio output unit 485.

Alternatively, the controller 470 may control a video signal or an audio signal received from an external apparatus, for example, a camera or a camcorder through the external device interface 435 to be output through the display unit 480 or the audio output unit 485 according to an external device image reproduction command received through the user input interface 450.

The controller 470 can control the display unit 480 to display images. For example, the controller 470 can control a broadcast image input through the tuner 410, an external input image received through the external device interface 435, an image input through the network interface 430, or an image stored in the storage unit 440 to be displayed on the display unit 480. Here, an image displayed on the display unit 480 can be a still image or video, and it can be a 2D or 3D image.

The controller 470 can control reproduction of content. Here, the content may be content stored in the digital receiver 400, received broadcast content, or content input from an external device. The content may include at least one of a broadcast image, an external input image, an audio file, a still image, an image of a linked web, and a text file.

The controller 470 can control display of applications or an application list, downloadable from the digital receiver 400 or an external network, when an application view menu is selected.

The controller 470 can control installation and execution of applications downloaded from an external network in addition to various UIs. Furthermore, the controller 470 can control an image relating to an application executed by user selection to be displayed on the display unit 480.

The digital receiver 400 may further include a channel browsing processor (not shown) which generates a thumbnail image corresponding to a channel signal or an external input signal.

The channel browsing processor can receive a stream signal (e.g., TS) output from the demodulator 420 or a stream signal output from the external device interface 435 and extract an image from the received stream signal to generate a thumbnail image. The generated thumbnail image can be directly input to the controller 470 or can be encoded and then input to the controller 470. Also, the thumbnail image can be coded into a stream and then applied to the controller 470. The controller 470 can display a thumbnail list including a plurality of thumbnail images on the display unit 480 using thumbnail images input thereto. The thumbnail images included in the thumbnail list can be updated sequentially or simultaneously. Accordingly, the user can conveniently check content of a plurality of broadcast channels.

The display unit 480 may convert a video signal, a data signal, and an OSD signal processed by the controller 470 and a video signal and a data signal received from the external device interface 435 into RGB signals to generate driving signals.

The display unit 480 may be a PDP, an LCD, an OLED, a flexible display, a 3D display or the like.

The display unit 480 may be configured as a touch-screen and used as an input device rather than an output device.

The audio output unit 485 receives a signal audio-processed by the controller 470, for example, a stereo signal, a 3.1 channel signal or a 5.1 channel signal, and outputs the received signal as audio. The audio output unit 485 can be configured as one of various speakers.

The digital receiver 400 may further include the sensing unit (not shown) for sensing a gesture of the user, which includes at least one of a touch sensor, a voice sensor, a position sensor, and an action sensor, as described above. A signal sensed by the sensing unit (not shown) can be delivered to the controller 470 through the user input interface 450.

The digital receiver 400 may further include the photographing unit (not shown) for photographing the user. Image information acquired by the photographing unit (not shown) can be supplied to the controller 470.

The controller 470 may sense a gesture of the user from an image captured by the photographing unit (not shown) or a signal sensed by the sensing unit (not shown), or by combining the image and the signal.

The power supply unit 490 may supply power to the digital receiver 400.

Particularly, the power supply unit 490 can supply power to the controller 470 which can be implemented as a system-on-chip (SoC), the display unit 480 for displaying images, and the audio output unit 485 for audio output.

The power supply unit 490 can include a converter (not shown) converting a alternating source into a direct source. For example, when the display unit 480 is implemented as a liquid panel including a plurality of backlight lamps, the power supply unit 490 can include an inverter (not shown) which is capable of performing a Pulse Width Modulation (PWM) for changing or dimming a luminance.

The remote controller 500 may transmit user input to the user input interface 450. To achieve this, the remote controller 500 can use Bluetooth, RF communication, IR communication, UWB, ZigBee, etc.

In addition, the remote controller 500 can receive audio, video or data signal output from the user input interface 350 and display the received signal or output the same as audio or vibration.

The above-mentioned digital device 400 can be a digital broadcast receiver which is capable of processing a digital broadcast signal of a fixed or mobile ATSC method, or a digital broadcast signal of a DVB method.

Some of the components shown in FIG. 2 may be omitted or a component (not shown in FIG. 2) may be added as required. The digital receiver according to the present invention may not include the tuner and the demodulator, differently from the digital receivers shown in FIGS. 2 and 4, and may receive content through the network interface or the external device interface and reproduce the content.

Figure 5:
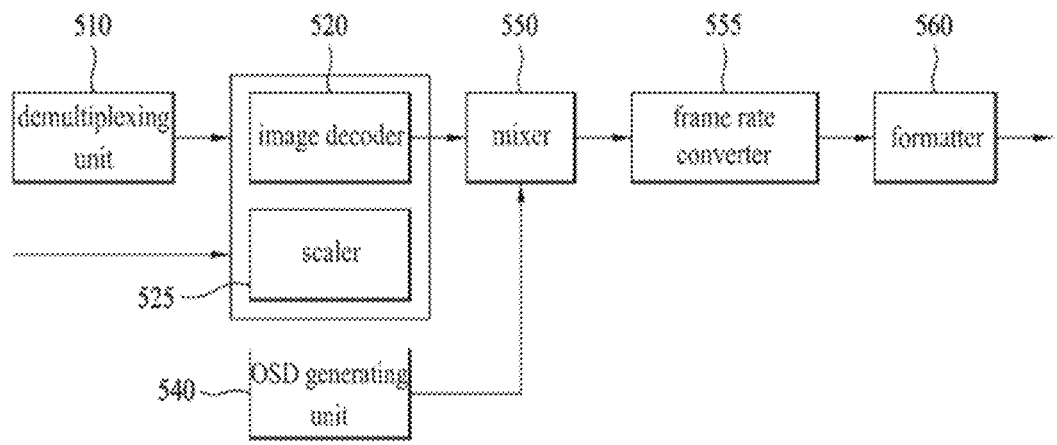
FIG. 5 is a block diagram illustrating the detailed configuration of each of controllers of FIGS. 2 to 4 according to one embodiment of the present invention.

FIG. 5 is a block diagram illustrating the detailed configuration of each of controllers of FIGS. 2 to 4 according to one embodiment of the present invention.

The digital receiver according to the present invention may include a demultiplexer 510, an image processor 520, an OSD generator 540, a mixer 550, a frame rate converter (FRC) 555, and a 3D formatter (or an Output formatter) 560.

The demultiplexer 510 can demultiplex an input stream signal into an MPEG-2 TS image, an audio signal and a data signal, for example.

The image processor 420 can process a demultiplexed image signal using a video decoder 525 and a scaler 535.

The video decoder 525 can decode the demultiplexed image signal and the scaler 535 can scale the resolution of the decoded image signal such that the image signal can be displayed.

The video decoder 525 can support various standards. For example, the video decoder 525 can perform a function as an MPEG-2 decoder when the video signal is coded in an MPEG-2 standard. The video decoder 525 can perform a function as a H.264 decoder when the video signal is coded in a digital multimedia broadcasting (DMB) method or the H. 264 standard method.

The image signal decoded by the image processor 520 may be input to the mixer 550.

The OSD generator 540 may generate OSD data automatically or according to user input. For example, the OSD generator 540 may generate data to be displayed on the screen of an output unit in the form of an image or text on the basis of a control signal of a user input interface. OSD data generated by the OSD generator 540 may include various data such as a UI image of the digital receiver, various menu screens, widget, icons, and information on ratings. The OSD generator 540 can generate a caption of a broadcast image or data for displaying EPG based broadcast information.

The mixer 550 may mix the OSD data generated by the OSD generator 540 and the image signal processed by the image processor 520. The mixer 550 may provide the mixed signal to the 3D formatter 560. By mixing the decoded image signal and the OSD data, OSD may be overlaid on a broadcast image or external input image.

The frame rate converter (FRC) 555 may convert a frame rate of input video. For example, the frame rate converter 555 can convert the frame rate of an input 60 Hz video to a frame rate of 120 Hz or 240 Hz, according to an output frequency of the output unit. The frame rate converter 555 may be bypassed when frame conversion is not executed.

The 3D formatter 560 may change the output of the frame rate converter 555, which is input thereto, into a form suitable for the output format of the output unit. For example, the 3D formatter 560 can output an RGB data signal. In this case, this RGB data signal can be output according to low voltage differential signaling (LVDS) or mini-LVDS. When a 3D image signal output from the frame rate converter 555 is input to the 3D formatter 560, the 3D formatter 560 can format the 3D image signal such that the 3D image signal is matched to the output format of the output unit, to thereby support a 3D service.

An audio processor (not shown) may audio-process a demultiplexed audio signal. The audio processor (not shown) can support various audio formats. For example, when audio signals are encoded in MPEG-2, MPEG-4, advanced audio coding (AAC), high efficiency-AAC (HE-AAC), AC-3 and bit sliced audio coding (BSAC) formats, the audio processor (not shown) can include decoders corresponding to the formats to process the audio signals.

Furthermore, the audio processor (not shown) can control base, treble and volume.

In addition, a data processor (not shown) can process a demultiplexed data signal. For example, when a demultiplexed data signal is encoded, the data processor (not shown) can decode the encoded demultiplexed data signal. Here, the encoded data signal may be EPG information including broadcast information such as the start time and end time (or duration) of a broadcast program which is broadcast through each channel.

Meanwhile, the above-mentioned digital device, as an embodiment according to the present invention, each component can be integrated, added or omitted according to a capability of the digital device which is actually implemented. That is, if necessary, at least two components are united into a single component or a single component is divided into at least two components. Also, a function performed by each block explains an embodiment of the present invention, the specific operation or device is not limited to a scope of the present invention.

Meanwhile, the digital device can be an image signal processing device for performing a signal of an input image or an image stored in the device. Other example of the image signal device can be a STB which does not include the display unit 480 and the audio output unit 485 shown in FIG. 4, a DVD player, a Blu-ray player, a game device, a computer, etc.

Figure 6:
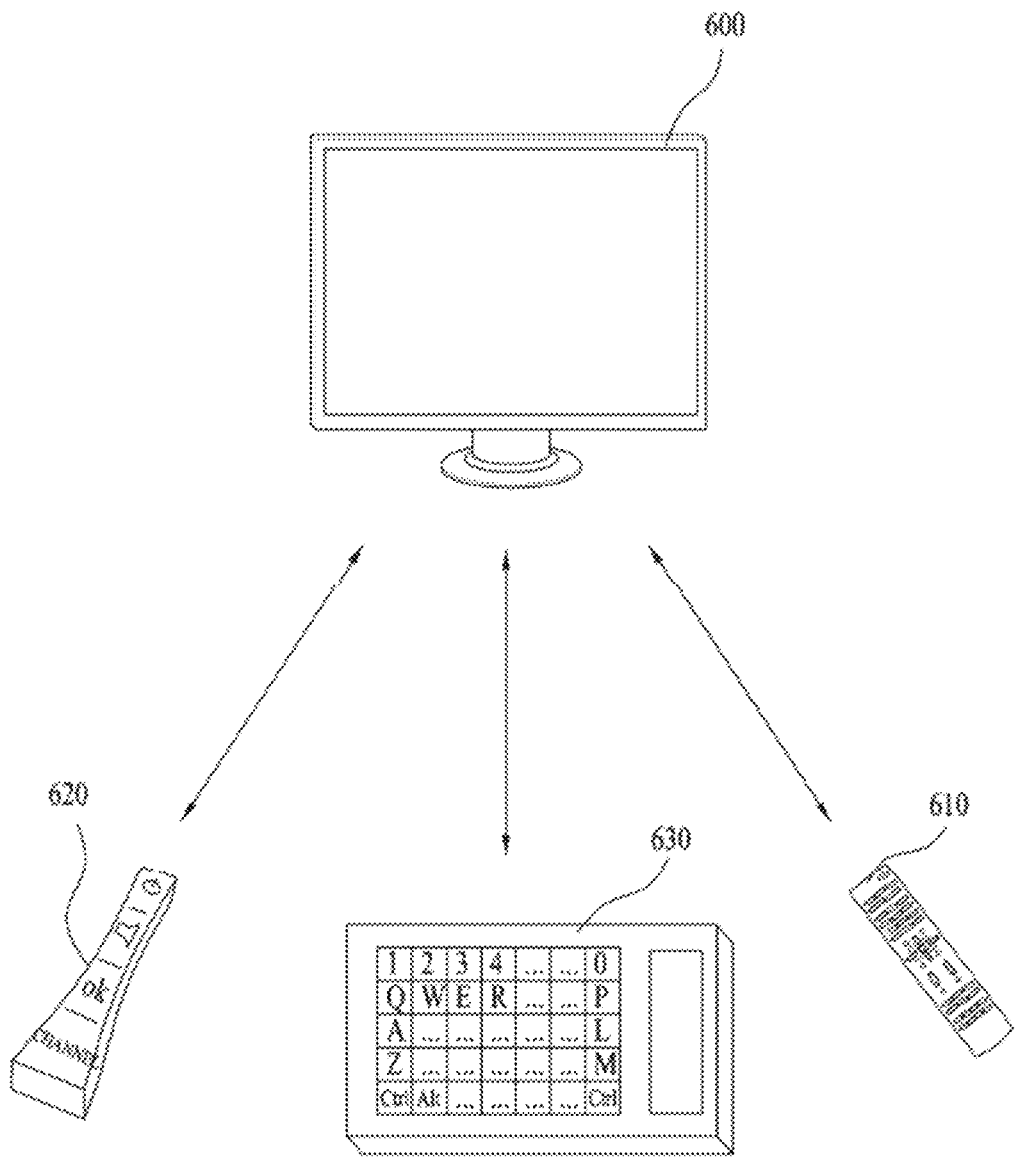
FIG. 6 is a diagram illustrating an input unit connected to each of the digital devices of FIGS. 2 to 4 according to one embodiment of the present invention.

FIG. 6 is a diagram illustrating an input unit connected to each of the digital devices of FIGS. 2 to 4 according to one embodiment of the present invention.

To execute various operations for implementing the present invention according to embodiments, various user interface devices (UIDs) which can communicate with a digital receiver 600 in a wired/wireless manner can be used as remote controllers.

UIDs can include a mobile device (e.g., a smart phone, a tablet PC, and the like), a magic remote controller 620 and a remote controller 630 equipped with a keyboard and a touch pad in addition to a general remote controller 610.

The remote controllers can use various communication protocols such as Bluetooth, RFID, IrDA, UWB, ZigBee, DLNA, etc.

The magic remote controller 620 may include a gyro sensor mounted therein to sense vibration of a user's hand or rotation. That is, the magic remote controller 620 can move a pointer according to up, down, left and right motions of the user such that the user can easily execute a desired action, for example, easily control a channel or a menu.

The remote controller 630 including the keyboard and touch pad can facilitate text input through the keyboard and control of movement of a pointer and magnification and reduction of a picture or video through the touch pad.

The keyboard 630 have been implemented so that it is similar to a keyboard of a PC in order to conveniently input text because the traditional remote control 610 is not sufficient enough to control the digital device 600 since the digital device 600 offers more than just providing broadcast programs as it did before, but has advanced into a intelligent integrated digital device providing web browser, application, SNS and the like.

Meanwhile, the control means such as the remote control 610, the pointing device 620, and the keyboard 630 can, if necessary, include a touchpad to control functions of text input, move the pointer, enlarging/reducing pictures and video clips more conveniently.

The digital device described in the present specification uses Web OS as a platform. Hereinafter, a Web OS based process or algorithm may be performed by the controller of the above-described digital device. The controller includes the controllers of FIGS. 2 to 5 and has wide concepts. Accordingly, hereinafter, a component for processing Web OS based services, applications, content, etc., including software, firmware or hardware in a digital device is referred to as a controller.

Such a Web OS based platform may improve development independency and functional extensibility by integrating services, applications, etc. based on a Luna-service bus, for example, and increase application development productivity based on web application framework. In addition, system resources, etc. may be efficiently used via a Web OS process and resource management to support multitasking.

A Web OS platform described in the present specification may be available not only for stationary devices such as PCs, TVs and STBs but also for mobile devices such as cellular phones, smartphones tablet PCs, laptops, and wearable devices.

A software structure for a digital device is a monolithic structure which solves conventional problems depending on markets, is a single process and closed product based on multi-threading, and has difficulties in terms of external applications. In pursuit of new platform based development, cost innovation via chipset replacement and UI application and external application development efficiency, layering and componentization are performed to obtain a 3-layered structure and an add-on structure for an add-on, a single source product and an open application. Recently, modular design of a software structure has been conducted in order to provide a web open application programming interface (API) for an echo system and modular architecture of a functional unit or a native open API for a game engine, and thus a multi-process structure based on a service structure has been produced.

Figure 7:
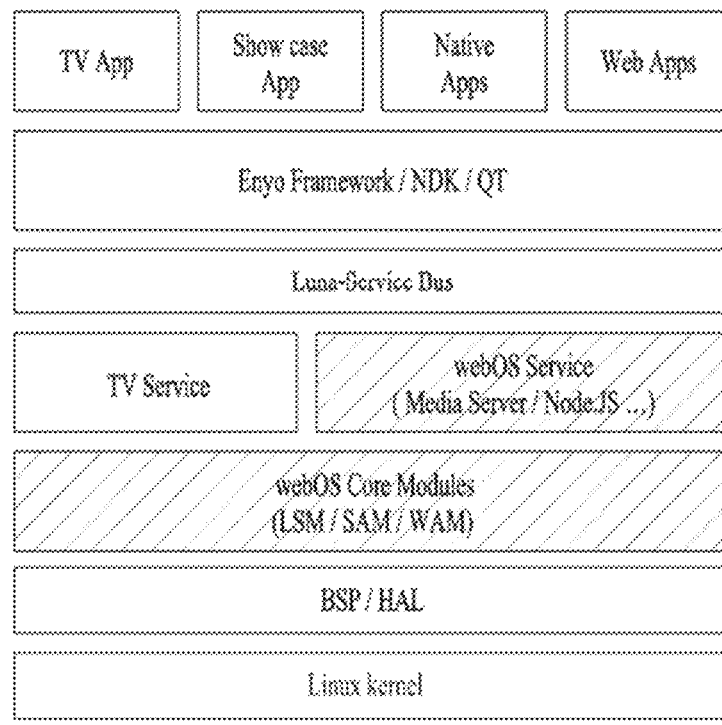
FIG. 7 is a diagram illustrating Web OS architecture according to one embodiment of the present invention.

FIG. 7 is a diagram illustrating Web OS architecture according to one embodiment of the present invention.

The architecture of a Web OS platform will now be described with reference to FIG. 7.

The platform may be largely divided into a kernel, a system library based Web OS core platform, an application, a service, etc.

The architecture of the Web OS platform has a layered structure. OSs are provided at a lowest layer, system library(s) are provided at a next highest layer and applications are provided at the highest layer.

First, the lowest layer is an OS layer including a Linux kernel such that Linux is included as an OS of the digital device.

At layers higher than the OS layer, a board support package (BSP)/hardware abstraction layer (HAL) layer, a Web OS core modules layer, a service layer, a Luna-service bus layer and an Enyo framework/native developer's kit (NDK)/QT layer are sequentially provided. At the highest layer, an application layer is provided.

Some layers of the above-described Web OS layered structure may be omitted and a plurality of layers may be combined to one layer and one layer may be divided into a plurality of layers.

The Web OS core module layer may include a Luna surface manager (LSM) for managing a surface window, etc., a system & application manager (SAM) for managing execution and performance status of applications, etc., and a web application manager (WAM) for managing web applications based on WebKit.

The LSM manages an application window displayed on a screen. The LSM may control display hardware (HW) and provide a buffer for rendering content necessary for applications, and compose and output results of rendering a plurality of applications on a screen.

The SAM manages policy according to several conditions of systems and applications.

The WAM is based on Enyo framework, because a Web OS regards a web application as a basic application.

An application may use a service via a Luna-service bus. A service may be newly registered via a bus and the application may detect and use a desired service.

The service layer may include services having various service levels, such as a TV service, a Web OS service, etc. The Web OS service may include a media server, Node.JS, etc. and, in particular, the Node.JS service supports JavaScript, for example.

The Web OS service may be communicated to a Linux process implementing function logic via a bus. This Web OS service is largely divided into four parts, migrates from a TV process and an existing TV to a Web OS, is developed as services which differ between manufacturers, Web OS common services and JavaScripts, and is composed of the Node.js service used via Node.js.

The application layer may include all applications supportable by a digital device, such as a TV application, a showcase application, a native application, a web application, etc.

Applications on the Web OS may be divided into a web application, a palm development kit (PDK) application, a Qt Meta Language or Qt Modeling Language (QML) application, etc. according to implementation methods.

The web application is based on a WebKit engine and is performed on WAM runtime. Such a web application is based on Enyo framework or may be developed and performed based on general HTML5, cascading style sheets (CSS) and JavaScripts.

The PDK application includes a native application developed with C/C++ based on a PDK provided for a third party or an external developer. The PDK refers to a set of development libraries and tools provided to enable a third party to develop a native application (C/C++) such as games. For example, the PDK application may be used to develop applications requiring high performance.

The QML application is a Qt based native application and includes basic applications provided along with the Web OS platform, such as card view, home dashboard, virtual keyboard, etc. QML is a markup language of a script format, not C++.

The native application is an application which is developed and compiled using C/C++ and is executed in the binary form and has an advantage such as high execution speed.

Figure 8:
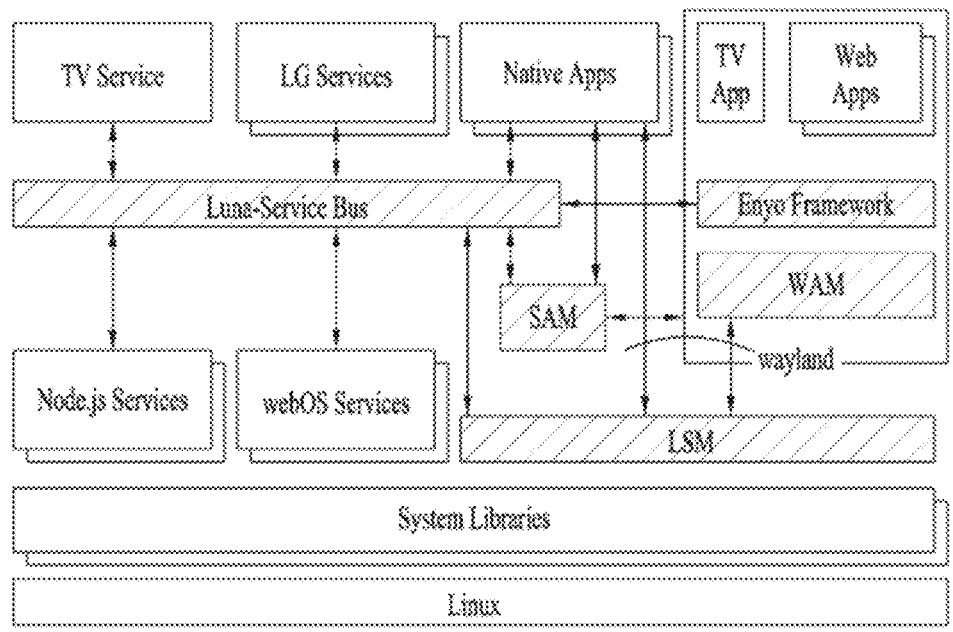
FIG. 8 is a diagram illustrating architecture of a Web OS device according to one embodiment of the present invention.

FIG. 8 is a diagram illustrating the architecture of a Web OS device according to one embodiment of the present invention.

FIG. 8 is a block diagram based on a runtime of a Web OS device and is described with reference to the layered structure of FIG. 7.

Hereinafter, a description will be given with reference to FIGS. 7 and 8.

Referring to FIG. 8, services, applications and Web OS core modules are included on a system OS (Linux) and system libraries and communication therebetween may be performed via a Luna-service bus.

Node.js services based on HTML5 such as e-mail, contact or calendar, CSS, JavaScript, etc., Web OS services such as logging, backup, file notify, database (DB), activity manager, system policy, audio daemon (AudioD), update, media server, etc., TV services such as electronic program guide (EPG), personal video recorder (PVR), data broadcasting, etc., CP services such as voice recognition, now on, notification, search, auto content recognition (ACR), contents list browser (CBOX), wfdd, DMR, remote application, download, Sony Philips digital interface format (SDPIF), etc., native applications such as PDK applications, browsers, QML applications, a UI-related TV applications based on Enyo framework and web applications are processed via Web OS core modules such as the above-described SAM, WAM and LSM via the Luna-service bus. The TV applications and the web applications are not necessarily based on Enyo framework or related to UI.

The CBOX may manage metadata and lists of content of external devices such as USB drivers, DLNA devices or Cloud servers connected to a TV. The CBOX may output content listing of various content containers such as USB, DMS, DVR, Cloud server. etc. as an integrated view. The CBOX may display various types of content listings such as pictures, music or video and manage metadata thereof. The CBOX may output content of an attached storage in real time. For example, if a storage device such as a USB is plugged in, the CBOX should immediately output a content list of the storage device. At this time, a standardized method for processing the content listing may be defined. The CBOX may accommodate various connection protocols.

The SAM is used to improve module complexity and extensibility. For example, an existing system manager processes several functions such as system UI, window management, web application runtime and UX constraint processing via one process and thus has high implementation complexity. In order to solve such a problem, the SAM divides main functions and clarifies an interface between functions, thereby decreasing implementation complexity.

The LSM is supported to independently develop and integrate a system UX such as card view, launcher, etc. and to easily cope with change in product requirements. The LSM maximally uses hardware resources to enable multi-tasking if a plurality of application screens is composed using an app-on-app method and may provide a window management mechanism for 21:9 and a multi-window.

The LSM supports implementation of a system UI based on a QML and improves development productivity. QML UX may easily configure a view using a screen layout and UI components based on MVC and easily develop code for processing user input. An interface between the QML and the Web OS component is achieved via a QML extensibility plug-in and graphic operation of an application may be based on Wayland protocol, luna-service call, etc.

The LSM is an abbreviation for a Luna surface manager and functions as an application window compositor.

The LSM composes and outputs independently developed applications, UI components, etc. on a screen. When components such as recent applications, showcase applications or launcher applications render respective content, the LSM defines an output area, a linkage method, etc. as a compositor. The LSM functioning as a compositor performs processing such as graphic composition, focus management, input events, etc. At this time, the LSM receives event, focus, etc. from an input manager, and a remote controller, a HID such as a mouse and keyboard, a joystick, a game pad, a remote application, a pen touch, etc. may be included as an input manager.

The LSM supports multiple window models and may be simultaneously executed in all applications as a system UI. The LSM may support launcher, recents, setting, notification, system keyboard, volume UI, search, finger gesture, voice recognition (speech to text (STT), text to speech (TTS), natural language processing (NLP), etc.), pattern gesture (camera or mobile radio control unit (MRCU)), live menu, auto content recognition (ACR), etc.

Figure 9:
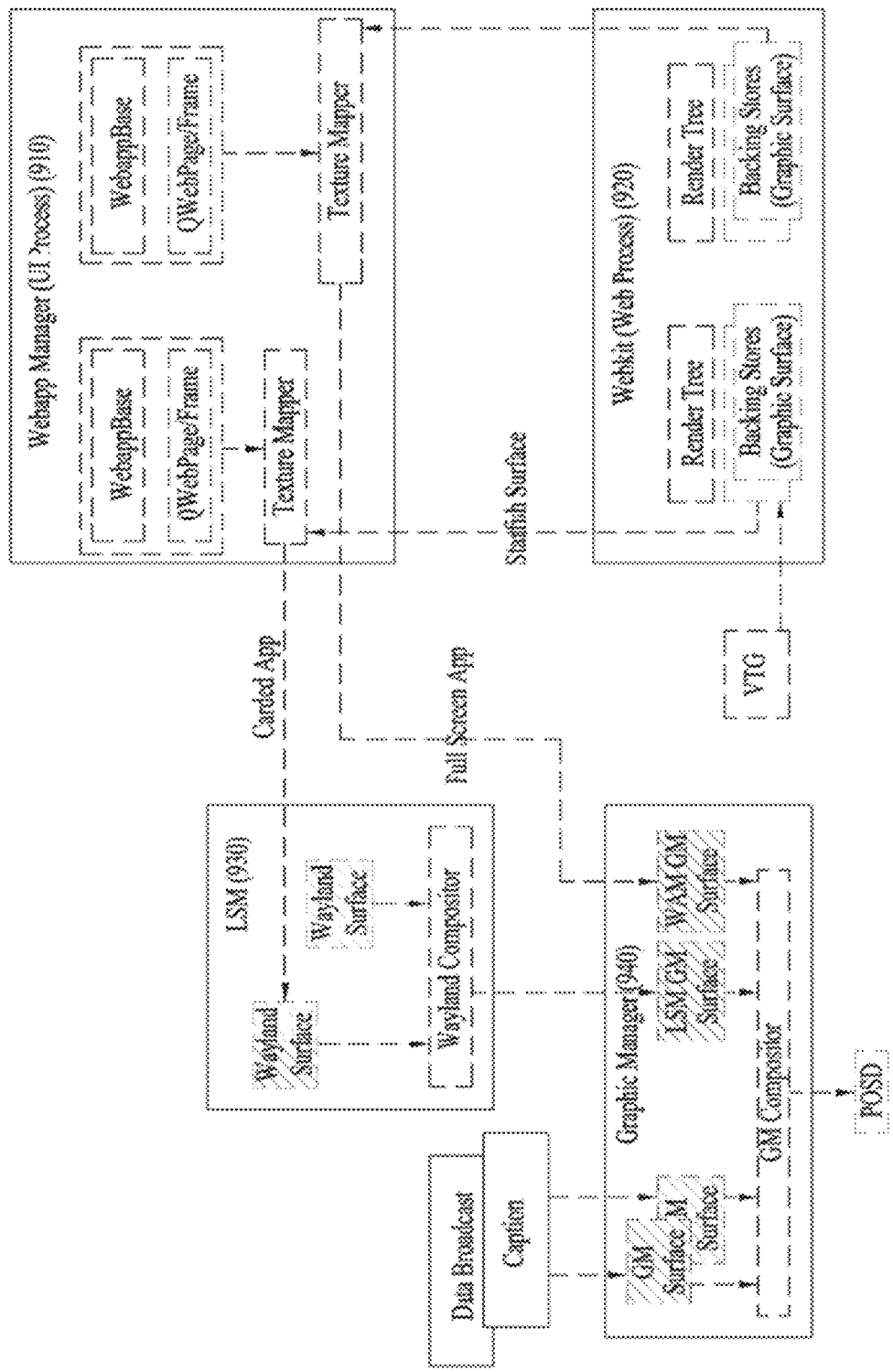
FIG. 9 is a diagram illustrating a graphic composition flow in a Web OS device according to one embodiment of the present invention.

FIG. 9 is a diagram illustrating a graphic composition flow in a Web OS device according to one embodiment of the present invention.

Referring to FIG. 9, graphic composition processing may be performed via a web application manager 910 functioning as a UI process, a WebKit 920 functioning as a web process, an LSM 930 and a graphics manager (GM) 940.

When the web application manager 910 generates web application based graphics data (or application) as a UI process, the generated graphics data is delivered to the LSM if the graphics data is not a fullscreen application. The web application manager 910 receives an application generated by the WebKit 920 in order to share a graphic processing unit (GPU) memory for graphic management between the UI process and the web process and delivers the application to the LSM 930 if the application is not a fullscreen application. If the application is a fullscreen application, the LSM 930 may bypass the application. In this case, the application is directly delivered to the graphics manager 940.

The LSM 930 transmits the received UI application to a Wayland compositor via a Wayland surface and the Wayland compositor appropriately processes the UI application and delivers the processed UI application to the graphics manager. The graphics data received from the LSM 930 is delivered to the graphics manager compositor via the LSM GM surface of the graphics manager 940, for example.

The fullscreen application is directly delivered to the graphics manager 940 without passing through the LSM 930 as described above and is processed in the graphics manager compositor via the WAM GM surface.

The graphics manager processes and outputs all graphics data in the Web OS device and receives and outputs data passing through the above-described LSM GM surface, data passing through a WAM GM surface, and graphics data passing through a GM surface, such as a data broadcasting application or a caption application, on a screen. The function of the GM compositor is equal or similar to the above-described compositor.

Figure 10:
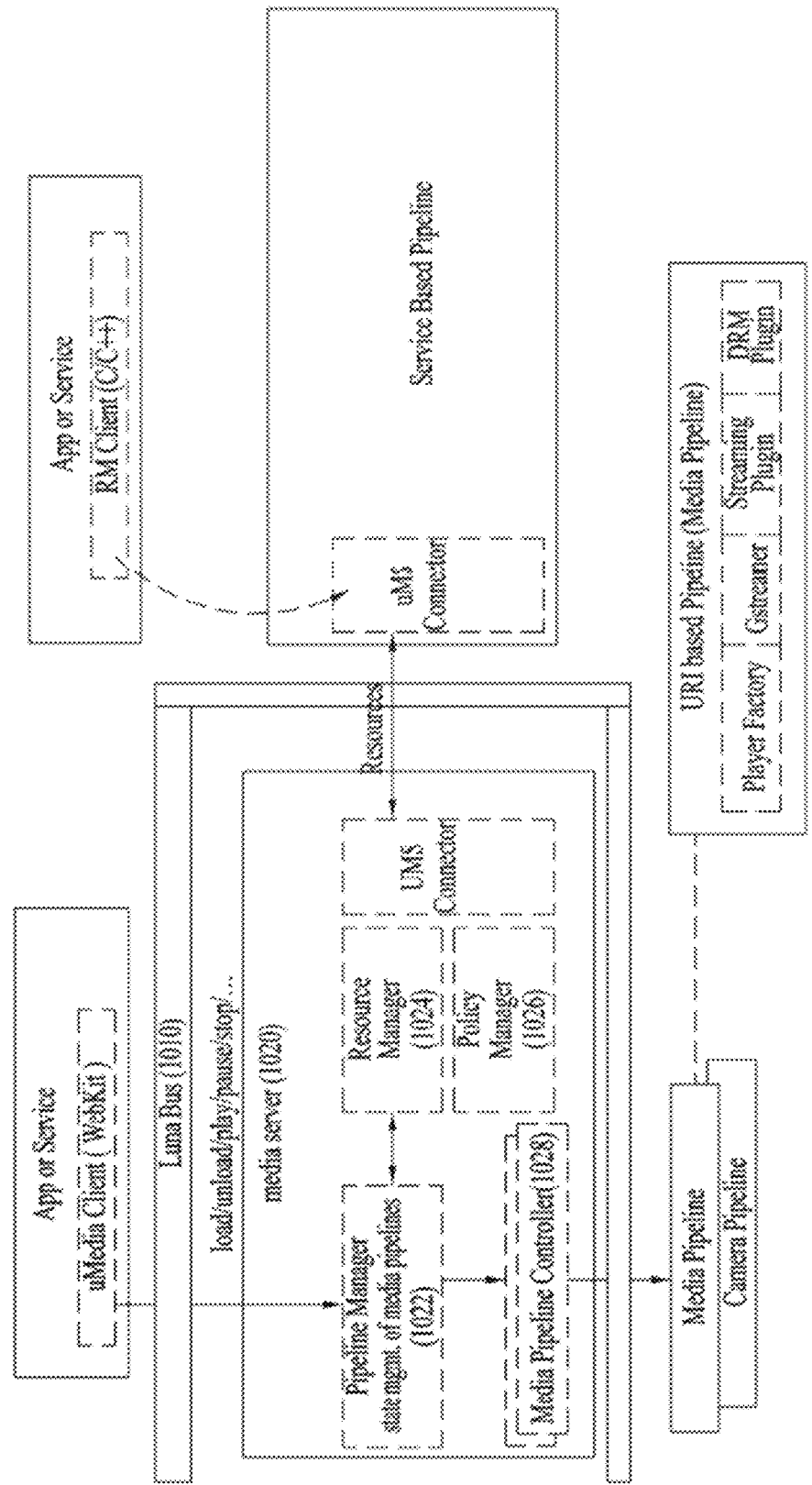
FIG. 10 is a diagram illustrating a media server according to one embodiment of the present invention.
Figure 11:
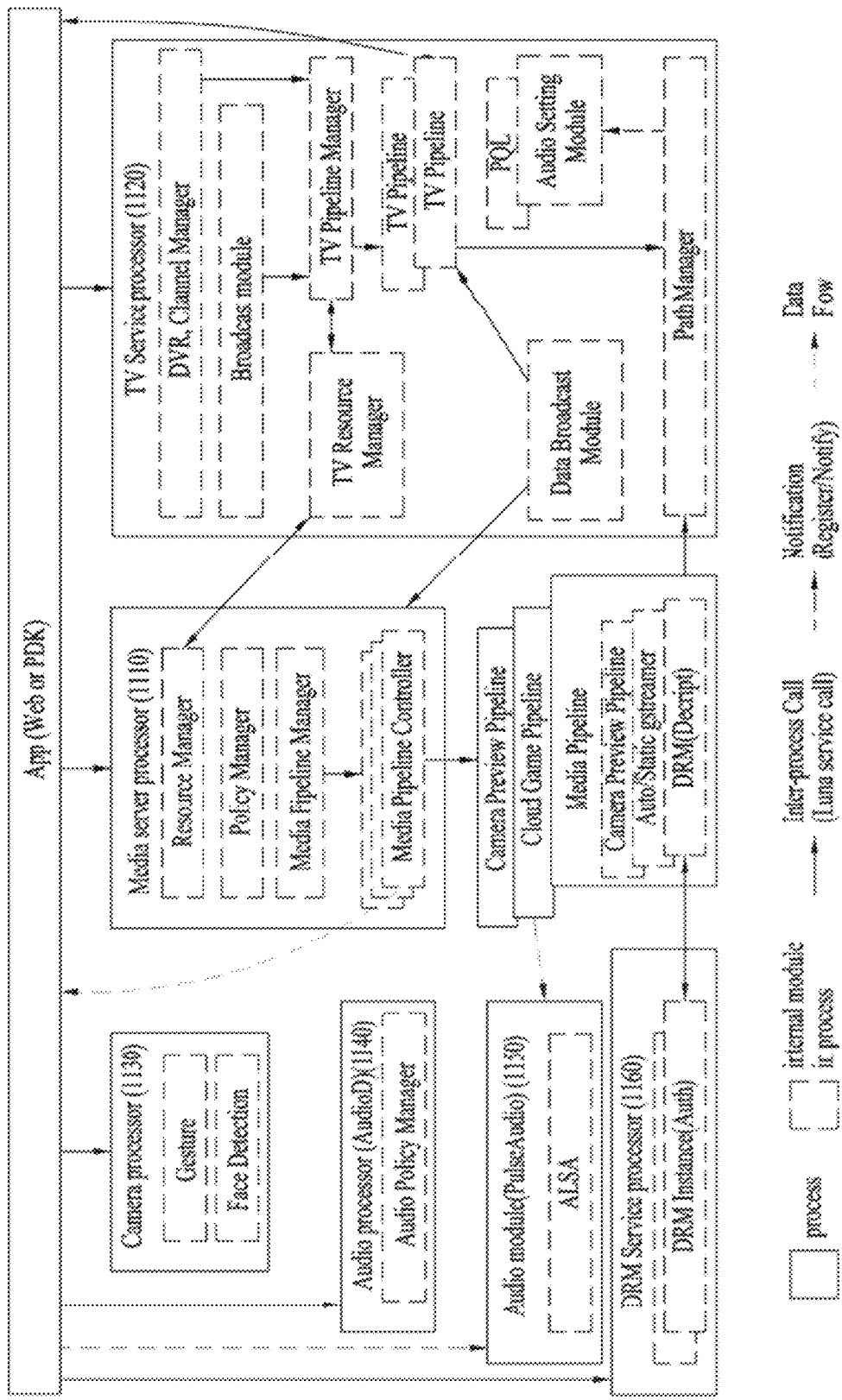
FIG. 11 is a block diagram illustrating a media server according to one embodiment of the present invention.
Figure 12:
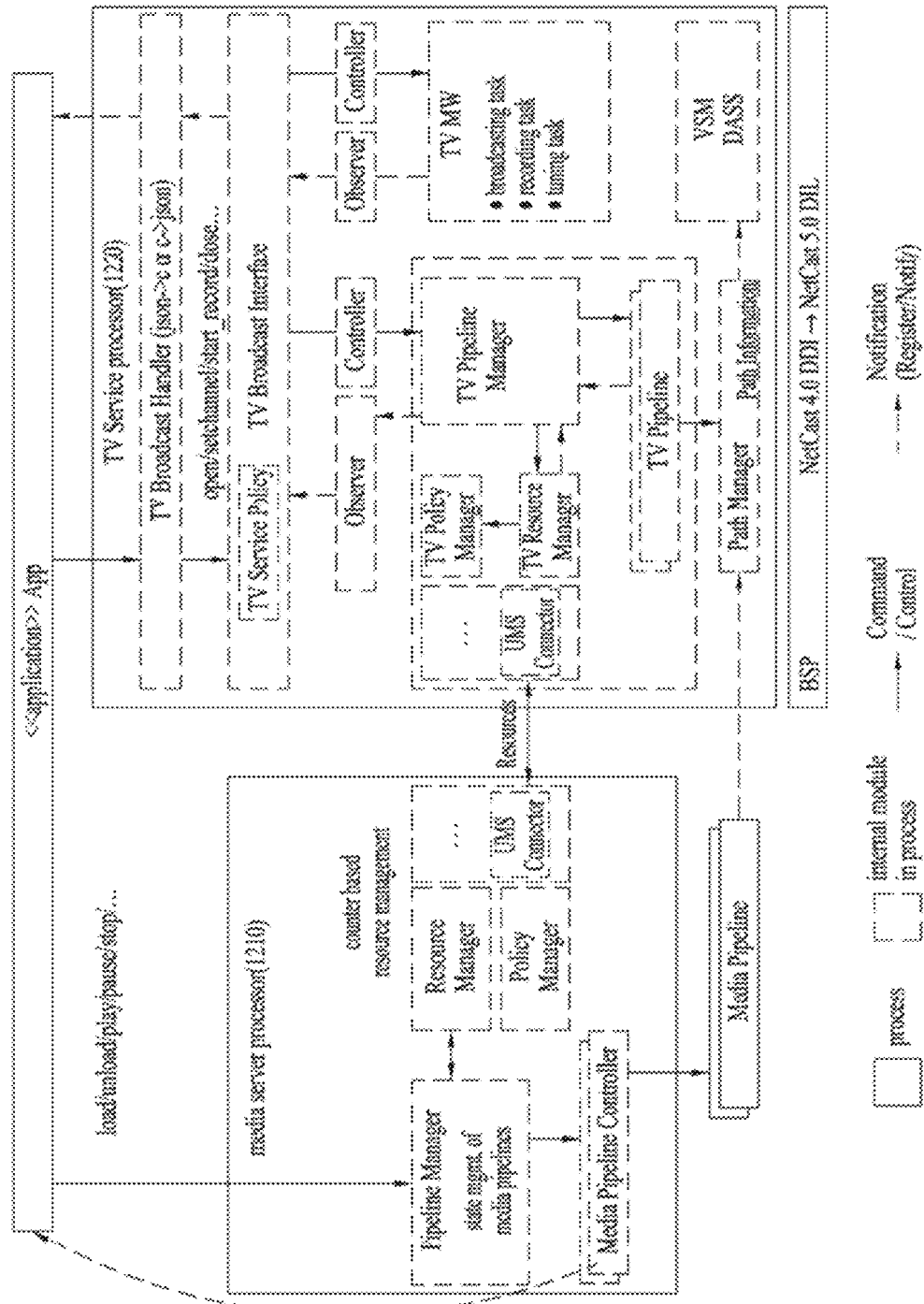
FIG. 12 is a diagram illustrating a relationship between a media server and a TV service according to one embodiment of the present invention.

FIG. 10 is a diagram illustrating a media server according to one embodiment of the present invention, FIG. 11 is a block diagram illustrating a media server according to one embodiment of the present invention, and FIG. 12 is a diagram illustrating a relationship between a media server and a TV service according to one embodiment of the present invention.

The media server supports execution of a variety of multimedia in a digital device and manages necessary resources. The media server may efficiently use hardware resources necessary for media play. For example, the media server requires audio/video hardware resources for multimedia execution and efficiently manages a resource use status to efficiently use resources. In general, a stationary device having a screen larger than that of a mobile device requires more hardware resources upon multimedia execution and requires high encoding/decoding rate and graphics data transfer rate due to a large amount of data. The media server should perform not only streaming or file playback but also broadcasting, recording and tuning tasks, a task for simultaneously viewing and recording, and a task for simultaneous displaying a sender and a recipient on a screen upon video call. It is difficult for the media server to simultaneously perform several tasks due to restriction in hardware resources such as an encoder, a decoder, a tuner, a display engine, etc. in chipset units. For example, the media server restricts a use scenario or performs processing using user input.

The media server may make system stability robust, and may remove a playback pipeline, in which errors occur during media playback, per pipeline, such that other media play is not influenced even when errors occur. Such a pipeline is a chain for connecting unit functions such as decoding, analysis, output, etc. upon a media playback request, and required unit functions may be changed according to media type, etc.

The media server may have extensibility and may add a new type of pipeline without influencing an existing implementation method. For example, the media server may accommodate a camera pipeline, a video conference (Skype) pipeline, a third-party pipeline, etc.

The media server may process general media playback and TV task execution as separate services because the interface of the TV service is different from that of media playback. The media server supports operation such as "set channel", "channel up", "channel down", "channel tuning" and "record start" in relation to the TV service and support operation such as "play", "pause" and "stop" in relation to general media playback, that is, supports different operations with respect to the TV service and general media playback and processes the TV service and media playback as separate services.

The media server may control or manage a resource management function. Hardware resource assignment or recovery in a device is conducted by the media server. In particular, the TV service process delivers a task which is being executed and a resource assignment status to the media server. The media server secures resources to execute a pipeline whenever media is executed, allows media execution due to priority (e.g., policy) upon media execution request, and performs resource recovery of another pipeline, based on a resource status of each pipeline. The predefined execution priority and resource information necessary for a specific request are managed by a policy manager and the resource manager communicates with the policy manager to process resource assignment and recovery.

The media server may have identifiers (IDs) for all operations related to playback. For example, the media server may send a command to a specific pipeline based on the ID. The media server may send respective commands to pipelines for playback of two or more media.

The media server is responsible for playing back a HTML5 standard media.

The media server performs a service process of a TV pipeline according to a TV restructuralization range. The media server may be designed and implemented regardless of the TV restructuralization range. If the separate service process of the TV is not performed, the TV may be wholly re-executed when errors occurs in a specific task.

The media server is also referred to as uMS, that is, a micro media server. The media player is a media client and means WebKit for HTML5 video tag, camera, TV, Skype or second screen, for example.

The media server mainly manages micro resources such as a resource manager or a policy manager. The media server also controls playback of web standard media content. The media server may manage pipeline controller resources.

The media server supports extensibility, reliability, efficient resource usage, etc., for example.

In other words, the uMS, that is, the micro media server, manages and controls resource usage for appropriate processing within the Web OS device, such as resources such as cloud game, MVPD (pay service, etc.), camera preview, second screen or Skype, and TV resources. A pipeline is used upon usage of each resource, for example, and the media server may manage and control generation, deletion, use of a pipeline for resource management.

The pipeline may be generated when a media related to a task starts a sequence of request, decoding streaming and parsing such as video output. For example, in association with a TV service and an application, watching, recording, channel tuning, etc. are controlled and performed via pipelines individually generated according to requests thereof with respect to resource usage.

Referring to FIG. 10, a processing structure of a media server will be described in detail.

In FIG. 10, an application or service is connected to a media server 1020 via a Luna-service bus 1010 and the media server 1020 is connected to and managed by pipelines generated via the Luna-service bus 1010.

The application or service includes various clients according to properties thereof and may exchange data with the media server 1020 or the pipeline via the clients.

The clients include a uMedia client (WebKit) for connection with the media server 1020 and a resource manager (RM) client (C/C++), for example.

The application including the uMedia client is connected to the media server 1020 as described above. More specifically, the uMedia client corresponds to the below-described video object, for example, and uses the media server 1020, for video operation by a request, etc.

The video operation relates to a video status and may include all status data related to the video operation, such as loading, unloading, play (playback or reproduction), pause, stop, etc. Such video operations or statuses may be processed by generating individual pipelines. Accordingly, the uMedia client transmits status data related to the video operation to the pipeline manager 1022 in the media server.

The media server 1022 acquires information about resources of the current device via data communication with the resource manager 1024 and requests assignment of resources corresponding to the status data of the uMedia client. At this time, the pipeline manager 1022 or the resource manager 1024 controls resource assignment via data communication with the policy manager 1026 if necessary. For example, if resources to be assigned according to the request of the pipeline manager 1022 are not present or are lacking in the resource manager 1024, resource assignment may be appropriately performed according to priority comparison of the policy manager 1026.

The pipeline manager 1022 requests to generate a pipeline for operation according to the request of the uMedia client from the media pipeline controller 102, with respect to resources assigned according to resource assignment of the resource manager 1024.

The media pipeline controller 1028 generates a necessary pipeline under control of the pipeline manager 1022. As shown, a media pipeline, a camera pipeline, a pipeline related to playback, pause or stop may be generated. The pipeline includes pipelines for HTML5, web CP, Smarthshare playback, thumbnail extraction, NDK, cinema, multimedia and hypermedia information coding experts group (MHEG), etc.

The pipeline may include a service-based pipeline and a URI based pipeline (media pipeline), for example.

Referring to FIG. 10, the application or service including the RM client may not be directly connected to the media server 1020, because the application or service can directly process a media. In other words, if the application or service directly processes a media, the media server may not be used. At this time, for pipeline generation and usage, resource management is necessary and, at this time, a uMS connector is used. When a resource management request for direct media processing of the application or service is received, the uMS connector communicates with the media server 1020 including the resource manager 1024. The media server 1020 also includes a uMS connector.

Accordingly, the application or service may cope with the request of the RM client via resource management of the resource manager 1024 via the uMS connector. The RM client may process services such as native CP, TV service, second screen, flash player, You Tube media source extensions (MSE), cloud game, Skype, etc. In this case, as described above, the resource manager 1024 may manage resources via appropriate data communication with the policy manager 1026 if necessary for resource management.

The URI based pipeline does not directly process the media unlike the above-RM client but processes the media via the media server 1020. The URI based pipeline may include player factory, Gstreamer, streaming plug-in, digital rights management (DRM) plug-in pipelines.

An interface method between the application and the media services is as follows.

An interface method using a service in a web application may be used. In this method, a Luna call method using a palm service bridge (PSB) and a method of using Cordova may be used, in which a display is extended to a video tag. In addition, a method of using HTML5 standard related to a video tag or media element may be used.

A method of using a service in PDK may be used.

Alternatively, a method of using in existing CP may be used. For backward compatibility, plug-in of an existing platform may be extended and used based on Luna.

Lastly, an interface method using a non-Web OS may be used. In this case, a Luna bus may be directly called to perform interfacing.

Seamless change is processed by a separate module (e.g., TVWIN) and refers to a process of first displaying a TV program on a screen without a Web OS before or duration Web OS booting and then performing seamless processing. This is used for the purpose of first providing a basic function of a TV service, for fast response to a power-on request of a user, because a booting time of a Web OS is late. The module is a part of a TV service process and supports seamless change for providing fast booting and a basic TV function, factory mode, etc. The module is responsible for switching from the non-Web OS mode to the Web OS mode.

FIG. 11 shows the processing structure of the media server.

In FIG. 11, a solid box denotes a process component and a dotted box denotes an internal processing module of the process. A solid arrow denotes an inter-process call, that is, a Luna-service call and a dotted arrow denotes notification such as register/notify or data flow.

The service, the web application or the PDK application (hereinafter, referred to as "application") is connected to various service processing components via a Luna-service bus and is operated or controlled via the service processing components.

A data processing path is changed according to application type. For example, if the application includes image data related to a camera sensor, the image data is transmitted to and processed by a camera processor 1130. At this time, the camera processor 1130 includes a gesture or face detection module and processes image data of the received application. The camera processor 1130 may generate a pipeline via a media server processor 1110 with respect to data which requires use of a pipeline according to user selection or automatically and process the data.

Alternatively, if the application includes audio data, the audio may be processed via an audio processor (AudioD) 1140 and an audio module (PulseAudio) 1150. For example, the audio processor 1140 processes the audio data received from the application and transmits the processed audio data to the audio module 1150. At this time, the audio processor 1140 may include an audio policy manager to determine processing of the audio data. The processed audio data is processed by the audio module 1160. The application or a pipeline related thereto may notify the audio module 1160 of data related to audio data processing. The audio module 1150 includes advanced Linux sound architecture (ALSA).

Alternatively, if the application includes or processes (hereinafter, referred to as "includes") content subjected to DRM, the content data is transmitted to a DRM service processor 1160 and the DRM service processor 1170 generates a DRM instance and processes the content data subjected to DRM. The DRM service processor 1160 is connected to a DRM pipeline in a media pipeline via a Luna-service bus, for processing of the content data subjected to DRM.

Hereinafter, processing of an application including media data or TV service data (e.g., broadcast data) will be described.

FIG. 12 shows the media server processor and the TV service processor of FIG. 11 in detail.

Accordingly, a description will be given with reference to FIGS. 11 and 12.

First, if the application includes TV service data, the application is processed by the TV service processor 1120/1220.

The TV service processor 1120 includes at least one of a DVR/channel manager, a broadcast module, a TV pipeline manager, a TV resource manager, a data broadcast module, an audio setting module, a path manager, etc., for example. In FIG. 12, the TV service processor 1220 may include a TV broadcast handler, a TV broadcast interface, a service processor, TV middleware (MW), a path manager and a BSP (NetCast). The service processor may mean a module including a TV pipeline manager, a TV resource manager, a TV policy manager, a USM connector, etc., for example.

In the present specification, the TV service processor may have the configuration of FIG. 11 or FIG. 12 or a combination thereof. Some components may be omitted or other components (not shown) may be added.

The TV service processor 1120/1220 transmits DVR or channel related data to a DVR/channel manager and transmits the DVR or channel related data to the TV pipeline manager to generate and process a TV pipeline, based on attribute or type of the TV service data received from the application. If the attribute or type of the TV service data is broadcast content data, the TV service processor 1120 generates and processes a TV pipeline via the TV pipeline manager, for processing of the data via a broadcast module.

Alternatively, a JavaScript standard object notation (json) file or a file written in c is processed by the TV broadcast handler and transmitted to the TV pipeline manager via a TV broadcast interface to generate and process a TV pipeline. In this case, the TV broadcast interface may transmit the data or file passing through the TV broadcast handler to the TV pipeline manager based on TV service policy and refer to the data or file upon generating a pipeline.

The TV pipeline manager generates one or more pipelines according to a request for generation of a TV pipeline from the processing module or manager of the TV service processor, under control of the TV resource manager. The TV resource manager may be controlled by the TV policy manager, in order to request a resource assignment status for a TV service according to a request for generation of a TV pipeline of the TV pipeline manager, and may perform data communication with the media server processor 1110/1210 via a uMS connector. The resource manager in the media server processor 1110/1210 sends the resource assignment status for the TV service according to the request of the TV resource manager. For example, if the resource manager in the media server processor 1110/1210 determines that the resources for the TV service are already assigned, the TV resource manager may be notified that assignment of all resources is completed. At this time, the resource manager in the media server processor may remove a predetermined TV pipeline according to a predetermined criterion or priority of TV pipelines already assigned for the TV service along with notification and request generation of a TV pipeline for the requested TV service. Alternatively, the TV resource manager may appropriately remove a TV pipeline or may add or newly establish a TV pipeline according to a status report of the resource manager in the media server processor 1110/1210.

The BSP supports backward compatibility with an existing digital device.

The generated TV pipelines may appropriately operate under control of the path manager in the processing procedure. The path manager may determine or control the processing path or procedure of the pipelines in consideration of the TV pipeline in the processing procedure and the operation of the pipelines generated by the media server processor 1110/1210.

Next, if the application includes media data, not TV service data, the application is processed by the media server processor 1110/1210. The media server processor 1110/1210 includes a resource manager, a policy manager, a media pipeline manager, a media pipeline controller, etc. As pipelines generated under control of the media pipeline manager and the media pipeline controller, a camera preview pipeline, a cloud game pipeline, a media pipeline, etc. may be generated. The media pipeline may include streaming protocol, auto/static gstreamer, DRM, etc. and the processing flow thereof may be determined under control of the path manager. For a detailed description of the processing procedure of the media server processor 1110/1210, refer to the description of FIG. 10 and a repeated description will be omitted.

In the present specification, the resource manager in the media server processor 1110/1210 may perform resource management to a counter base, for example.

Hereinafter, diverse embodiment(s) of the digital device according to the present invention will be described in more detail with reference to the accompanying drawings.

Figure 13:
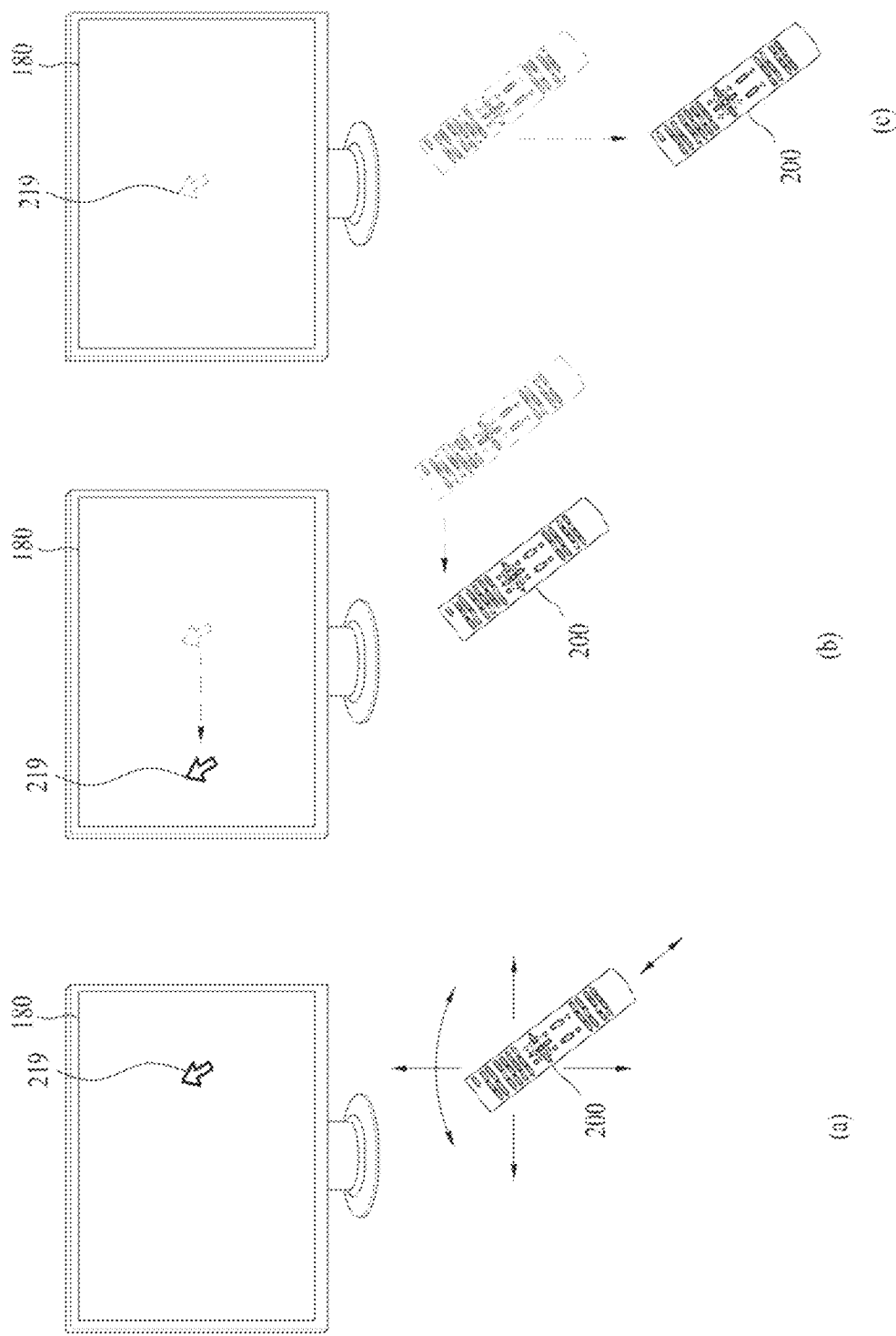
FIG. 13 is a diagram illustrating a control method of a remote controlling device controlling any arbitrary one of image display devices according to embodiments of the present invention.

Next, FIGS. 13(*a*) to 13(*c*) are overviews illustrating an external appearance of the remote controller 200 to control the display 180 in accordance with an embodiment of the present invention. In particular, FIG. 13(*a*) illustrates a pointer 219 displayed on the display 180 corresponding to the remote controller 200. Further, the display 180 corresponds to, for example, the display modules of the devices shown in FIGS. 4 to 6.

A user can then move or rotate the remote controller 200 in the upward and downward direction and in the leftward and rightward direction as shown in FIGS. 13(*b*) and in the forward and backward direction as shown in FIG. 13(*c*). That is, the movement of the pointer 219 displayed on the display 180 of the image display apparatus corresponds to movement of the remote controller 200. Such a remote controller 200 also moves in a 3D space to move the corresponding pointer 219 as shown in FIGS. 13(*a*) to 13(*c*), and thus may be referred to as a space remote controller.

In addition, FIG. 13(*b*) illustrates that, when the user moves the remote controller 200 leftwards, the pointer 219 displayed on the display 180 of the image display apparatus moves leftwards corresponding to movement of the remote controller 200. Further, information regarding movement of the remote controller 200 sensed by a sensor of the remote controller 200 is transmitted to the image display apparatus. The image display apparatus can also calculate coordinates of the pointer 219 from the information regarding movement of the remote controller 200, and then display the pointer 219 so as to correspond to the calculated coordinates.

Further. FIG. 13(*c*) illustrates the user moving the remote controller 200 away from the display 180 while the user presses a specific button of the remote controller 200. Thereby, a selection region in the display 180 corresponding to the pointer 219 can be zoomed in, thus being enlarged. On the other hand, when the user moves the remote controller 200 towards the display 180, the selection region in the display 180 corresponding to the pointer 219 can be zoomed out, thus being reduced. Further, when the remote controller 200 moves away from the display 180, the selection region can be zoomed out, and when the remote controller 200 moves towards the display 180, the selection region can be zoomed in.

In addition, in order to select an event to be added to the schedule list from the enhanced EPG screen in accordance with an embodiment of the present invention, the remote controller 200 shown in FIGS. 13(*a*) to 13(*c*) can be used, and this will be described in detail later with reference to FIGS. 17 to 21.

Figure 14:
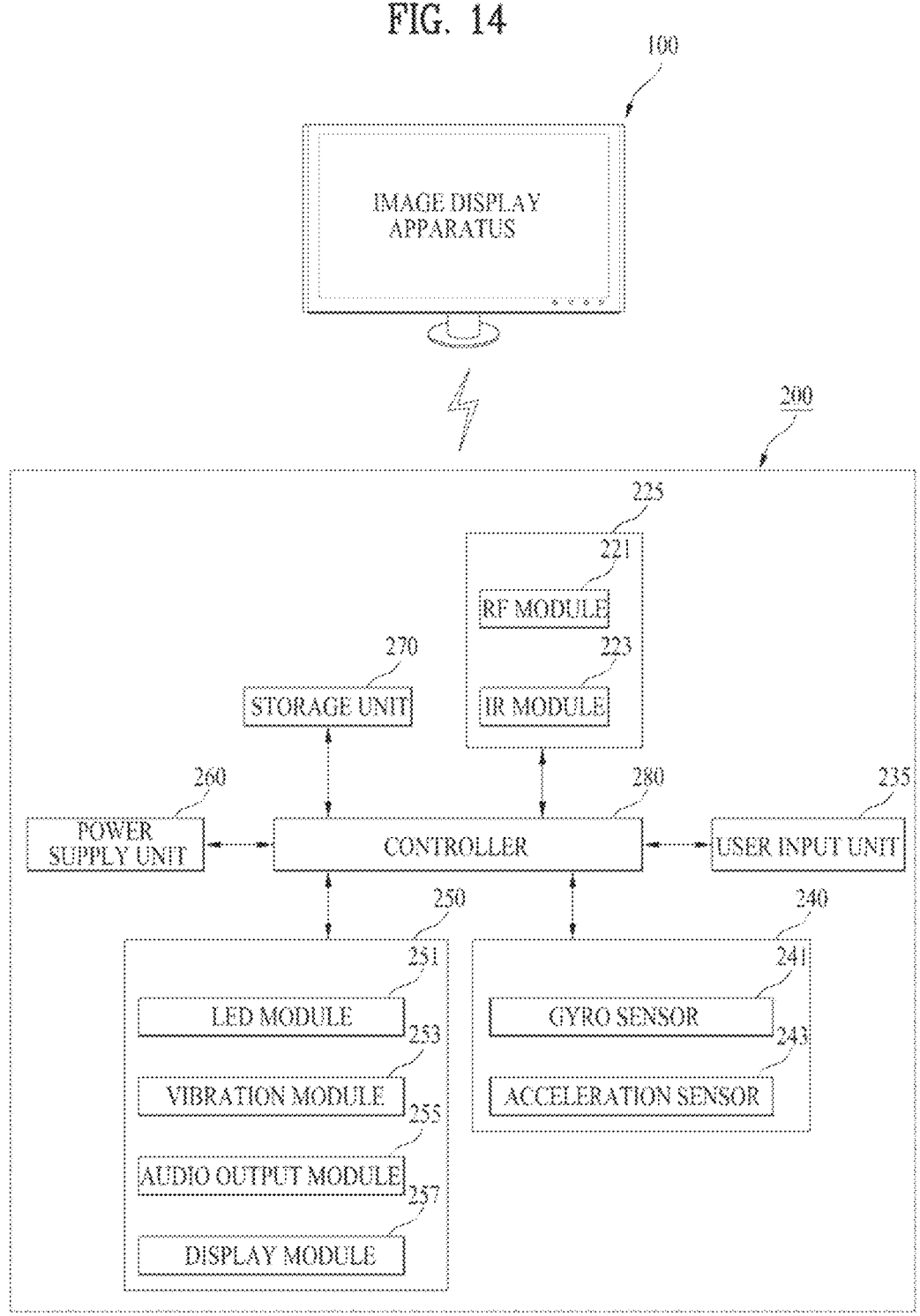
FIG. 14 is an internal block diagram of a remote controlling device controlling any arbitrary one of image display devices according to embodiments of the present invention.

Next, FIG. 14 is a block diagram illustrating the internal configuration of the remote controller 200. As shown in FIG. 14, the remote controller 200 includes, for example, a wireless communication unit 225, a user input unit 235, a sensor unit 240, an output unit 250, a power supply unit 260, a storage unit 270 and a controller 280.

The wireless communication unit 225 transmits/receives a signal to/from any one of the above-described image display apparatuses in accordance with the embodiments of the present invention. Also, one image display apparatus 100 from among the image display apparatuses in accordance with the embodiments of the present invention will be described.

In this embodiment, the remote controller 200 includes an RF module 221 which can transmit/receive a signal to/from the image display apparatus 100 according to the RF communication standard. Further, the remote controller 200 includes an IR module 223 which can transmit/receive a signal to/from the image display apparatus 100 according to the IR communication standard.

In this embodiment, the remote controller 200 transmits a signal containing information regarding movement of the remote controller 200, etc. to the image display apparatus 100 through the RF module 221. Further, the remote controller 200 can receive a signal transmitted from the image display apparatus 100 through the RF module 221. In addition, the remote controller 200 can transmit a command regarding power ON/OFF, channel change, volume change, etc. to the image display apparatus 100 through the IR module 223.

The user input unit 235 can also include a key pad, a touch pad or a touch screen. A user can then input a command regarding the image display apparatus 100 to the remote controller 200 by manipulating the user input unit 235. Further, the sensor unit 240 includes a gyro sensor 241 and an acceleration sensor 243. The gyro sensor 241 senses information regarding movement of the remote controller 200.

For example, the gyro sensor 241 can sense information regarding movement of the remote controller 200 based on x, y and z axes. The acceleration sensor 243 can also sense information regarding the moving velocity of the remote controller 200. The sensor unit 240 may also include a distance sensor for sensing a distance from the display 180.

Further, the output unit 250 can output a video or audio signal corresponding to manipulation of the user input unit 235 or the signal transmitted from the image display apparatus 100. The user can thus recognize whether or not the user input unit 235 is manipulated or whether or not the image display apparatus 100 is controlled through the output unit 250.

For example, the output unit 250 includes an LED module 251 that is turned on when the user input unit 235 is manipulated or the signal of the image display apparatus 100 is transmitted/received through the wireless communication unit 225, a vibration module 253 to generate vibration, an audio output module 255 to output audio, and a display module 257 to output an image.

The power supply unit 260 also supplies power to the remote controller 200. Further, the power supply unit 260 stops power supply when the remote controller 200 does not move for a designated time, thereby reducing power consumption. The power supply unit 260 can also resupply power to the remote controller 200 when a designated key provided on the remote controller 200 is manipulated.

In addition, the storage unit 270 can store various kinds of programs used to control or operate the remote controller 200 and application data. If the remote controller 200 transmits/receives a signal to/from the image display apparatus 100 through the RF module 221 wirelessly, the remote controller 200 and the image display apparatus 100 transmit/receive the signal to/from each other through a designated frequency band. The control unit 280 of the remote controller 200 can also store information regarding the frequency band through which the remote controller 200 transmits/receives the signal to/from the image display apparatus 100 paired with the remote controller 200, within the storage unit 270 and refer to the stored information.

The controller 280 also controls various factors regarding control of the remote controller 200. The controller 280 can transmit a signal corresponding to manipulation of the designated key of the user input unit 235 or a signal corresponding to movement of the remote controller 200 sensed by the sensor unit 240 to the image display apparatus 100 through the wireless communication unit 225.

Particularly, the user interface of the image display apparatus 100 shown in FIG. 14 can receive a command signal from the remote controller 200 transmitting an input signal according to motion of the user.

The digital device according to various embodiments of the present invention can obtain content information of the content, which is currently being outputted, and then obtain an associated keyword corresponding to the obtained content information. Moreover, the digital device can retrieve associated information related to the content being outputted by creating an associated search term including the obtained associated keyword, and then output the retrieved associated information. Details will be explained in the following description.

Figure 15:
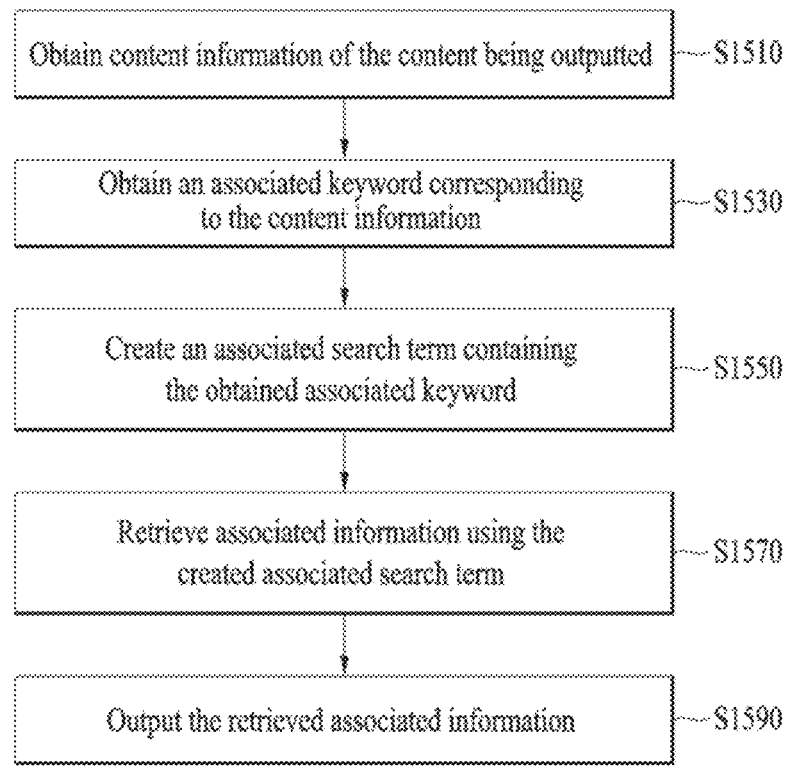
FIG. 15 is a flowchart illustrating an operation method of a digital device according to various embodiments of the present invention.

FIG. 15 is a flowchart illustrating an operation method of the digital device according to various embodiments of the present invention.

Referring to FIG. 15, the digital device 400 can obtain content information of the content, which is currently being outputted [S1510].

For instance, the controller 470 of the digital device 400 can obtain the content information of the content being outputted through either or both of the display unit 480 and the audio output unit 485.

As one embodiment, the controller 470 of the digital device 400 can obtain EPG information of the content being outputted and then obtain the content information related to the content from the obtained EPG information. For instance, the control unit 470 may include at least one of a title of the content, contents of the content, a playback time of the content, a genre of the content, and cast members as the content information of the content. In addition, the control unit 470 may include program schedule information for a plurality of contents or a plurality of broadcast services.

As another embodiment, the control unit 470 of the digital device 400 can send a request for the content information of the content being outputted to a server (not shown in the drawing) and then obtain the content information in response to the request.

As another embodiment, the control unit 470 of the digital device 400 can recognize an object included in a video image of the content being outputted or an audio of the content. Thereafter, the control unit 470 may obtain the content information using the recognized object or audio. For instance, after recognizing the object included in the video image of the content or the audio of the content through auto content recognition, the controller 470 may obtain the content information corresponding to the recognized object or audio.

As a further embodiment, the controller 470 of the digital device 400 can obtain the content information from the content being outputted. For instance, the controller 470 may obtain the content information of the content being outputted in a manner of extracting the content information included in a content file or content data of the content being outputted. In addition, the controller 470 may receive the content information from an application for playing back the content or directly extract the content information from the application for playing back the content. Thus, if an associated search application is executed in the digital device 400, the content information can be obtained without an input for retrieving the associated information.

Furthermore, the controller 470 of the digital device 400 can also obtain the content information of the content being outputted using at least one of the aforementioned EPG information, content information, and content information through the auto content recognition.

The digital device 400 can obtain an associated keyword corresponding to the obtained content information [S1530].

For instance, to create an associated search term for retrieving associated information on the content being outputted, the controller 470 of the digital device 400 may obtain the associated keyword related to the content being outputted. Here, the associated keyword may mean a keyword corresponding to characteristics of the content being outputted.

As one embodiment, the controller 470 can obtain the associated keyword corresponding to the obtained content information based on a content genre in accordance with the obtained content information. For instance, the controller 470 may obtain the associated keyword corresponding to the content genre in accordance with the obtained content information from either or both of the storage unit 440 and server (not shown in the drawing). Particularly, the controller 470 may obtain the associated keyword corresponding to the content genre in accordance with the obtained content information from either or both of the storage unit 440 and a natural language server 1693, which will be explained in the following description.

As another embodiment, the controller 470 can obtain the associated keyword corresponding to the obtained content information based on a content title in accordance with the obtained content information. For instance, the controller 470 may obtain the associated keyword corresponding to the content title in accordance with the obtained content information from either or both of the storage unit 440 and the server (not shown in the drawing). Particularly, the controller 470 may obtain the associated keyword corresponding to the content title in accordance with the obtained content information from either or both of the storage unit 440 and the natural language server 1693, which will be explained in the following description.

As another embodiment, the controller 470 can obtain the associated keyword corresponding to the obtained content information based on a content playback time in accordance with the obtained content information. For instance, the controller 470 may obtain the associated keyword corresponding to the content playback time in accordance with the obtained content information from either or both of the storage unit 440 and the server (not shown in the drawing). Particularly, the controller 470 may obtain the associated keyword corresponding to the content playback time in accordance with the obtained content information from either or both of the storage unit 440 and the natural language server 1693, which will be explained in the following description.

As an example of obtaining the aforementioned associated keyword, acquisition of the associated keyword corresponding to the content information may be performed in various manners according to selection made by a user or manufacturer.

The digital device 400 can create an associated search term including the obtained associated keyword [S1550].

For instance, the controller 470 of the digital device 400 can create the associated search term including the obtained associated keyword. Here, the associated search term may mean a search term for retrieving associated information regarding the content being outputted.

As one embodiment, the controller 470 can set at least one of associated keywords as the associated search terms. For instance, if associated keywords obtained according to the content genre of the content being outputted includes 'replay', 'highlight', 'best scene' and the like, the controller 470 may set the associated keyword, 'replay' as the associated search term.

As another embodiment, the control unit 470 can set search terms including words according to at least one of associated keywords and at least one piece of the content information as the associated search term. For instance, the controller 470 may create the associated search terms in a manner of combining at least one word of the content title and content genre in accordance with the content information with the obtained associated keyword. For instance, if associated keywords obtained according to the content genre of the content being outputted include 'replay', 'highlight', 'best scene' and the like, the controller 470 may create the associated search terms by combining the associated keyword, 'replay' and the content title.

The digital device 400 can retrieve the associated information on the content using the created associated search term [S1570].

For instance, the controller 470 of the digital device 400 can perform at least one of a video search, a web search, a people search, a live channel search, a broadcast information search and a location search on the associated information on the content using the created associated search term.

As one embodiment, the controller 470 can request the server (not shown in the drawing) to perform a search based on the created associated search term in order to retrieve the associated information on the content. Details will be described later.

The digital device 400 can output retrieved associated information [S1590].

For instance, the controller 470 of the digital device 400 can output the retrieved associated information.

As one embodiment, the controller 470 can display the retrieved associated information on a partial region of the display unit 480. For example, the controller 470 may display the retrieved associated information together with the video image of the content being outputted. Moreover, the controller 470 may display only the retrieved associated information on the display unit 480. Furthermore, the controller 470 may display the retrieved associated information together with the content information such as the EPG information.

Hereinafter, an operation of retrieving associated information according to one embodiment of the present invention will be described with reference to FIG. 16.

Figure 16:
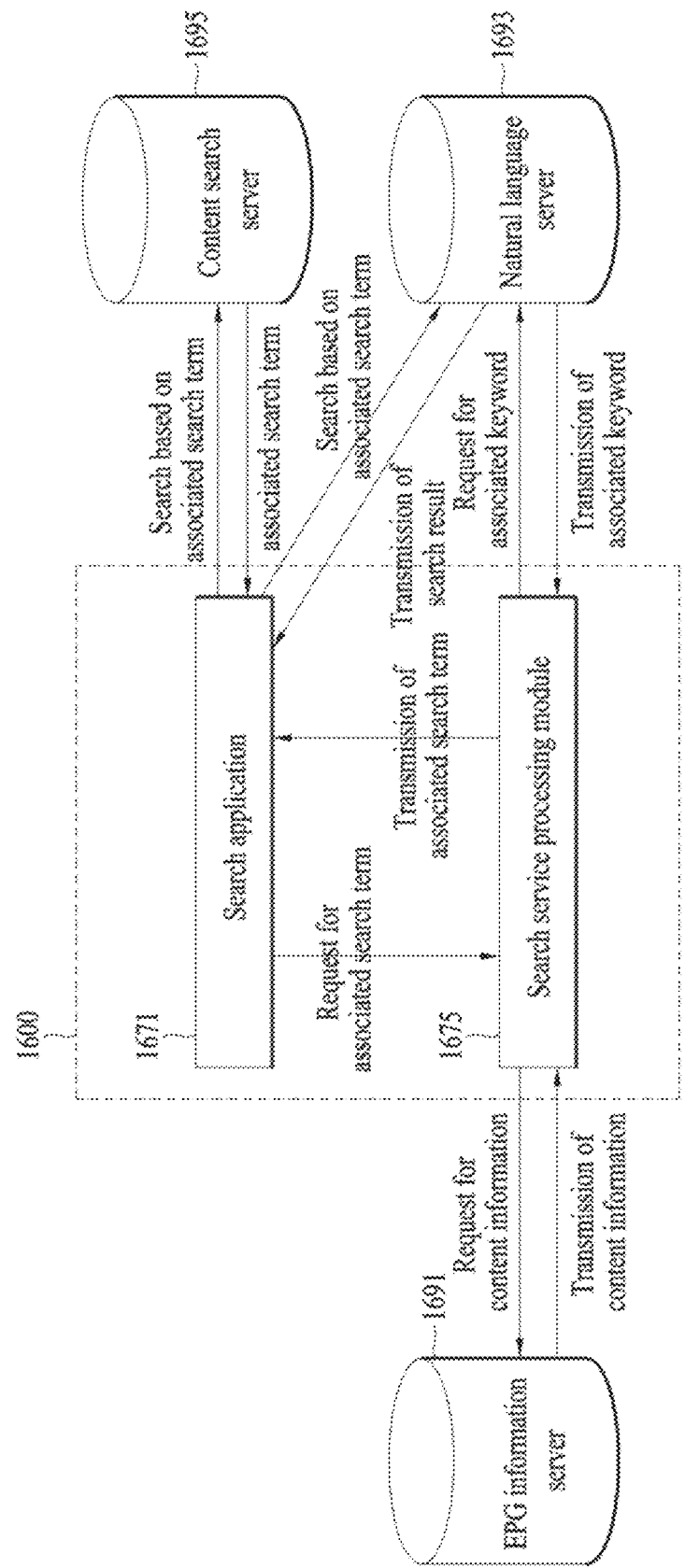
FIG. 16 is a diagram illustrating an example of an associated information search operation according to one embodiment of the present invention.

FIG. 16 is a diagram illustrating an example of an associated information search operation according to one embodiment of the present invention.

Referring to FIG. 16, a digital device 1600 can include a search application 1671 and a search service processing module 1675. Here, the digital device 1600 may be the above-mentioned digital device or image display device. The search application 1671 may be an application for retrieving associated information regarding a content and it can be launched by the aforementioned controller or processor. The search service processing module 1675 may perform various operations related to a search service. For instance, the search service processing module 1675 may request content information and also request an associated keyword based on the content information.

The search application 1671 of the digital device 1600 can obtain an input for outputting the associated information regarding the content being outputted. For instance, the search application 1671 may obtain an input of pressing a key for outputting the associated information or an input of selecting an icon for outputting the associated information. After obtaining the input for outputting the associated information, the search application 1671 may send a request for an associated search term to the search service processing module 1675. In response to the request for the associated search term, the search service processing module 1675 may send a request for content information to an EPG information server 1691. Here, the EPG information server 1691 may be a server that stores the content information including EPG information of the content. The EPG information server 1691 may provide the request content information to the search service processing module 1675. Here, the content information may include at least one of a title of the content, contents of the content, a playback time of the content, a genre of the content, and cast members. The search service processing module 1675 may send a request for the associated keyword to the natural language server 1693 based on the obtained content information. Here, the associated keyword may mean a keyword corresponding to characteristics of the content being outputted. The natural language server 1693 may provide the associated keyword corresponding to the obtained content information to the search service processing module 1675. For instance, the natural language server 1693 may generate a keyword by performing trend analysis on the received content information and then provide the generated keyword as the associated keyword. In addition, the natural language server 1693 may provide a pre-stored associated keyword corresponding to the received content information to the search service processing module 1675. After creating the associated search term containing the associated keyword provided by the natural language server 1693, the search service processing module 1675 may provide the created associated search term to the search application 1671. Thereafter, the search application 1671 may retrieve the associated information using the received associated search term. For instance, the search application 1671 may request a content search server 1695 to perform a search based on the associated search term. After performing the search on a plurality of contents using the associated search term, the content search server 1695 may transmit a list of retrieved contents to the search application 1671. Thereafter, the search application 1671 may output a list of contents associated with the content being outputted as the associated information on the content being outputted. Moreover, the search application 1671 may perform at least one of a web search, a people search, a live channel search, a broadcast information search and a location search using the associated search term. For instance, the search application 1671 may request the natural language server 1693 to perform the at least one of the web search, the people search, the live channel search, the broadcast information search and the location search based on the associated search term. According to the request, the natural language server 1693 may perform the at least one of the web search, the people search, the live channel search, the broadcast information search and the location search using the associated search term and then transmit a search result to the search application 1671. Thereafter, the search application 1671 may output various information related to the content being outputted as the associated information on the content being outputted. In this case, the at least one of the web search, the people search, the live channel search, the broadcast information search and the location search, which are performed by the natural server 1693 using the associated search term, are merely to explain the present invention, and the invention is not limited thereto. Thus, depending on a server configuration, the above-mentioned search may be performed by the EPG information server 1691, the natural language server 1693, or the content search server 1695. Alternatively, it may be performed by a separate server. Further, the EPG information server 1691, the natural language server 1693, and the content search server 1695 described above can be implemented as one server.

Meanwhile, either or both of the aforementioned search application 1671 and the search service processing module 1675 can obtain the content information from an application for playing back the content. For instance, the either or both of the search application 1671 and the search service processing module 1675 may obtain the content information by receiving it from the application for playing back the content. As one embodiment, the application for playing back the content may transmit direct content information related to the content such as a content title and a content genre and a content management ID such as a content ID and a program ID to the either or both of the search application 1671 and the search service processing module 1675, whereby the either or both of the search application 1671 and the search service processing module 1675 may obtain the content information from the application for playing back the content. As another example, the either or both of the search application 1671 and the search service processing module 1675 may obtain the content information by directly extracting the content information from the application for playing back the content. As one embodiment, the either or both of the search application 1671 and the search service processing module 1675 may obtain the content information by directly extracting at least one piece of the direct content information related to the content such as the content title and the content genre and the content management ID such as the content ID and program ID.

The digital device according to various embodiments of the present invention can obtain an associated keyword in accordance with a genre of the content and output a plurality of pieces of associated information according to the genre of the content.

Table 1 shows an associated keyword in accordance with a content genre.

TABLE 1

| Content genre | First associated information | Second associated information | Third associated information | Fourth associated information | Fifth associated information | Sixth associated information |
|---|---|---|---|---|---|---|
| Sport | <title> + "Best"/ "Replay"/ "Highlight" Video | <Details + Schedule> Broadcast information | Live sports channel | <Sport-sub genre> + "Best"/ "Replay"/ "Highlight" Video | Sport-sub genre + "Game result" <Web search> | Sport-sub genre + "Game schedule" <Web search> |
| Movie | <title> + "Best scene"/ "OST"/ "Parody"/ "Review" Video | Broadcast information <Details + Schedule> | Live movie channel | Cast members 1 | Cast members 2 | Cast members 3 |
| Drama | <title> + "Making"/ "Behind"/ "OST"/ "Preview"/ "Replay"/ "Image" Video | Broadcast information <Details + Schedule> | Live drama channel | <title> + "Fashion" <Web search> | Cast members 1 | Cast members 2 |

TABLE 1-continued

| Content genre | First associated information | Second associated information | Third associated information | Fourth associated information | Fifth associated information | Sixth associated information |
|---|---|---|---|---|---|---|
| Entertainment | Live entertainment channel | <title> + "Highlight"/ "Replay"/ "Preview" Video | Broadcast information <Details + Schedule> | Cast members 1 | Cast members 2 | Cast members 3 |
| News | Live news channel | Broadcast information <Details + Schedule> | Weather | Sports News <Web search> | Stocks <Web search> | — |
| Kids | Live kids channel | Broadcast information <Details + Schedule> | <title> + "Song"/ "Opening"/ "Toy"/ "Theatrical version" Video | "Kids cafe" <Web search> | — | — |
| Shopping | Live shopping channel | Broadcast information <Details + Schedule> | Channel name <Web search> | — | — | — |
| Documentary | Live documentary channel | Broadcast information <Details + Schedule> | <title> + "Replay" Video | — | — | — |
| Music | Live music channel | Broadcast information <Details + Schedule> | <title> + "Guest"/ "Replay" Video | — | — | — |
| Hobby/Leisure | <title> + "Replay" Video | Broadcast information <Details + Schedule> | Live hobby/leisure channel | (Cooking channel) "Restaurant" (Fishing channel) "Fishing place" (Climbing channel) "Hiking" <Web search> | Cast members 1 (optional) | Cast members 2 (optional) |
| Education | Live education channel | Broadcast information <Details + Schedule> | <title> + "Replay" Video | — | — | — |
| Information | Live information channel | Broadcast information <Details + Schedule> | <title> + "Replay" Video | — | — | — |

Referring to Table 1, the controller 470 of the digital device 400 can retrieve a plurality of pieces of the associated information according to the genre of the content being outputted. In addition, the controller 470 can change an output order or display order of retrieved associated information according to the genre of the content.

For instance, if the genre of the content being outputted is sport, the controller 470 can create an associated search term containing any one of a content title and an associated keyword of the content being outputted as first associated information, and retrieve a video for the created associated search term. As one embodiment, the controller 470 may include at least one of 'best', 'replay', and 'highlight' as associated keywords for the sport genre of the content, and then create an associated search term including both of the at least one of 'best', 'replay', and 'highlight' and the content title. In addition, the controller 470 may retrieve a video for the created associated search term. The controller 470 may retrieve detailed broadcast schedule information of the sport genre of the content being outputted as second associated information, and retrieve a live sports channel as third associated information. Furthermore, the controller 470 may create an associated search term including a sub sport genre and an associated keyword of the content being outputted as fourth associated information, and retrieve a video for the created associated search term. The controller 470 may perform a web search on the sub sport genre and a game result of the sport genre of the content being outputted as fifth associated information. Further, the controller 470 may perform the web search on the sub sport genre and a game schedule of the sport genre of the content being outputted as sixth associated information.

For instance, if the genre of the content being outputted is a movie, the controller 470 can create an associated search term containing any one of a content title and an associated keyword of the content being outputted as first associated information, and retrieve a video for the created associated search term. As one embodiment, the controller 470 may include at least one of 'best scene', 'OST', 'parody', and 'review' as associated keywords for the movie genre of the content, and then create an associated search term including both of the at least one of 'best scene', 'OST', 'parody', and 'review' and the content title. In addition, the controller 470 may retrieve a video for the created associated search term. The controller 470 may retrieve detailed broadcast schedule information of the movie genre of the content being outputted as second associated information, and retrieve a live movie channel as third associated information. Furthermore, the controller 470 may retrieve first cast members of the content being outputted as fourth associated information, second cast members of the content being outputted as fifth associated information, and third cast members of the content being outputted as sixth associated information.

For instance, if the genre of the content being outputted is a drama, the controller 470 can create an associated search term containing any one of a content title and an associated keyword of the content being outputted as first associated information, and retrieve a video for the created associated search term. As one embodiment, the controller 470 may include at least one of 'making'. 'behind', 'OST', 'preview', 'replay', and 'image' as associated keywords for the drama genre of the content, and then create an associated search term including both of the at least one of 'making', 'behind', 'OST', 'preview', 'replay', and 'image' and the content title. In addition, the controller 470 may retrieve a video for the created associated search term. The controller 470 may retrieve detailed broadcast schedule information of the drama genre of the content being outputted as second associated information, and retrieve a live drama channel as third associated information. Furthermore, the controller 470 may perform the web search on the content title and a fashion of the content being outputted as fourth associated information. The controller 470 may retrieve first cast members of the content being outputted as fifth associated information and second cast members of the content being outputted as sixth associated information.

For instance, if the genre of the content being outputted is entertainment, the controller 470 can retrieve a live entertainment channel as first associated information, and retrieve a video for an associated search term containing any one of a content title and an associated keyword of the content being outputted as second associated information. As one embodiment, the controller 470 may include at least one of 'highlight', 'replay', and 'preview' as associated keywords for the entertainment genre of the content, and then create an associated search term including both of the at least one of 'highlight', 'replay', and 'preview' and the content title. In addition, the controller 470 may retrieve a video for the created associated search term. The controller 470 may retrieve detailed broadcast schedule information of the entertainment genre of the content being outputted as third associated information. Furthermore, the controller 470 may retrieve first cast members of the content being outputted as fourth associated information, second cast members of the content being outputted as fifth associated information, and third cast members of the content being outputted as sixth associated information.

For instance, if the genre of the content being outputted is news, the controller 470 can retrieve a live news channel as first associated information, and retrieve detailed broadcast schedule information of the news genre of the content being outputted as second associated information. In addition, the controller 470 may retrieve weather information as third associated information. Moreover, the controller 470 may perform the web search on sports news as fourth associated information and then perform the web search on stocks as fifth associated information. Furthermore, when retrieving the weather information as the third associated information, the controller 470 may retrieve weather information of the current location based on location information. Details will be described later.

For instance, if the genre of the content being outputted is kids, the controller 470 can retrieve a live kids channel as first associated information, and retrieve detailed broadcast schedule information of the kids genre of the content being outputted as second associated information. In addition, the controller 470 may retrieve a video for an associated search term containing any one of a content title and an associated keyword of the content being outputted as third associated information. As one embodiment, the controller 470 may include at least one of 'song', 'opening', 'toy', and 'theatrical version' as associated keywords for the kids genre of the content, and then create an associated search term including both of the at least one of 'song', 'opening', 'toy', and 'theatrical version' and the content title. In addition, the controller 470 may retrieve a video for the created associated search term. The controller 470 may perform the web search on a specific keyword, e.g., kids' cafe as fourth associated information. In this case, the controller 470 may search for a location of a specific kids' cafe or search for a kids' cafe around the current location based location information.

For instance, if the genre of the content being outputted is a documentary, the controller 470 can retrieve a live documentary channel as first associated information, and retrieve detailed broadcast schedule information of the documentary genre of the content being outputted as second associated information. In addition, the controller 470 may retrieve a video for an associated search term containing any one of a content title and an associated keyword of the content being outputted as third associated information. As one embodiment, the controller 470 may include 'replay' as an associated keyword for the documentary genre of the content, and then create an associated search term including both of the 'replay' and the content title. In addition, the controller 470 may retrieve a video for the created associated search term.

For instance, if the genre of the content being outputted is a music, the controller 470 can retrieve a live music channel as first associated information, and retrieve detailed broadcast schedule information of the music genre of the content being outputted as second associated information. In addition, the controller 470 may retrieve a video for an associated search term containing any one of a content title and an associated keyword of the content being outputted as third associated information. As one embodiment, the controller 470 may include at least one of 'guest' and 'replay' as associated keywords for the music genre of the content, and then create an associated search term including both of the at least one of 'guest' and 'replay' and the content title. In addition, the controller 470 may retrieve a video for the created associated search term.

For instance, if the genre of the content being outputted is a hobby/leisure, the controller 470 can create an associated search term containing any one of a content title and an associated keyword of the content being outputted as first associated information, and retrieve a video for the created associated search term. As one embodiment, the controller 470 may include 'replay' as an associated keyword for the hobby/leisure genre of the content, and then create an associated search term including both of the 'replay' and the content title. In addition, the controller 470 may retrieve a video for the created associated search term. The controller 470 may retrieve detailed broadcast schedule information of the hobby/leisure genre of the content being outputted as second associated information, and retrieve a live hobby/leisure channel as third associated information. Moreover, the controller 470 may retrieve a channel for a sub-genre of the hobby/leisure genre of the content being outputted as fourth associated information. For instance, if the content being outputted corresponds to a cooking channel, the controller 470 may perform the web search based on a keyword 'restaurant'. If the content being outputted corresponds to a fishing channel, the controller 470 may perform the web search based on keyword 'fishing place'. If the content being outputted corresponds to a climbing channel, the controller 470 may perform the web search based on keyword 'hiking'. Further, the controller 470 may retrieve first cast members of the content being outputted as fifth associated information and second cast members of the content being outputted as sixth associated information.

For instance, if the genre of the content being outputted is education, the controller 470 can retrieve a live education channel as first associated information, and retrieve detailed broadcast schedule information of the education genre of the content being outputted as second associated information. In addition, the controller 470 may retrieve a video for an associated search term containing any one of a content title and an associated keyword of the content being outputted as third associated information. As one embodiment, the controller 470 may include 'replay' as an associated keyword for the education genre of the content, and then create an associated search term including both of the 'replay' and the content title. In addition, the controller 470 may retrieve a video for the created associated search term.

For instance, if the genre of the content being outputted is information, the controller 470 may retrieve a live information channel as first associated information, and retrieve detailed broadcast schedule information of the information genre of the content being outputted as second associated information. In addition, the controller 470 may retrieve a video for an associated search term containing any one of a content title and an associated keyword of the content being outputted as third associated information. As one embodiment, the controller 470 may include 'replay' as an associated keyword for the information genre of the content, and then create an associated search term including both of the 'replay' and the content title. In addition, the controller 470 may retrieve a video for the created associated search term.

Furthermore, the digital device 400 can use only the content title as the associated keyword and retrieve at least one piece of associated information using only the content title as the associated search term. For example, the digital device 400 may create the associated search term based on the content title according to the obtained content information, and then perform at least one of a web search, a people search, a live channel search, a broadcast information search and a location search using the created associated search term. In other words, the digital device 400 may perform at least one of the web search, the people search, the live channel search, the broadcast information search and the location search using only the content title.

The digital device 400 according to the various embodiment of the present invention can retrieve associated information regarding the content and then display various retrieved associated information in various manners. It will be described hereinafter.

As one embodiment, the digital device 400 can simultaneously display the content being outputted and associated information regarding the content.

Figure 17:
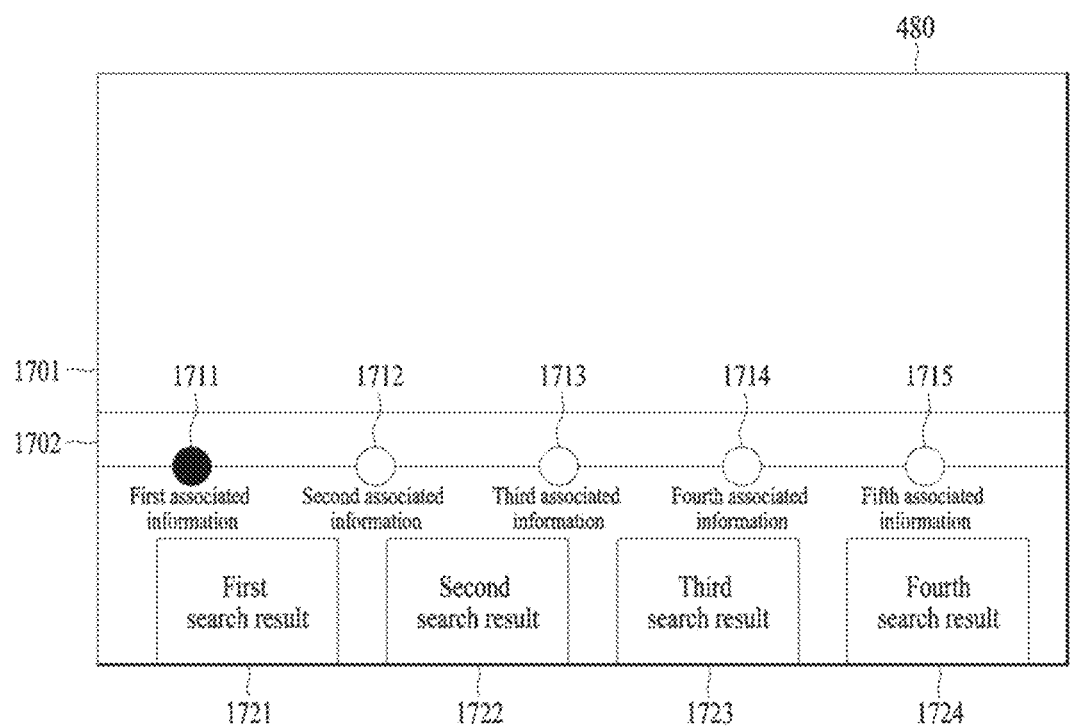
FIG. 17 illustrates an associated information display screen according to one embodiment of the present invention.

FIG. 17 illustrates an associated information display screen according to one embodiment of the present invention.

Figure 18:
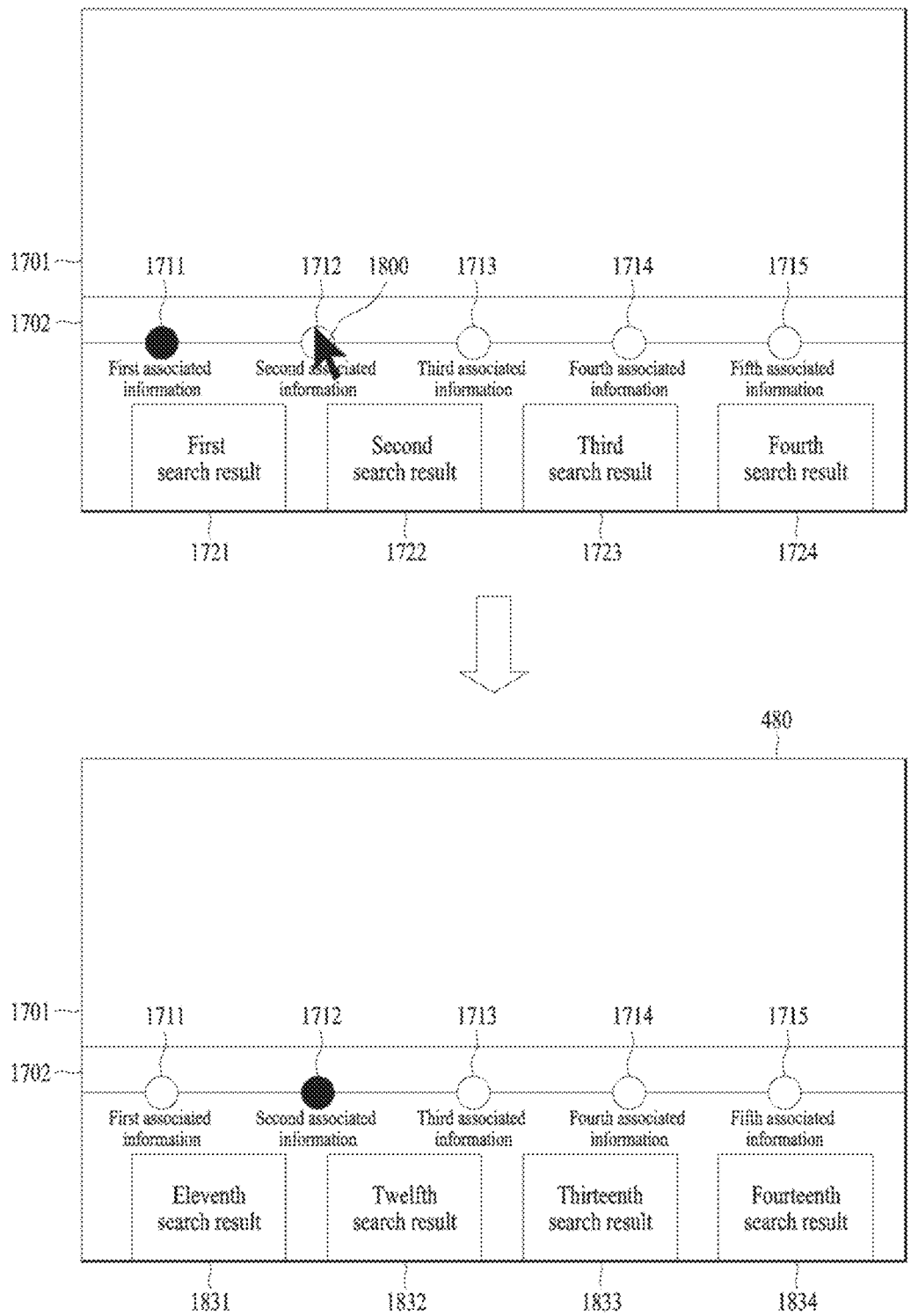
FIGS. 18 to 20 are diagrams illustrating examples of operations based on inputs to the associated information display screen according to one embodiment of the present invention.
Figure 19:
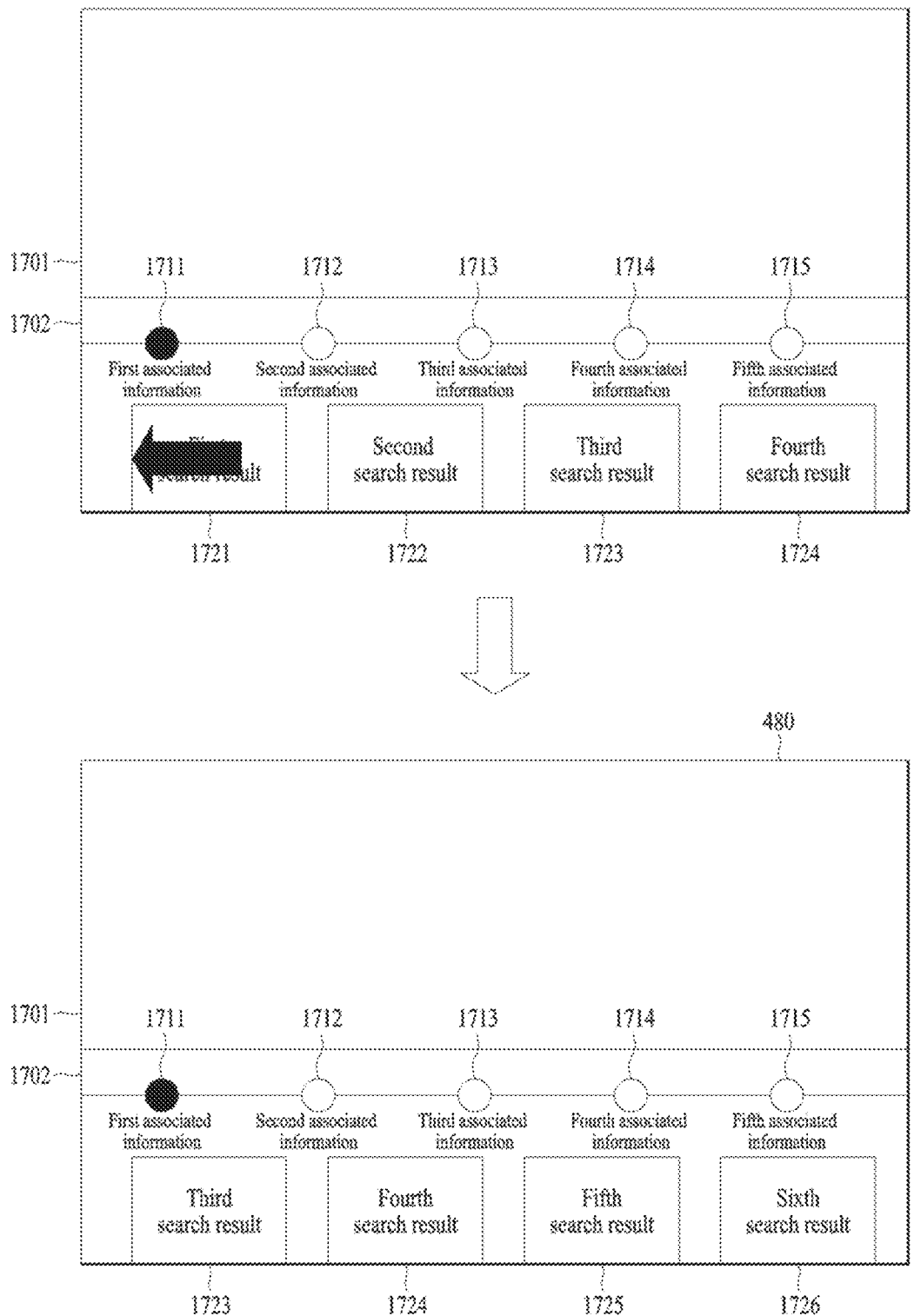
Figure 20:
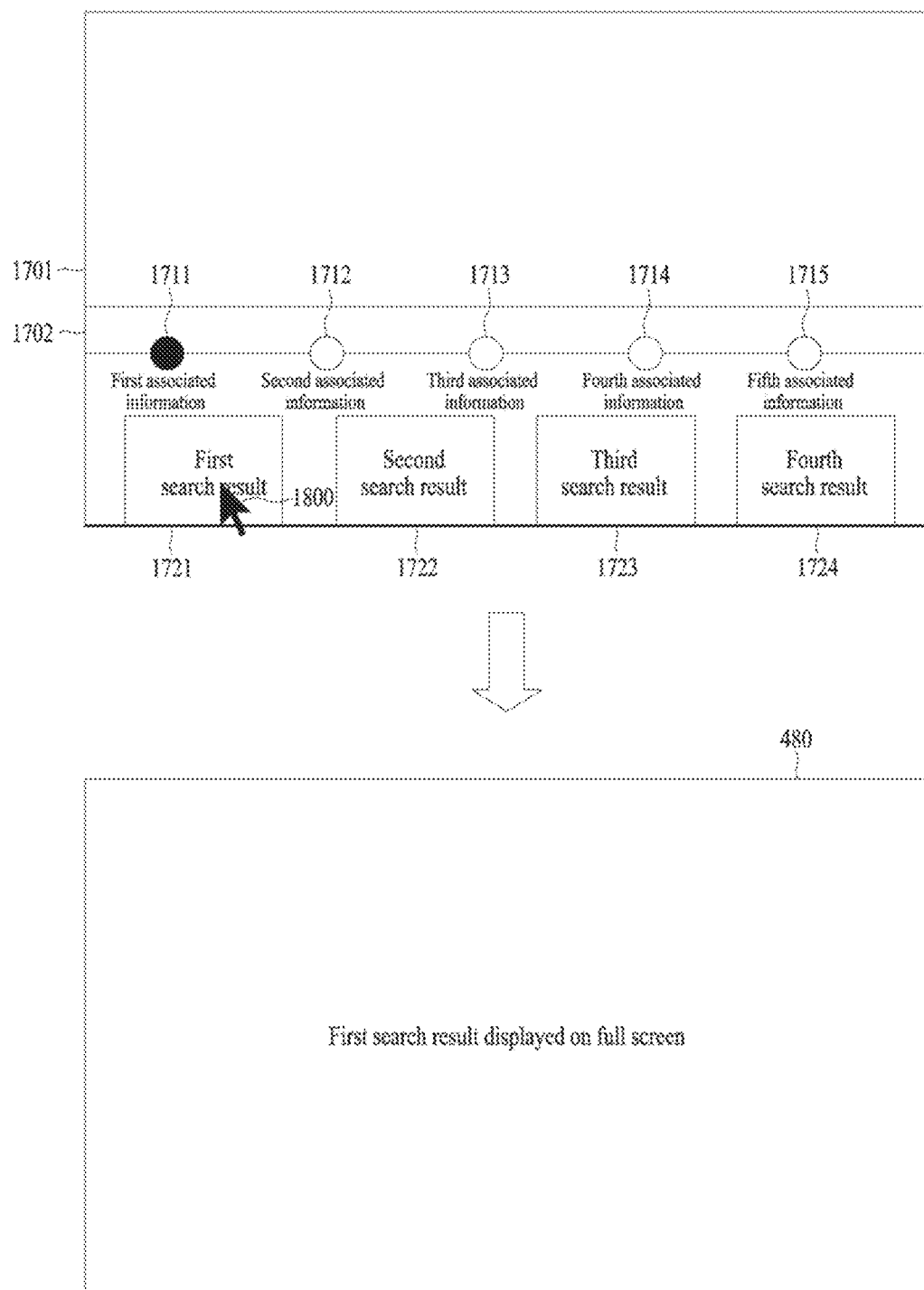

FIGS. 18 to 20 are diagrams illustrating examples of operations based on inputs to the associated information display screen according to one embodiment of the present invention.

Referring to FIG. 17, the controller 470 of the digital device 400 can divide a display area of the display unit 480 into a content area 1701 and an associated information area 1702. Thus, the controller 470 can output a content to the content area 1701 and display associated information regarding the content, which is being outputted to the content area 1701, on the associated information area 1702. The controller 470 may display a plurality of pieces of retrieved associated information on the associated information area 1702 and a plurality of associated information objects 1711, 1712, 1713, 1714, and 1715, which can be selected for the plurality of the pieces of the associated information, respectively. Here, the plurality of the associated information objects 1711, 1712, 1713, 1714, and 1715, which can be respectively selected for the plurality of the pieces of the associated information, may correspond to different search terms or different search targets similar to the above first to sixth associated information. Moreover, the controller 470 may display a search result retrieved based on an associated search term on the associated information area 1702. For instance, the controller 470 may display a search result of a selected associated information object. Here, the search result may mean the retrieved associated information retrieved for the content. Furthermore, the controller 470 may display the associated information corresponding to the search result in various forms such as a thumbnail image of a retrieved video, a summary screen of retrieved contents, an image of a retrieved web page, part or all of the text of retrieved contents, a thumbnail image of a retrieved channel, etc.

If an associated information object, for example, a first associated information object 1711 is selected from the plurality of the displayed associated information objects, the controller 470 may display first to fourth search results 1721 to 1724 in accordance with a search term and a search target corresponding to the first associated information object. In addition, when obtaining an input for selecting a different associated information object, the controller 470 may display search results corresponding to the selected associated information object.

The digital device 400 can display associated information retrieved according to an input to the associated information area 1702.

For example, referring to FIG. 18, when the controller 470 obtains an input for selecting the second associated information object 1712 from the plurality of the displayed associated information objects 1711 to 1715 through a cursor, the controller 470 can display search results corresponding to the selected second associated information object 1712. That is, the controller 470 may display eleventh to fourteenth search results 1831 to 1834 corresponding to the second associated information object 1712.

As another example, referring to FIG. 19, when the controller 470 obtains an input for dragging or moving the associated information area 1702 to the left, the controller 470 can change the displayed search results from first to fourth search results 1721 to 1724 to third to sixth search results 1723 to 1726. Moreover, the controller 470 may change the displayed search results according to an input of dragging or moving to the right. Furthermore, the displayed search result may be changed according to speed, distance, or the like of the moving or dragging input.

As a further example, referring to FIG. 20, when the controller 470 obtains an input for selecting one of the displayed retrieved associated information, the controller 470 can display the selected associated information on a full screen of the display unit 480. For example, when obtaining an input for selecting the first search result 1721 through the cursor, the controller 470 may display the selected first search result 1721 on the full screen of the display unit 480. In addition, while displaying the selected associated information on the full screen of the display unit 480, the controller 470 may display a video image, which has been displayed on the display unit 480 before displaying the selected associated information on the full screen, for example, a video image of the content on a partial screen of the display unit 480. Details will be described later.

The display of the associated information will be described in detail with reference to particular embodiments.

Figure 21:
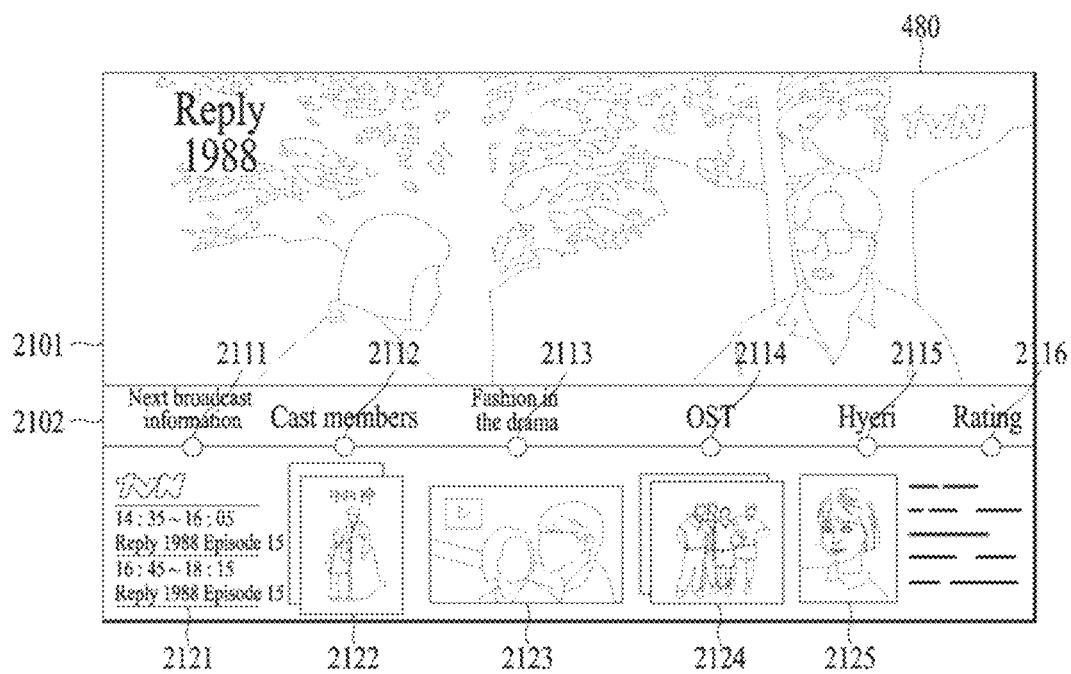
FIG. 21 is a diagram illustrating an example of the associated information display screen according to one embodiment of the present invention.

FIG. 21 is a diagram illustrating an example of the associated information display screen according to one embodiment of the present invention.

Referring to FIG. 21, the controller 470 of the digital device 400 can output a first content to a content area 2101 of the display unit 480 and display associated information related to the first content on an associated information area 2102 of the display unit 480. In addition, the controller 470 may also output the first content to the associated information area 2102 in a manner of controlling degree of transparency of the associated information area 2102. The controller 470 may retrieve information such as next broadcast information of the first content, a live drama channel, a video for the first content, OST of the first content, first cast members of the first content, ratings of the first content, and the like as the associated information related to the first content. Details will not be described here in order to avoid redundancy. The controller 470 may display a plurality of associated information objects 2111 to 2116 respectively corresponding to the next broadcast information of the first content, live drama channel, video for the first content, OST of the first content, first cast members of the first content, and ratings of the first content retrieved as the associated information related to the first content. Moreover, the controller 470 may display next broadcast information 2121, an image 2122 of the live drama channel, a thumbnail image 2123 of the video for the first content, an image 2124 of the OST of the first content, and information 2125 on the first cast members of the first content, which are retrieved as the associated information. When the controller 470 obtains an input for selecting one of information or images 2121 to 2125 displayed as the associated information, the controller may display specific information on the selected information or image as described above.

If while displaying associated information related to a content, the digital device 400 according to the present invention obtains an input for changing the content being outputted, the digital device 400 can display associated information related to the changed content. As one embodiment, if the digital device 400 obtains an input for changing a channel while displaying associated information, the digital device 400 may display associated information related to a content outputted to the changed channel. For instance, while outputting a video image of channel 5, the digital device 400 may display associated information related to a first content broadcasted by channel 5. If the digital device 400 obtains a channel change input while displaying the associated information related to the first content, the digital device 400 may change the channel from channel 5 to a different channel, for example, channel 6 and then display a video image of channel 6. Further, the digital device 400 may display associated information related to a second content broadcasted by the changed channel, channel 6. As described above, while displaying associated information regarding a content, the digital device 400 can output a different content and also display associated information regarding the different content.

The digital device 400 according to the present invention can display an associated information icon for retrieving associated information. When obtaining an input for selecting the associated information icon, the digital device 400 can display associated information regarding a content. Moreover, the digital device can display an icon related to a content search. When obtaining an input for selecting the displayed icon, the digital device 400 may also display a search result corresponding to the selected icon.

Figure 22:
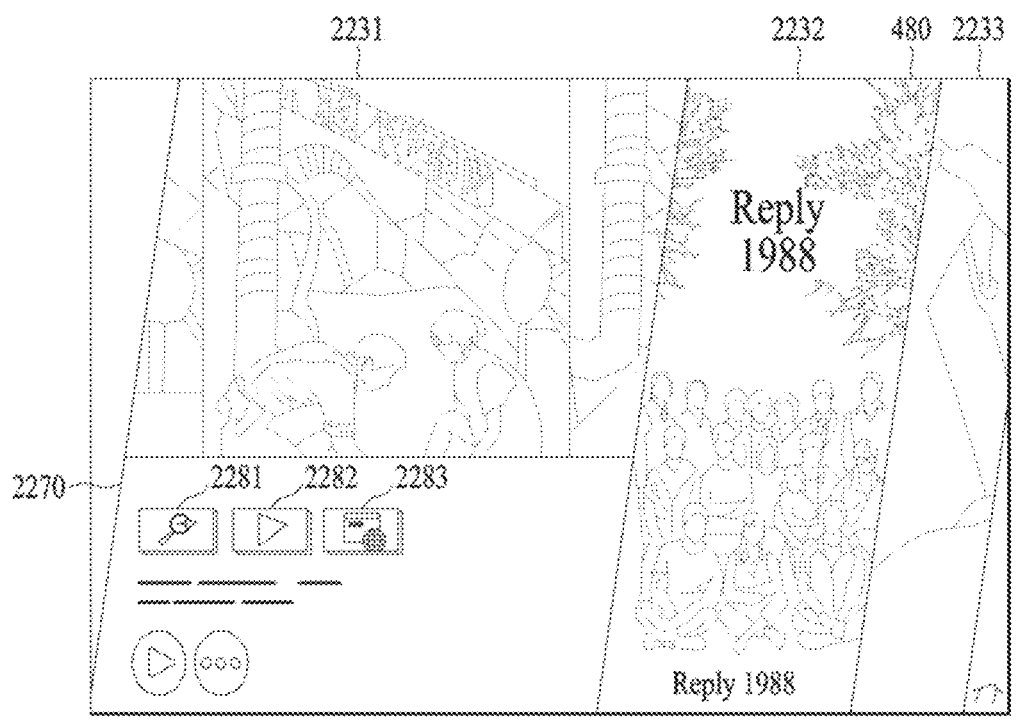
FIG. 22 is a diagram illustrating an example of a content display screen according to one embodiment of the present invention.

FIG. 22 is a diagram illustrating an example of a content display screen according to one embodiment of the present invention.

FIGS. 23 to 26 are diagrams illustrating examples of displaying content-associated information according to one embodiment of the present invention.

Figure 23:
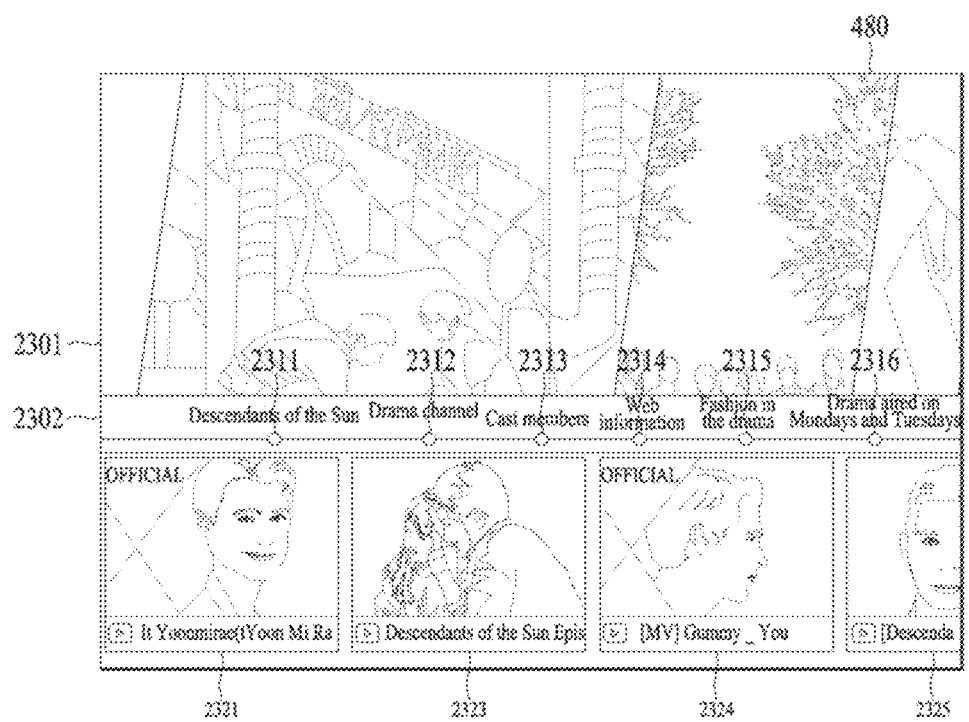
FIGS. 23 to 26 are diagrams illustrating examples of displaying content-associated information according to one embodiment of the present invention.

Referring to FIG. 22, the digital device 400 can display a thumbnail image for each of a plurality of contents. For instance, the digital device 400 may display a first image 2231 for a first content, a second image 2232 for a second content, and a third image 2233 for a third content. In addition, the controller 470 of the digital device 400 may display an info (information) bar 2270 for the selected first content. The controller 470 may display a content title and content information of the first content on the info bar 2270. The controller 470 may further display an associated information icon 2281 for displaying associated information on the first content, an associated video icon 2282 for retrieving a video associated with the first content, and an associated information search icon 2283 for performing a web search on information associated with the first content. Here, the associated information icon 2281 may be an icon for outputting a plurality of pieces of associated information using an associated search term created based on the content information of the above content, which is being outputted. Thereafter, when obtaining an input for selecting the associated information icon 2281, the digital device 400 may output a plurality of pieces of associated information regarding the first content. For instance, as shown in FIG. 23, the controller can divide the display area of the display unit 480 into a content area 2301 and an associated information area 2302 and then display objects for the plurality of the piece of the associated information regarding the first content on the associated information area 2302 according to search results of the associated information regarding the first content. For instance, the controller 470 may display objects for indicating categories such as a video 2311, a live drama channel 2312, information on cast members 2313, web information 2314, fashion in the drama 2315, and drama aired on Mondays and Tuesdays 2316 as the objects for the plurality of the pieces of the associated information. Here, the displayed objects may correspond to categories for the plurality of the pieces of the associated information, which is retrieved using the aforementioned associated search term. In this case, the digital device 400 may determine that a genre of the first content is drama based on the obtained content information of the first content. Thereafter, the digital device 400 may create an associated search term suitable for the drama genre and then retrieve a plurality of piece of associated information. Details will not be described here in order to avoid redundancy.

While outputting a content, the digital device 400 can display a plurality of piece of associated information on the above-mentioned associated information area. In addition, if one of the plurality of the piece of the associated information displayed on the associated information area is selected, the digital device 400 can display the selected associated information through a full screen. Moreover, the digital device 400 can display a video image of the content, which has been outputted, to a partial area while displaying the selected associated information on the full screen. Details of this operation will be described with reference to FIGS. 24 and 25.

Figure 24:
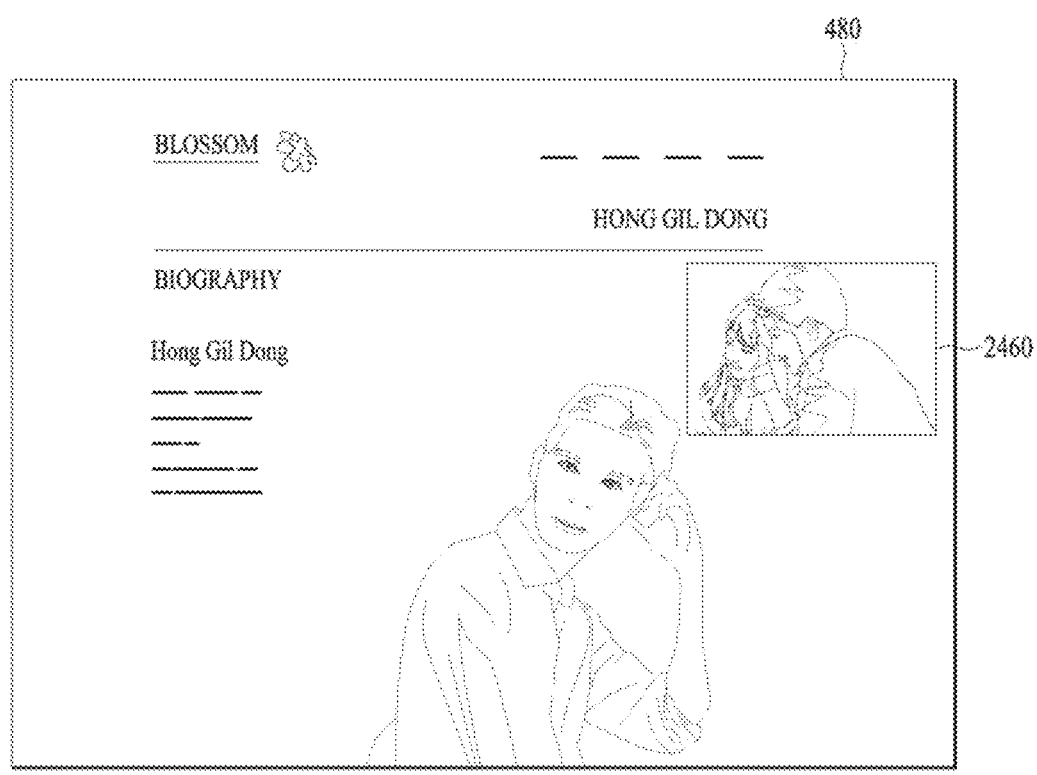

FIG. 24 is a diagram illustrating an example of a web page display screen according to one embodiment of the present invention.

Referring to FIG. 24, the controller 470 of the digital device 400 may display a web page with respect to cast information of a first content, which has been outputted, on an entire area of the display unit 480. Here, the cast information of the first content may be a search result retrieved according to an associated search term created based on content information of the first content. In addition, the controller 470 of the digital device 400 may output a video image of the first content to a partial area 2460 of the display unit 480. In other words, the digital device 400 can display the web page related to the first content on the entire area of the display unit 480 and output the video image of the first content to the partial area 2460.

Figure 25:
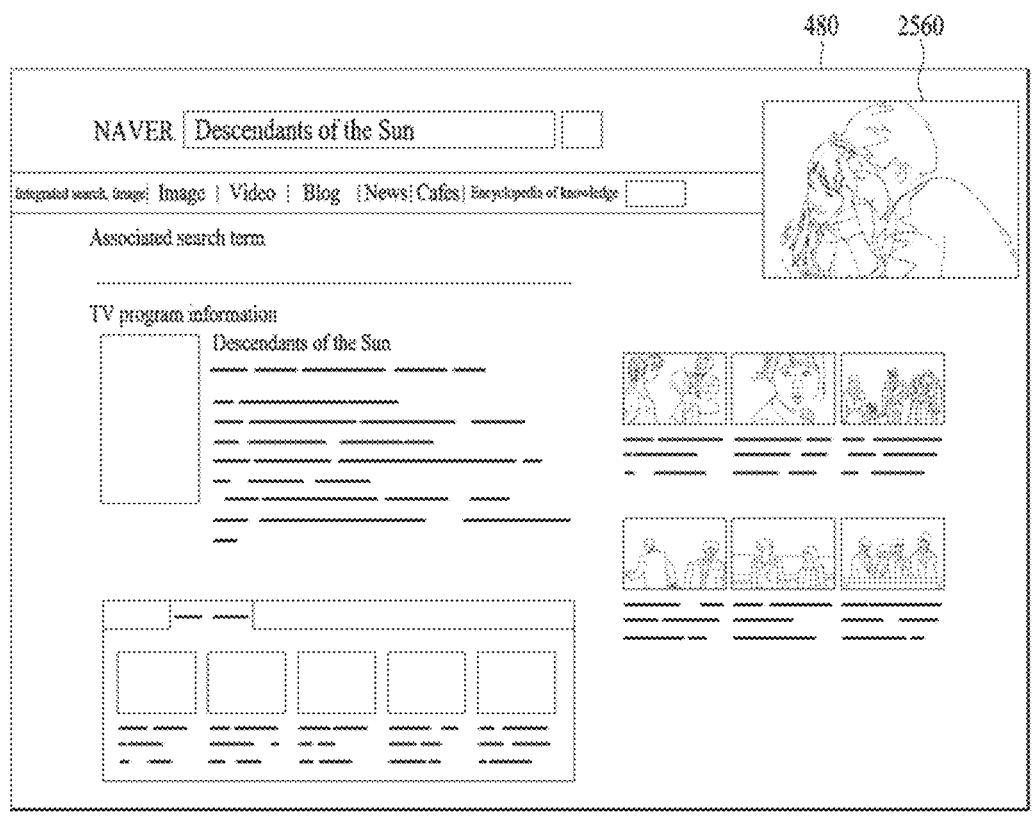

FIG. 25 is a diagram illustrating an example of a search web page display screen according to one embodiment of the present invention.

Referring to FIG. 25, the controller 470 of the digital device 400 can display a web page in accordance with a search result performed based on an associated search term containing an associated keyword of a first content, which has been outputted, on an entire area of the display unit 480. Here, the associated search term of the first content may be a search term created based on content information of the first content. In addition, the controller 470 of the digital device 400 may output a video image of the first content to a partial area 2460 of the display unit 480. In other words, the digital device 400 can display the web page in accordance with the search result based on the associated search term for the first content on the entire area of the display unit 480 and output the video image of the first content to the partial area 2460.

The digital device according to various embodiments of the present invention can display an info (information) bar for indicating information of the content, which is being outputted, and also display icons for retrieving various information related to the content being outputted on the info bar. Details will be described with reference to FIG. 26.

Figure 26:
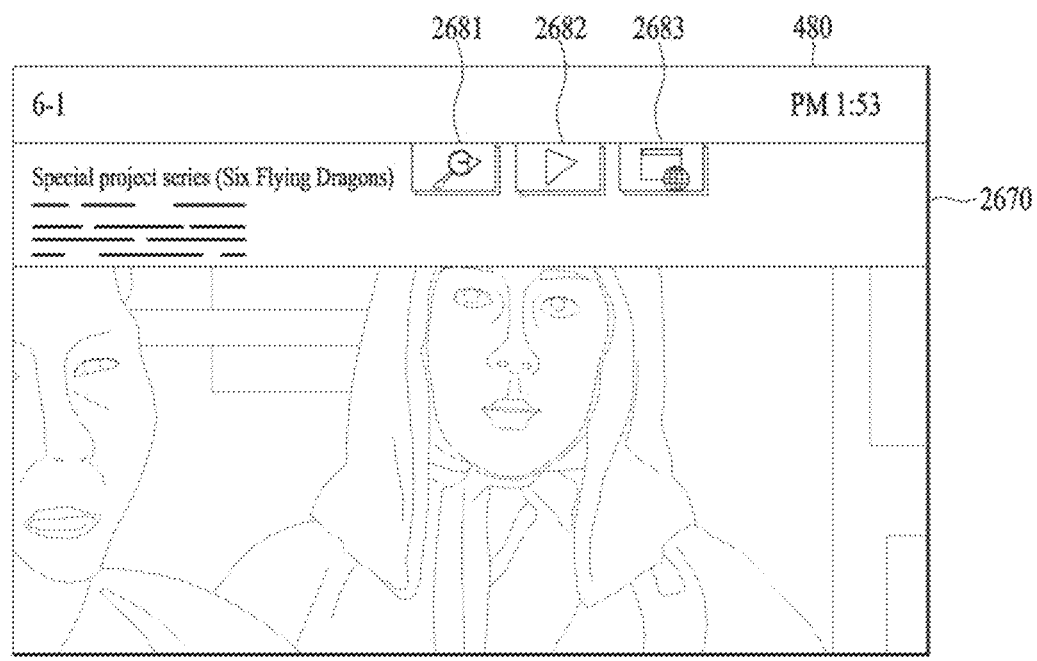

FIG. 26 is a diagram illustrating an example of an info (information) bar display screen according to one embodiment of the present invention.

Referring to FIG. 26, the digital device 400 can display an info (information) bar 2670 for the content, which is being outputted, and also display at least one search icon for retrieving various information related to the content being outputted on the info bar 2670. For instance, the controller 470 of the digital device 400 may display an associated information icon 2681 for displaying associated information on the content being outputted, an associated video icon 2682 for retrieving a video associated with the content being outputted, and an associated information search icon 2683 for performing a web search on information associated with the content being outputted on the info bar 2670. When obtaining an input for selecting the associated information icon 2681 displayed on the info bar 2670, the controller 470 may create an associated search term based on content information of the content being outputted and then retrieve at least one piece of associated information using the created associated search term. Details of the operation will not be described here in order to avoid redundancy. When obtaining an input for selecting the associated video icon 2682 displayed on the info bar 2670, the controller may obtain an associated keyword based on the content information of the content being outputted and then retrieve the video associated with the content being outputted using the associated keyword or associated search term. When obtaining an input for selecting the associated information search icon 2683 displayed on the info bar 2670, the controller may obtain the associated keyword based on the content information of the content being outputted and then perform the web search using the associated keyword or associated search term.

Meanwhile, the digital device 400 according to various embodiments of the present invention can display a plurality of search icons for retrieving information associated with the content being outputted and also arrange the plurality of the search icons according to an arrangement order corresponding to the content being outputted.

Figure 27:
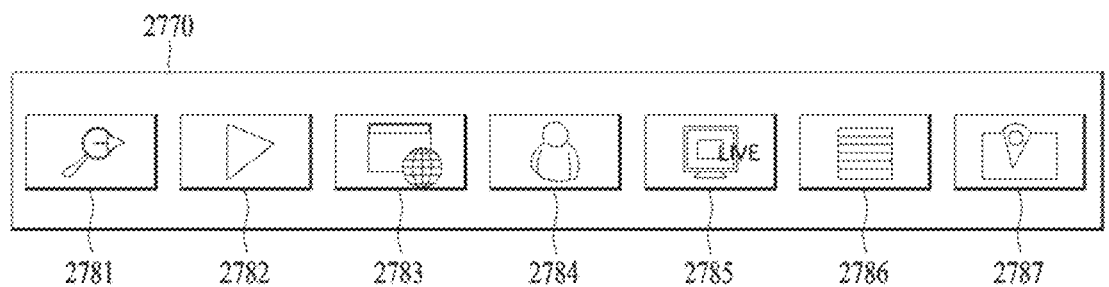
FIG. 27 is a diagram illustrating an example of a plurality of search icons according to various embodiments of the present invention.

FIG. 27 is a diagram illustrating an example of a plurality of search icons according to various embodiments of the present invention.

Referring to FIG. 27, the digital device 400 can display a plurality of search icons 2781 to 2787 for retrieving information associated with the content being outputted on an info (information) bar 2770. For instance, the digital device 400 may display an associated information icon 2781 for displaying associated information of the content being outputted, an associated video icon 2782 for retrieving a video associated with the content being outputted, an associated information search icon 2783 for performing a web search on information associated with the content being outputted, an associated people search icon 2784 for retrieving information on people associated with the content being outputted, an associated channel search icon 2785 for retrieving a channel associated with the content being outputted, an associated text search icon 2786 for retrieving text associated with the content being outputted, and an associated location search icon 2787 for retrieving a location associated with the content being outputted. Here, the text associated with the content being outputted may be text included in a web-based encyclopedia or text containing content information of the content being outputted, for example, broadcast information. Moreover, the people associated with the content being outputted may be people appearing in the content or people who make the content. Meanwhile, the plurality of the search icons may be displayed on various display areas as well as the info bar. For instance, the plurality of the search icons may be displayed on a partial area of EPG or a part of the above-mentioned associated information area.

The digital device 400 according to various embodiments of the present invention can display the plurality of the search icons according to an order corresponding to the content being outputted.

As one embodiment, the digital device 400 can display the plurality of the search icons according to an order corresponding to a genre of the content being outputted.

Figure 28:
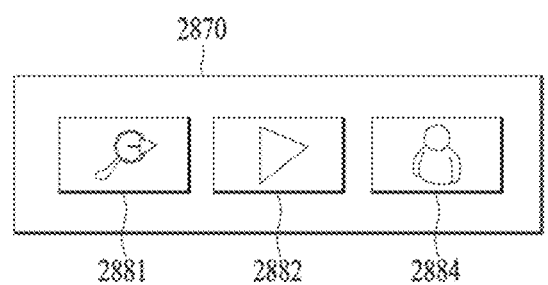
FIGS. 28 to 30 are diagrams illustrating examples of displaying a plurality of search icons according to various embodiments of the present invention.
Figure 29:
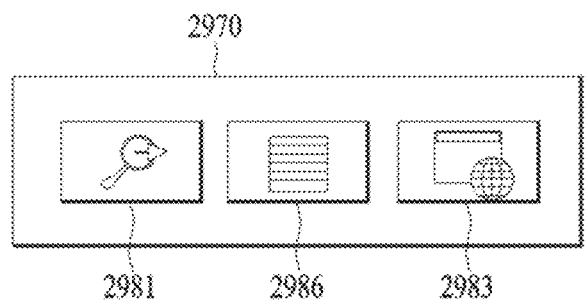
Figure 30:
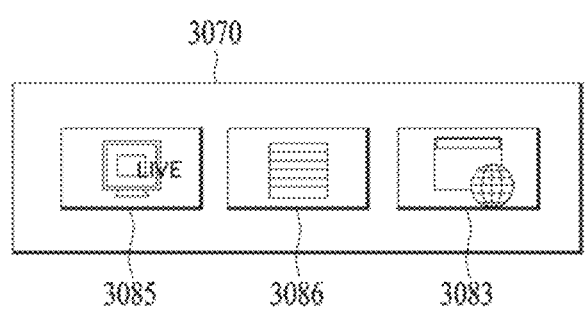

FIGS. 28 to 30 are diagrams illustrating examples of displaying a plurality of search icons according to various embodiments of the present invention.

Referring to FIG. 28, if the genre of the content being outputted is a drama, the digital device 400 can display search icons in the order of an associated information icon 2881, an associated video icon 2882, and an associated people icon 2884.

Referring to FIG. 29, if the genre of the content being outputted is news, the digital device 400 can display search icons in the order of an associated information icon 2981, an associated text search icon 2986, and an associated information search icon 2983.

Referring to FIG. 30, if the genre of the content being outputted is education, the digital device 400 can display search icons in the order of an associated channel search icon 3085, an associated text search icon 3086, and an associated information search icon 3083.

The above examples are merely to explain the present invention, and a plurality of search icons can be arranged and displayed in various forms according to a user configuration or selection of a manufacturer. That is, the order of displaying a plurality of search icons can be determined based on various standards including the content genre.

The digital device 400 according to various embodiments of the present invention can display associated information regarding a selected program on an EPG display screen.

Figures 31, 32:
FIG. 31 is a diagram illustrating an example of displaying an associated information search icon on an EPG screen according to various embodiments of the present invention.
FIG. 32 is a diagram illustrating an example of displaying associated information related to a selected program according to various embodiments of the present invention.

FIG. 31 is a diagram illustrating an example of displaying an associated information search icon on an EPG screen according to various embodiments of the present invention.

FIG. 32 is a diagram illustrating an example of displaying associated information related to a selected program according to various embodiments of the present invention.

Referring to FIG. 31, the digital device 400 can display a timetable in accordance with EPG information on the display unit 480 and also display an associated information icon 3181, an associated video icon 3182, and an associated information search icon 3183 on the displayed timetable. In addition, the digital device 400 can retrieve associated information regarding a program selected from a plurality of programs displayed on the timetable. For instance, the digital device 400 may obtain an input for selecting a first content 3190 from the plurality of the programs displayed on the timetable and then obtain an input for selecting the associated information icon 3181 through a cursor 1800 in a state in which the first content 3190 is selected. Thereafter, the digital device 400 may display associated information related to the selected first content 3190. Referring to FIG. 32, the digital device 400 can use a part of the display area of the display unit 480 for the associated information area 1702 and then display at least one piece of associated information related to the first content 3190 on the associated information area 1702. For instance, the digital device 400 may display a plurality of associated information objects 1711, 1712, 1713, 1714, and 1715 corresponding to a plurality of pieces of associated information retrieved for the first content 3190 and also display one or more search results of selected associated information. As one embodiment, if first associated object 1711 is selected, the digital device 400 may display a plurality of search results, i.e., the first to fourth search results 1721 to 1724 corresponding to the selected first associated information 1711. Details of the associated information search and the display of the retrieved associated information will not be described here in order to avoid redundancy.

FIG. 33 is a diagram illustrating an example of displaying an associated information search icon on an EPG screen according to various embodiments of the present invention.

FIG. 34 is a diagram illustrating an example of displaying an associated video retrieved for a selected program according to various embodiments of the present invention.

Referring to FIG. 33, the digital device 400 can display the timetable in accordance with EPG information on the display unit 480 and also display the associated information icon 3181, the associated video icon 3182, and the associated information search icon 3183 on the displayed timetable. In addition, the digital device 400 can retrieve the associated information regarding the program selected from the plurality of the programs displayed on the timetable. For instance, the digital device 400 may obtain the input for selecting the first content 3190 from the plurality of the programs displayed on the timetable and then obtain an input for selecting the associated video icon 3182 through the cursor 1800 in the state in which the first content 3190 is selected. Thereafter, the digital device 400 may display an associated video related to the selected first content 3190. Referring to FIG. 34, the digital device 400 can use a part of the display area of the display unit 480 for the associated information area 1702 and then display video thumbnail images of one or more videos associated with the first content 3190 on the associated information area 1702. For instance, the digital device 400 may display a plurality of associated video thumbnail images corresponding to a plurality of associated videos retrieved for the first content 3190, i.e., a first video thumbnail image 3431, a second video thumbnail image 3432, and a third video thumbnail image 3433. Details of the associated video search and the display of the retrieved associated video will not be described here in order to avoid redundancy.

The digital device 400 according to various embodiments of the present invention can retrieve associated information related to the video image, which is being outputted, and associated information related to an audio corresponding to the video image. In addition, the digital device can output the search result. Moreover, even in case that the audio, which does not correspond to the video image being outputted, is outputted, the digital device 400 can retrieve information associated with the audio not corresponding to the outputted video image, and then output the search result as well.

Particularly, the digital device 400 can output a video image and audio of the first content. In addition, while outputting the video image of the first content, the digital device 400 can output an audio of the second content. That is, the digital device 400 can simultaneously output the video image of the first content and the audio of the second content. Moreover, the digital device 400 can retrieve associated information related to the outputted second content and then output the search result. Details will be described with reference to FIG. 35.

Figure 35:
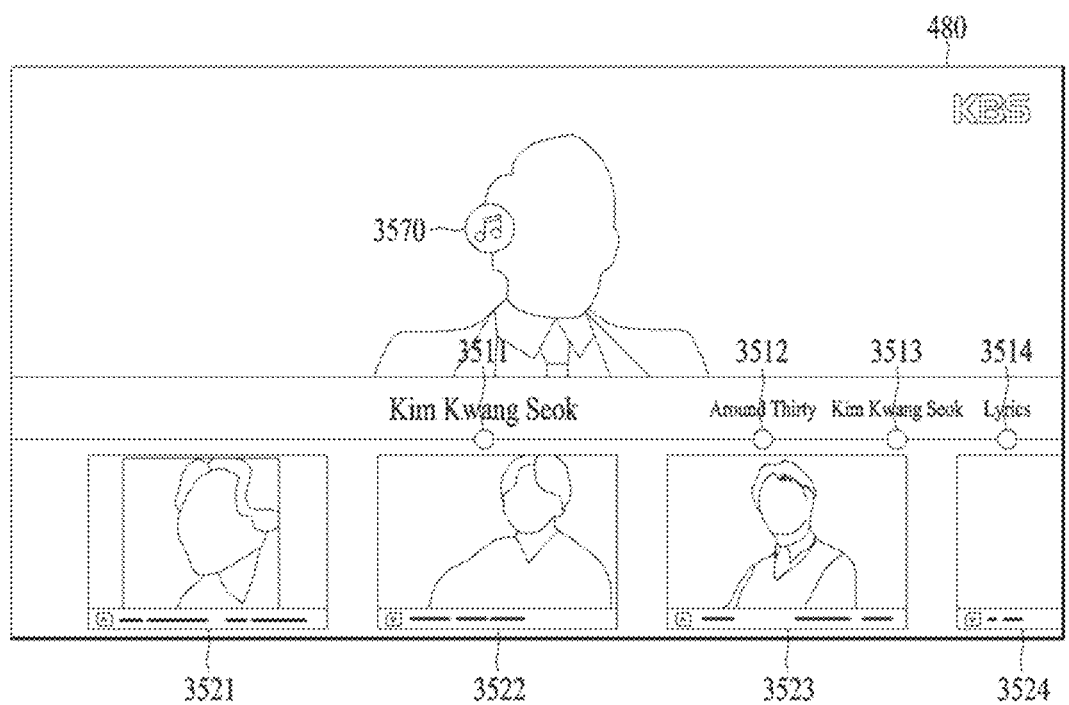
FIG. 35 is a diagram illustrating an example of displaying a search result of associated information related to an audio content according to various embodiments of the present invention.

FIG. 35 is a diagram illustrating an example of displaying a search result of associated information related to an audio content according to various embodiments of the present invention.

Referring to FIG. 35, while displaying a video image of a first content on the display unit 480, the digital device 400 can output an audio of a second content instead of that of the first content through the audio output unit 485. For instance, as shown in FIG. 35, the digital device 400 may display the first content corresponding to the video image obtained by receiving a broadcast signal on the display unit 480 and output the audio of the second content corresponding to a selected music file through the audio output unit 485. The digital device 400 may display an icon 3670 indicating that the outputted audio does not match the displayed video image. In addition, the digital device 400 may retrieve associated information related to the outputted audio based on content information of the outputted audio instead of content information of the displayed video image, and then output the search result. Therefore, the digital device 400 may output at least one piece of associated information related to the second content corresponding to the audio output. For instance, when the second content is a music content, the digital device 400 may output at least one of information on the singer of the second content, a video for the singer of the second content, lyrics information of the second content, and web search information about the tile of the song in the second content as the associated information. As one embodiment, as shown in FIG. 35, the digital device 400 may use a partial area of the display unit 480 for the associated information area 1702. Then, the digital device 400 may display a singer video object 3511, a song information object 3512, a singer information object 3153, and a lyrics information objects 3514 based on the associated information retrieved for the second content. Here, the singer video object 3511 may be an object containing a plurality of videos for the singer in the second content, the song information object 3512 may be an object containing a plurality of videos for songs with the same title as the song of the second content, the singer information object 3513 may be an object containing web search information on the singer of the second content, and the lyrics information object may be an object including the lyrics information of the second content. When the singer video object 3511 is selected, the digital device 400 may display thumbnails images of a plurality of videos retrieved for the singer of the second content. For instance, the digital device 400 may display the thumbnail images of the plurality of the videos retrieved for the singer of the second content, i.e., a first video thumbnail image 3521, a second video thumbnail image 3522, a third video thumbnail image 3523, and a fourth video thumbnail image. Details of the search result of the associated information related to the outputted content and the output of the search result will not be described here in order to avoid redundancy.

While outputting content information of the current content, the digital device 400 according to various embodiments of the present invention can receive an inputted search term, retrieve associated information related to the content being outputted, and then display the search result. Details of the operation will be described with reference to FIG. 36.

Figure 36:
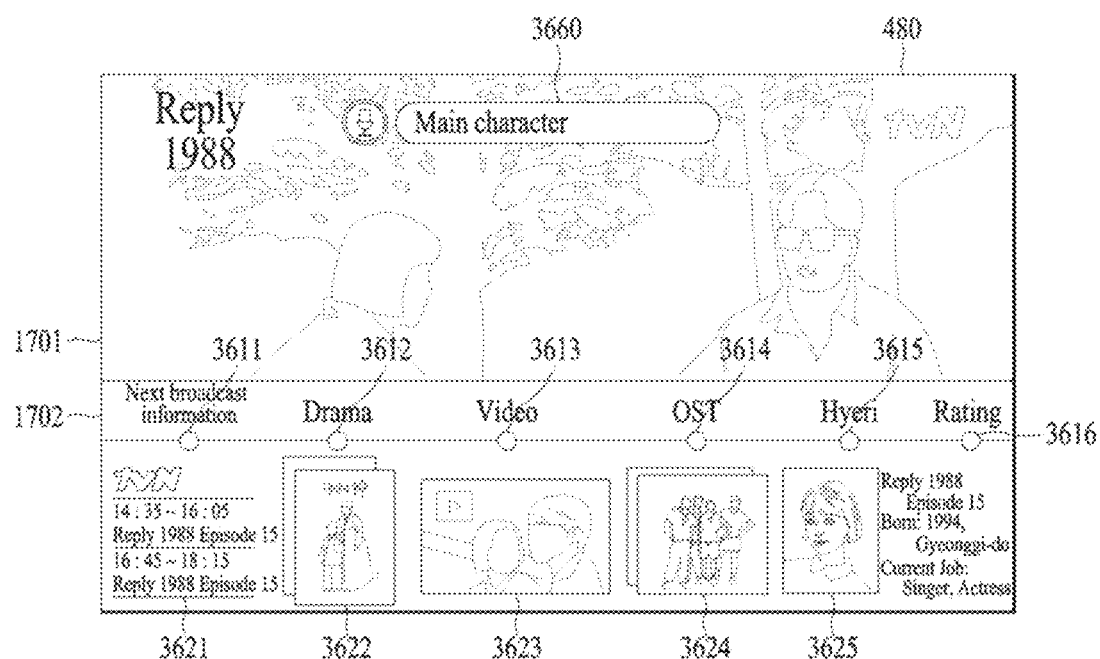
FIG. 36 is a diagram illustrating an example of retrieving associated information according to various embodiments of the present invention.

FIG. 36 is a diagram illustrating an example of retrieving associated information according to various embodiments of the present invention.

Referring to FIG. 36, the digital device 400 can output a first content and also receive an inputted search term while outputting the first content. For example, the digital device 400 can receive the inputted search term through a displayed search window 3660. In this case, the digital device 400 may obtain the search term from a text input or an audio input. Alternatively, the digital device 400 may receive the search term from a different device. The digital device 400 can create an associated search term based on both content information of the first content being outputted and the inputted search term. For instance, the digital device 400 may create an associated search term containing both an associated keyword corresponding to the content information of the first content and the inputted search term. As one embodiment, the digital device 400 may create an associated search term containing both of the content information of the outputted first content and the inputted search term "main character". In addition, the digital device 400 can retrieve at least one piece of associated information using the created associated search term and then output the retrieved at least one piece of the associated information. For instance, as shown in FIG. 36, the digital device 400 may display the search result retrieved for the first content information and the search term "main character" on the associated information area 1720. Particularly, the digital device 400 may display at least one of information on other programs in which the actor playing the main character in the first content appears, a drama, a video, OST, actor information, and ratings information as the search result. Thus, the digital device 400 may display a next broadcast information object 3611 for the information on other programs in which the actor playing the main character in the first content appears, a drama information object 3612 for the drama, a video object 3613 for the video, an OST information object 3613 for the OST, an actor information object 3614 for the actor information, and a ratings object 3615 for ratings of a content in which the actor appears. Moreover, the digital device 400 can further display particular associated information in accordance with the search result. For instance, the digital device 400 may display next broadcast information 3621, a thumbnail image of the drama 3622, a first video thumbnail image 3623, an OST album image 3624, and actor information 3625, which of all are retrieved. As described above, while outputting the content information of the current content, the digital device 400 according to the present invention can receive the inputted search term, retrieve the associated information related to the content being outputted, and then output the search result as well.

Although the present invention has been described focusing on the digital device 400 for convenience of the description, the invention can be applied to various devices such as the digital device 200, mobile device 300, and the like as well as the digital device 400. In addition, all or part of the embodiments of the invention may be selectively combined such that various modifications or variations can be obtained from the embodiments.

The digital device and method for operating the same according to the embodiments of the present invention may be implemented as other embodiments by combining the whole or some parts of the embodiments of the present invention selectively.

In addition, the digital device and method for operating the same according to the embodiments of the present invention can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer-readable media are distributed over a plurality of computer systems connected to a network so that computer-readable codes can be are written thereto and executed therefrom.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling a digital television, the method comprising:
outputting a content in a content area, wherein the content is received via a tuner of the digital television;
recognizing audio data included in the content when the content does not have content information;
requesting the content information to a server by transmitting the recognized audio data to the server;
obtaining the content information of the content which is currently being outputted, wherein obtaining the content information of the content being outputted comprises obtaining electronic program guide (EPG) information on the content being outputted, and obtaining the content information of the content from the obtained EPG information;

obtaining at least one associated keyword corresponding to the obtained content information, wherein the at least one associated keyword changes depending on an information table stored in a memory, further the information table identifies a relationship between the at least one associated keyword and a genre of the content being outputted;

retrieving a plurality of pieces of associated information related to the content using an associated search term containing the obtained at least one associated keyword and the content information;

dividing the display area into the content area and an associated information area;

outputting the retrieved plurality of pieces of associated information and a plurality of associated information objects, which can be selected for the plurality of the pieces of the associated information, respectively, in the associated information area while outputting the content in the content area; and receiving at least a search keyword via another device from a user, wherein the plurality of associated information objects respectively correspond to next broadcast information of the first content, a genre channel, a video for the first content, an original original sound track (OST) of the first content, cast members of the first content, and ratings of the first content, and wherein the method further comprises displaying the next broadcast information, an image of the genre channel, a thumbnail image of the video for the first content, an image of the OST of the first content, and information on the cast members of the first content.

2. The method of claim 1, wherein retrieving the plurality of pieces of associated information related to the content comprises performing at least one of a video search, a web search, a people search, a live channel search, a broadcast information search, and a location search using the associated search term.

3. The method of claim 1, wherein outputting the retrieved plurality of pieces of associated information comprises outputting the retrieved plurality of pieces of associated information according to an order corresponding to the genre of the content being outputted.

4. The method of claim 1, wherein obtaining the content information of the content being outputted comprises obtaining at least one of a title, contents, a playback time, the genre, and cast members of the content being outputted.

5. The method of claim 1, further comprising displaying associated information search icons for retrieving the associated information related to the content being outputted.

6. The method of claim 5, wherein displaying the associated information search icons comprises displaying the at least one of the associated information search icons according to an order corresponding to the genre of the content being outputted.

7. The method of claim 1, wherein retrieving the plurality of pieces of associated information related to the content comprises creating either the associated search term containing the obtained at least one associated keyword or an associated search term containing both the obtained at least one associated keyword and at least one word in accordance with the content information.

8. A digital television, comprising:
a memory configured to store an information table for identifying a relationship between at least one associated keyword and a genre of a content being outputted;
a display configured to output the content in a content area, wherein the content is received via a tuner of the digital television; and
a controller configured to:
recognize audio data included in the content when the content does not have content information,
request the content information to a server by transmitting the recognized audio data to the server,
obtain the content information of the content which is currently being outputted, wherein obtaining the content information of the content being outputted comprises obtaining electronic program guide (EPG) information on the content being outputted, and obtaining the content information of the content from the obtained EPG information,
obtain the at least one associated keyword corresponding to the obtained content information, further the at least one associated keyword changes depending on the information table stored in the memory,
retrieve a plurality of pieces of associated information related to the content using an associated search term containing the obtained at least one associated keyword and the content information,
divide the display area into the content area and an associated information area,
output the retrieved plurality of pieces of associated information and a plurality of associated information objects, which can be selected for the plurality of the pieces of the associated information, respectively, in the associated information area while outputting the content in the content area, and
receive at least a search keyword via another device from a user,
wherein the plurality of associated information objects respectively correspond to next broadcast information of the first content, a genre channel, a video for the first content, an original sound track (OST) of the first content, cast members of the first content, and ratings of the first content retrieved, and
wherein the controller is further configured to display the next broadcast information, an image of the genre channel, a thumbnail image of the video for the first content, an image of the OST of the first content, and information on the cast members of the first content.

9. The digital television of claim 8, wherein the controller is further configured to perform at least one of a video search, a web search, a people search, a live channel search, a broadcast information search, and a location search using the associated search term.

10. The digital television of claim 8, wherein the controller is further configured to output the retrieved plurality of pieces of associated information according to an order corresponding to the genre of the content being outputted.

11. The digital television of claim 8, wherein the controller is further configured to obtain at least one of a title, contents, a playback time, the genre, and cast members of the content being outputted.

12. The digital television of claim 8, wherein the controller is further configured to display associated information search icons for retrieving the associated information related to the content being outputted on the display.

13. The digital television of claim 12, wherein the controller is further configured to display the associated information search icons according to an order corresponding to the genre of the content being outputted.

14. The digital television of claim 8, wherein the controller is further configured to create either the associated search term containing the obtained at least one associated keyword or an associated search term containing both the obtained at least one associated keyword and at least one word in accordance with the content information.

\* \* \* \* \*